J. WAHLBERG.
PHONOGRAPH.
APPLICATION FILED JUNE 22, 1920.
1,390,404.
Patented Sept. 13, 1921.
25 SHEETS—SHEET 4.
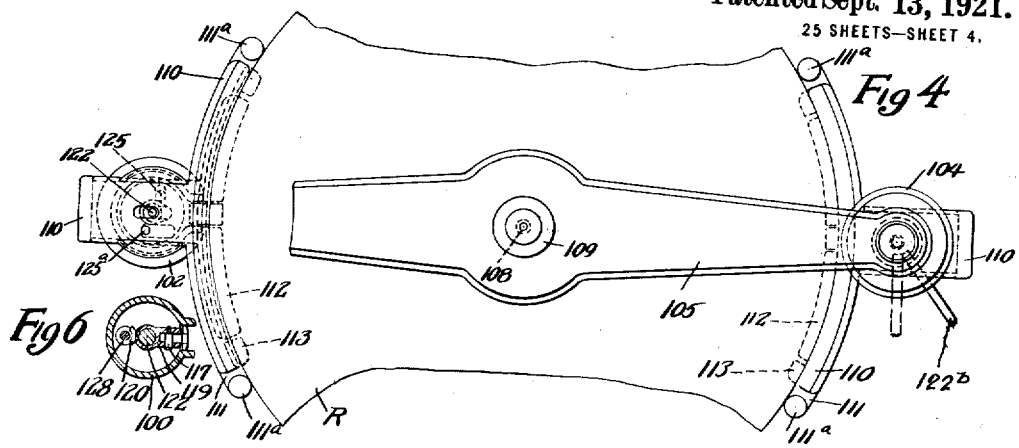
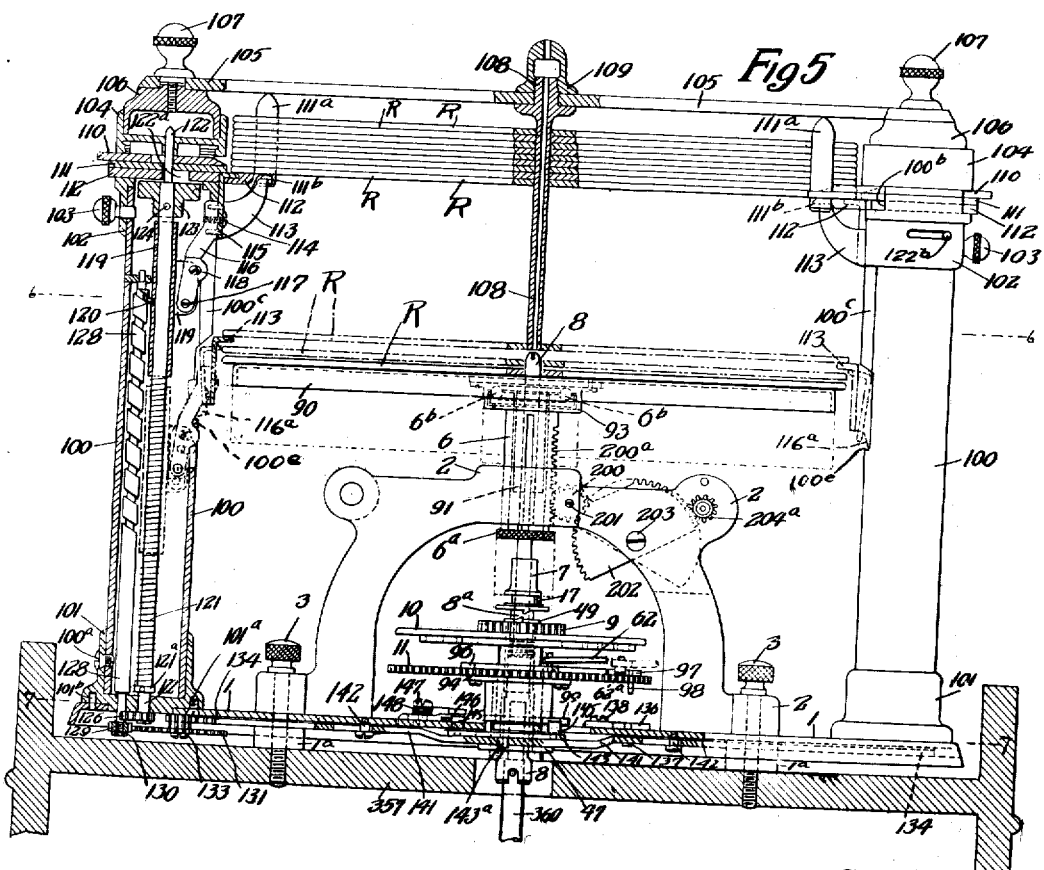

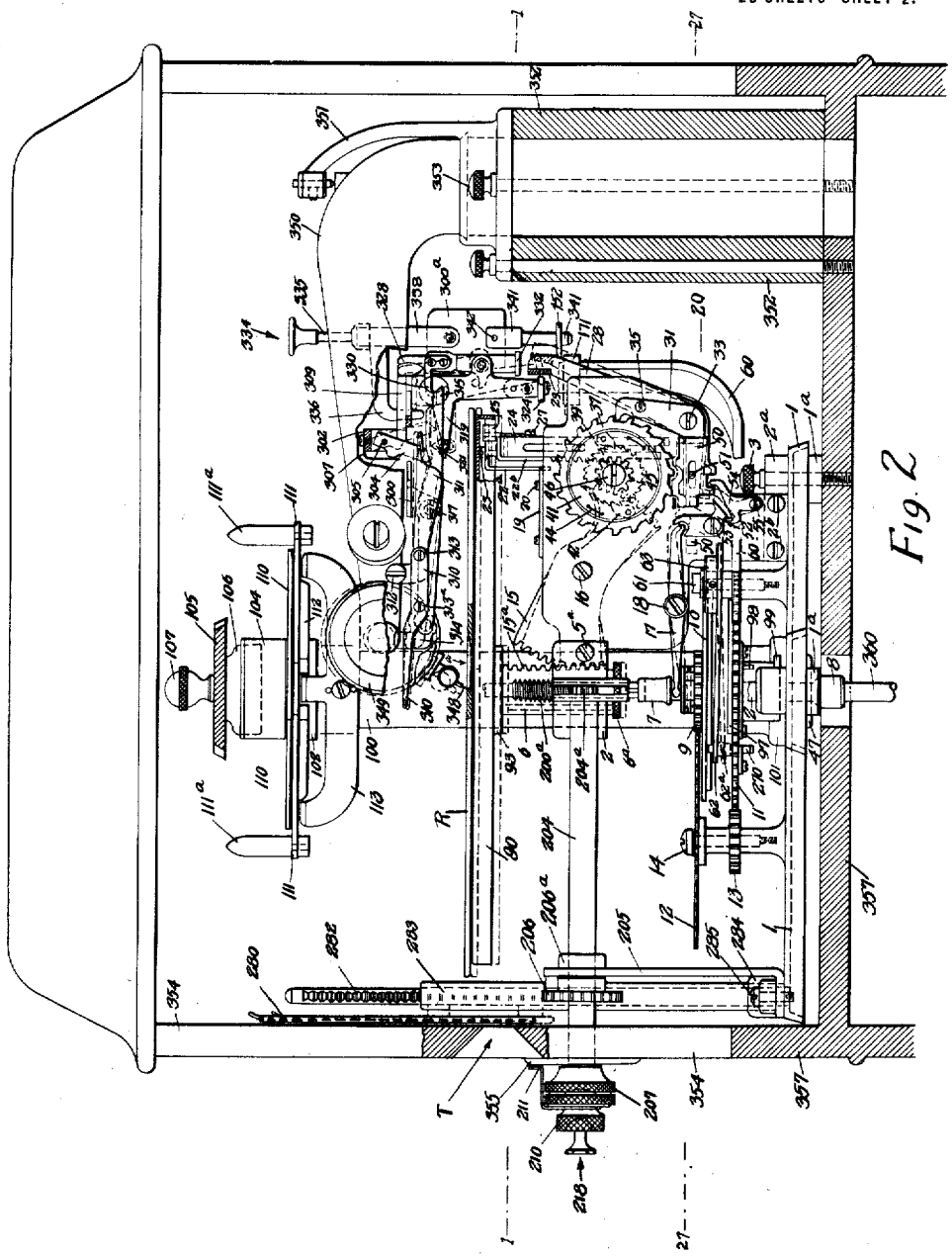

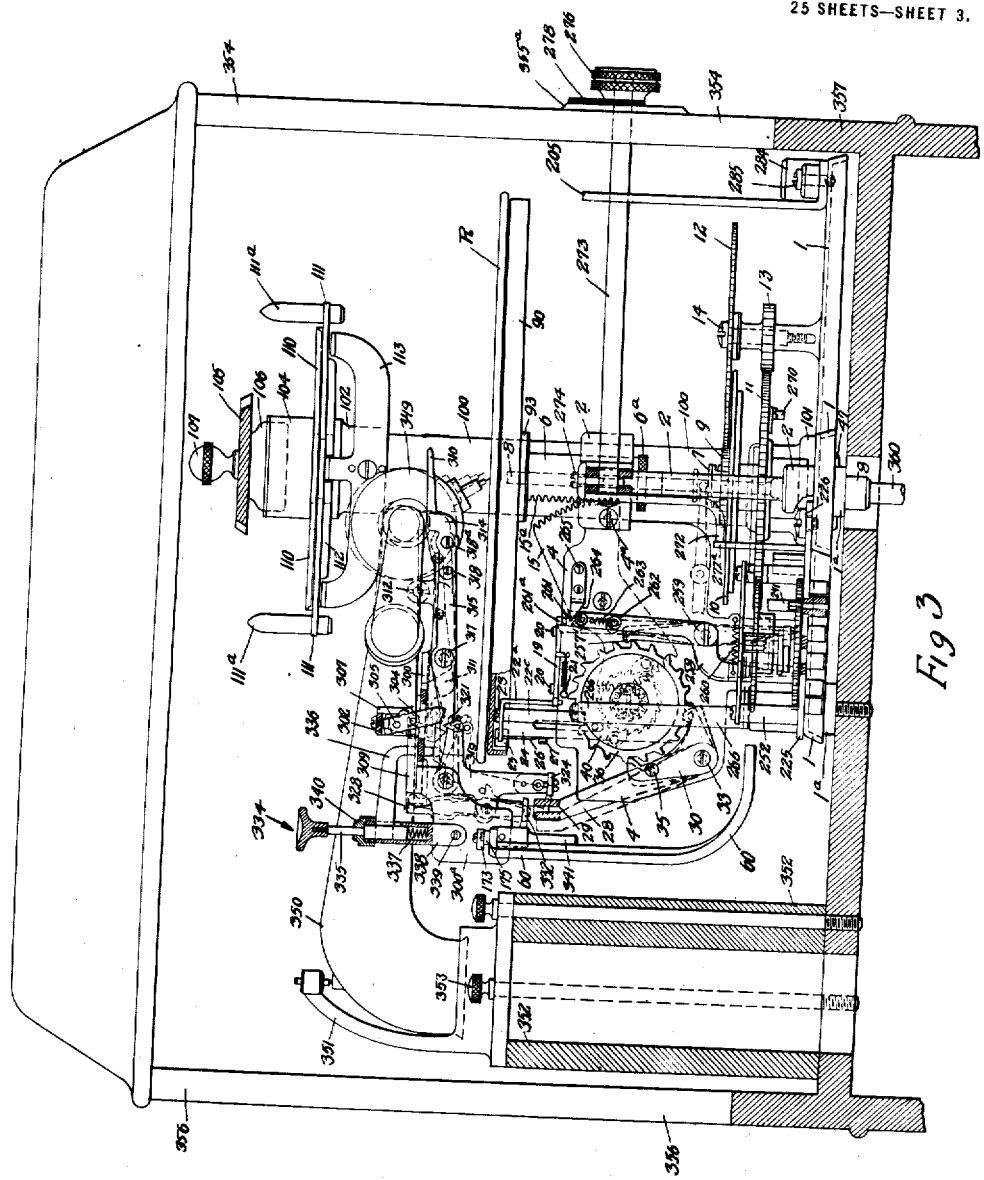

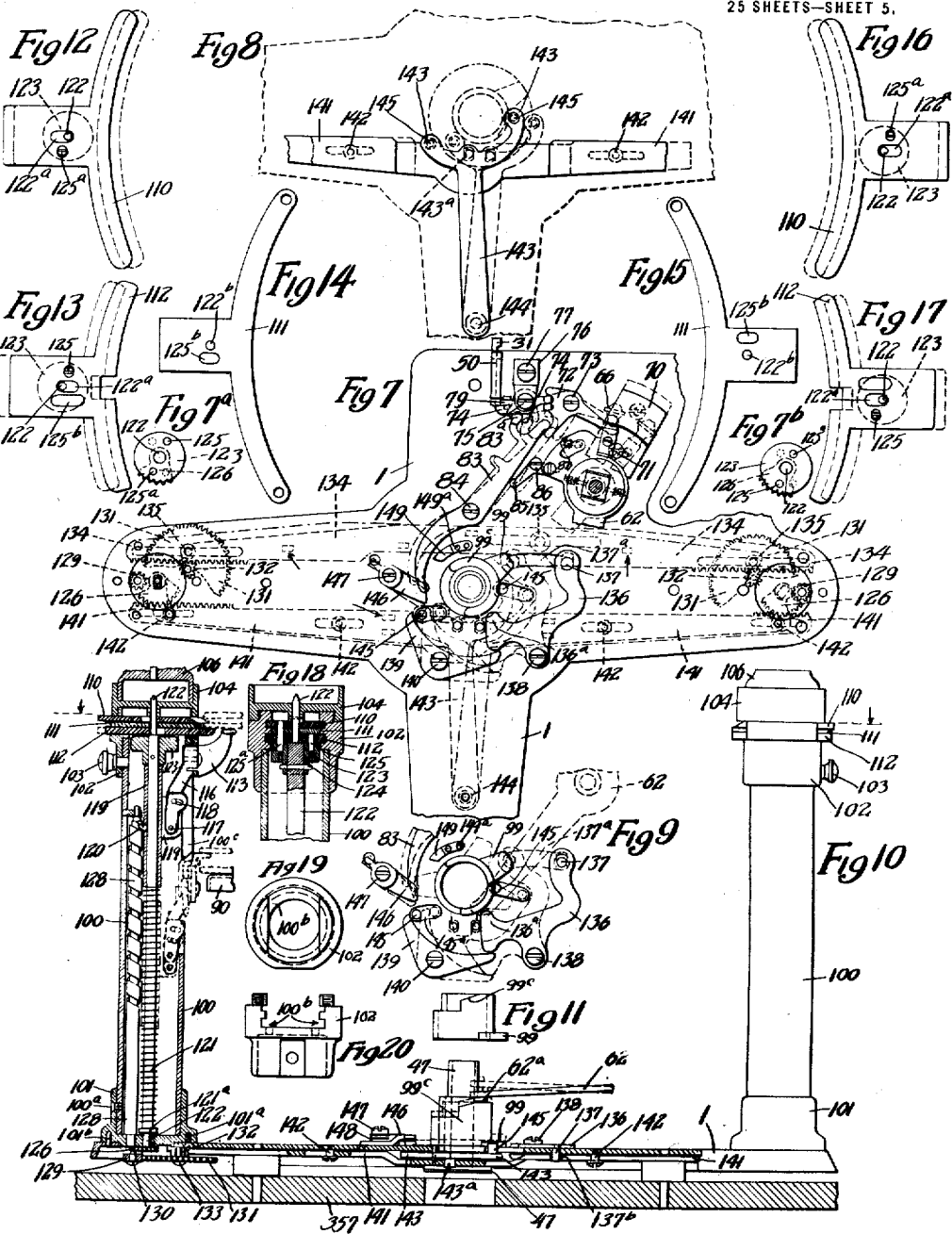

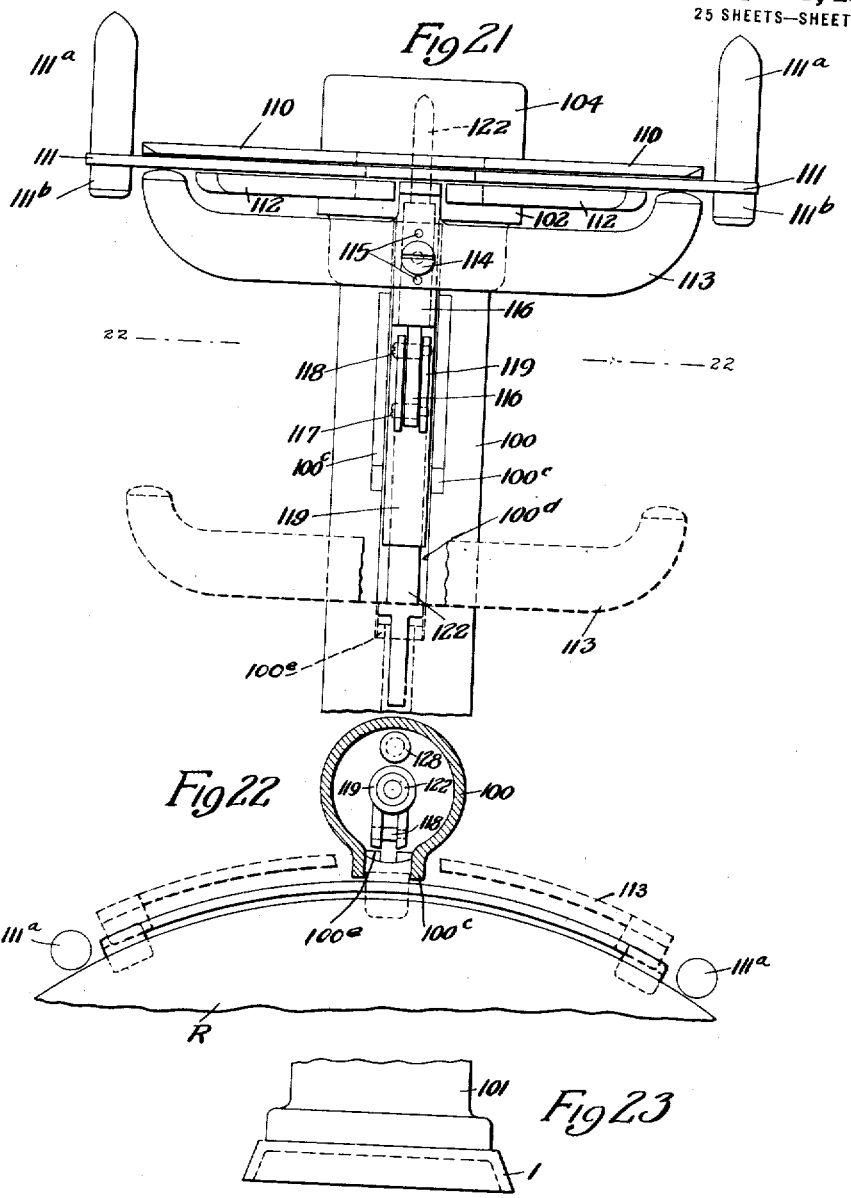

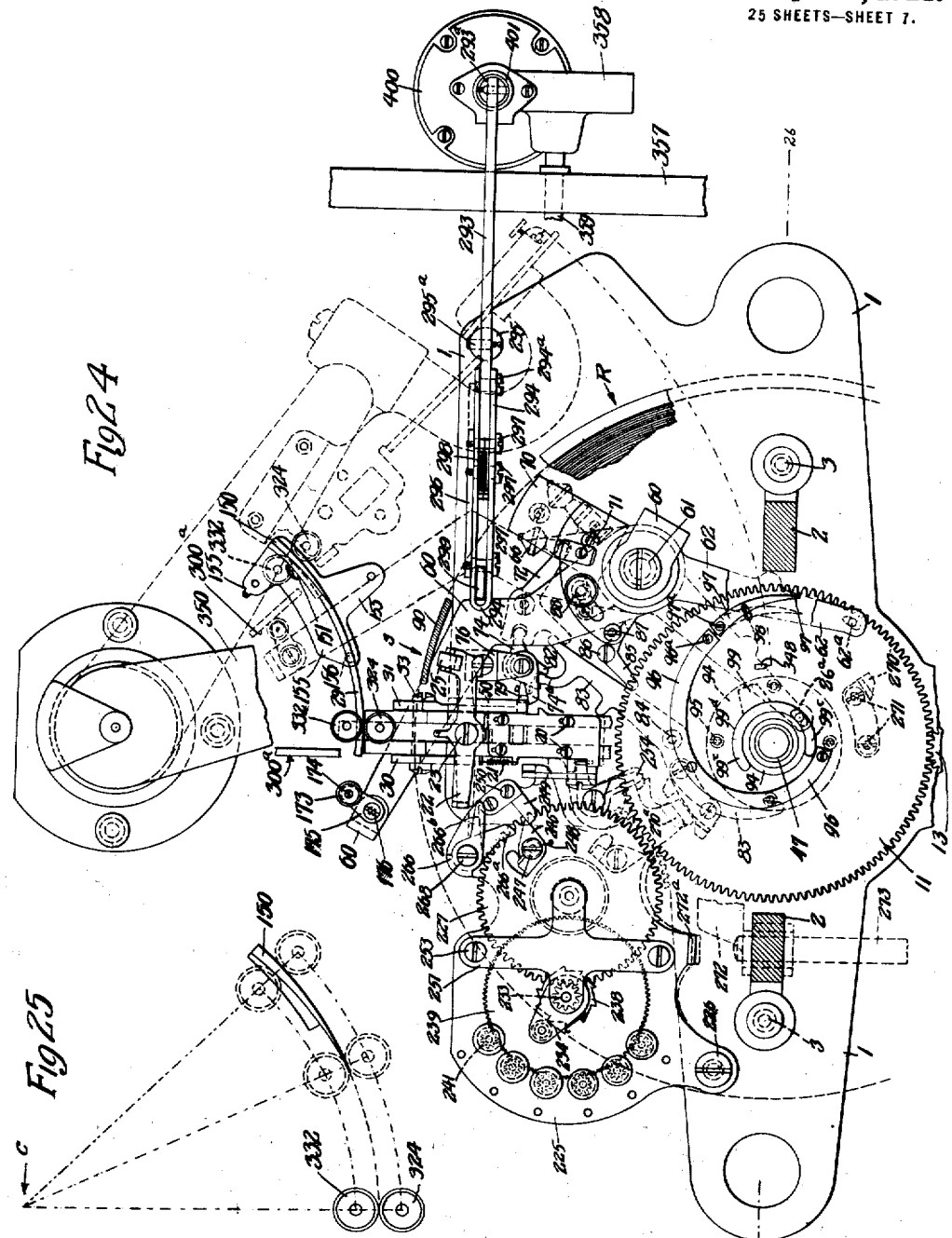

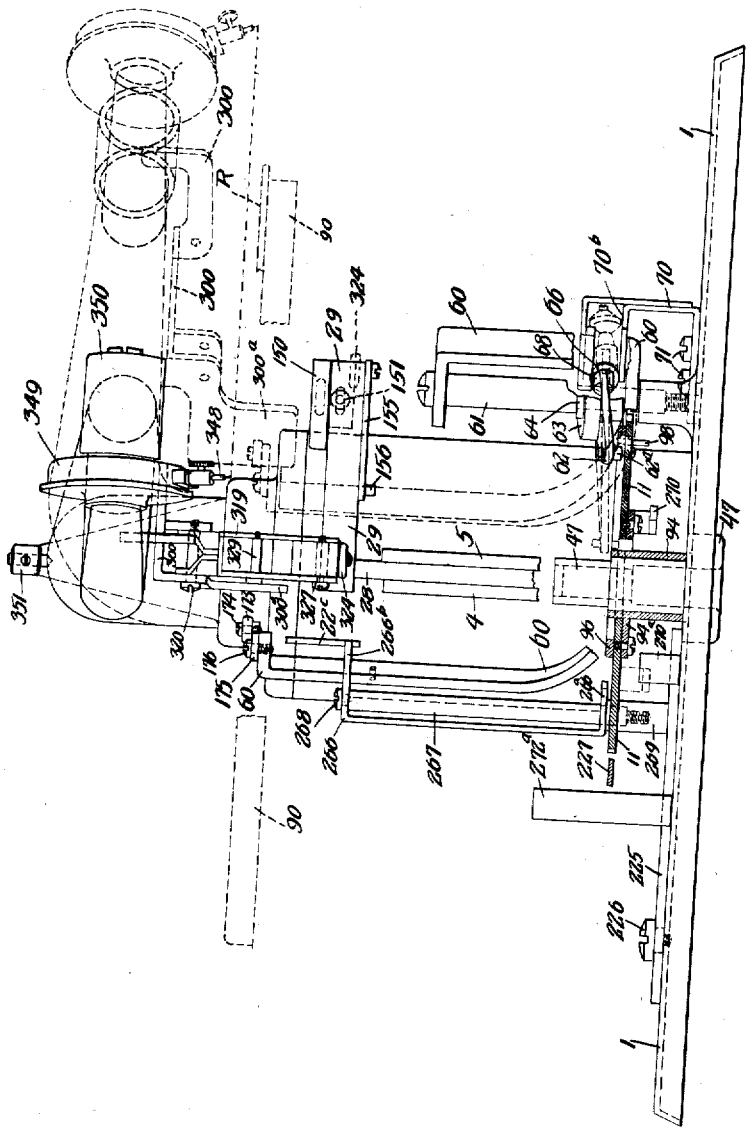

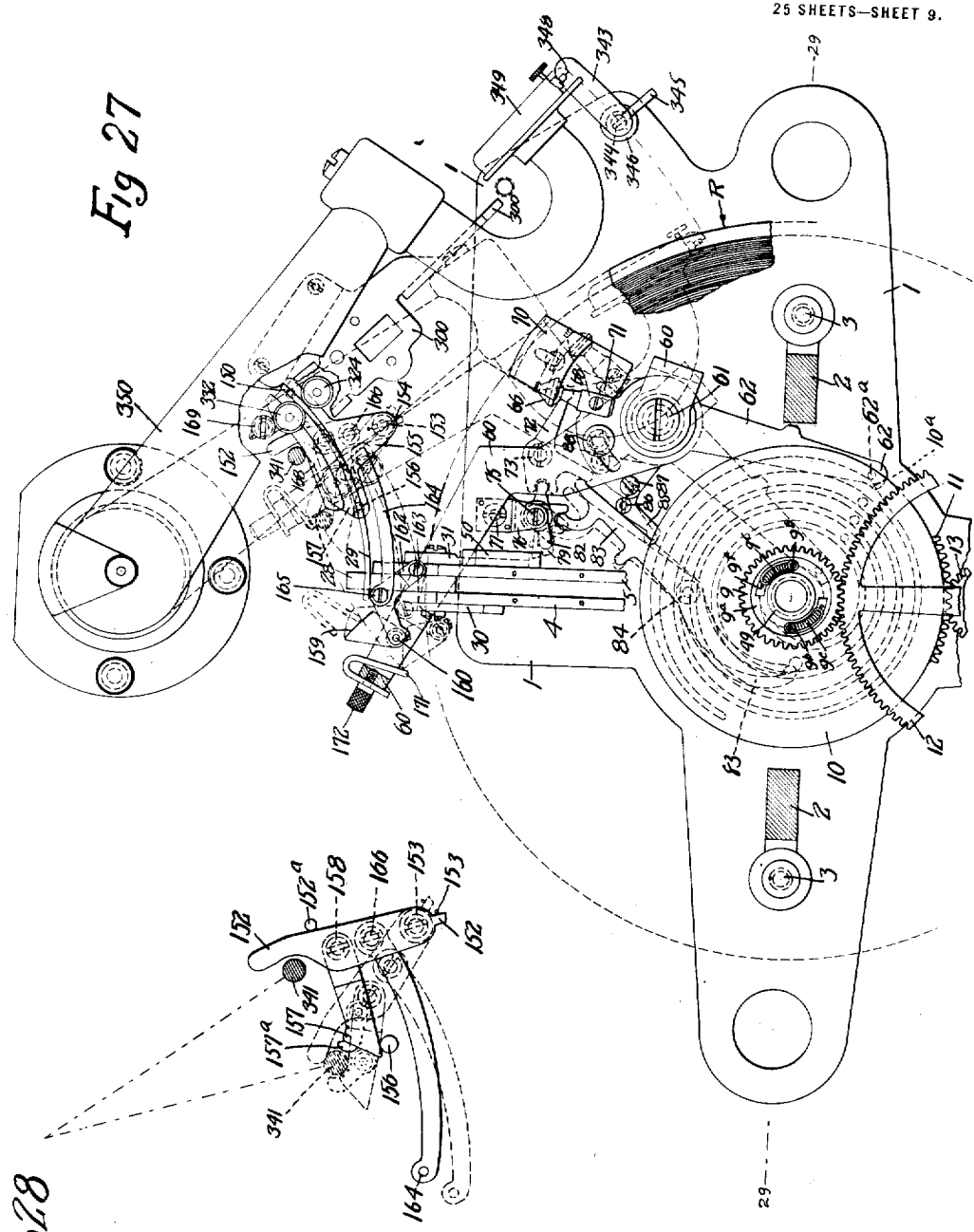

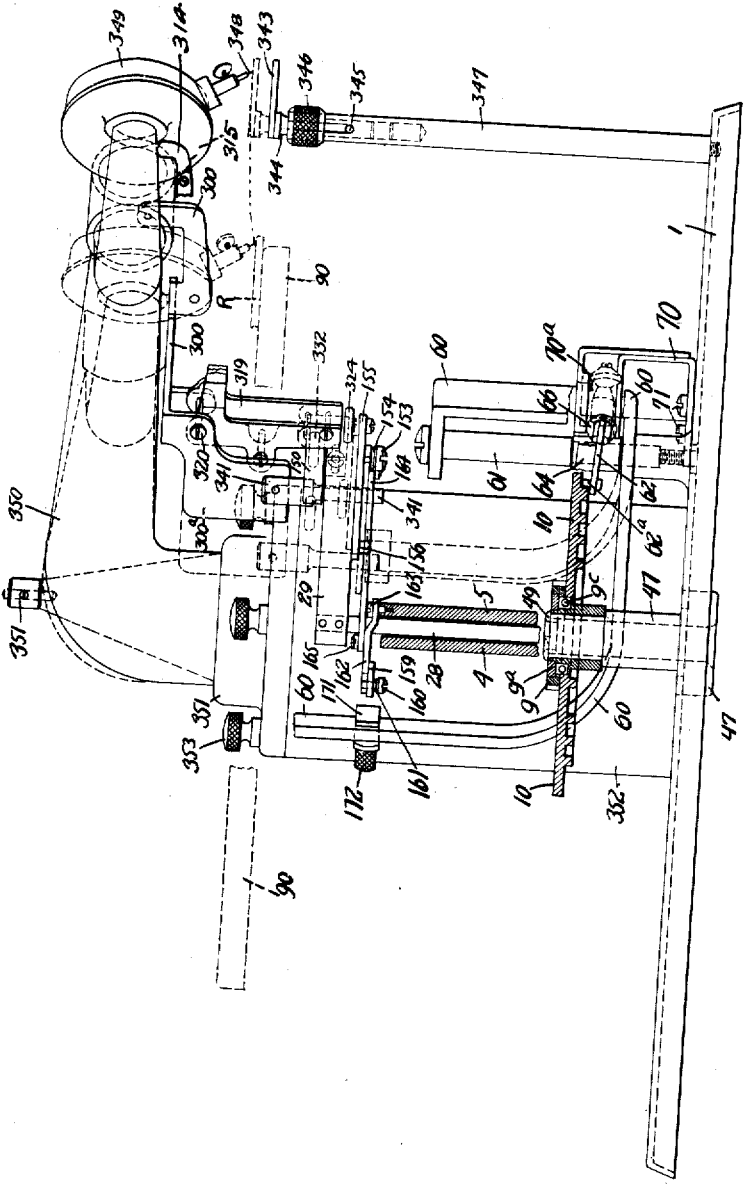

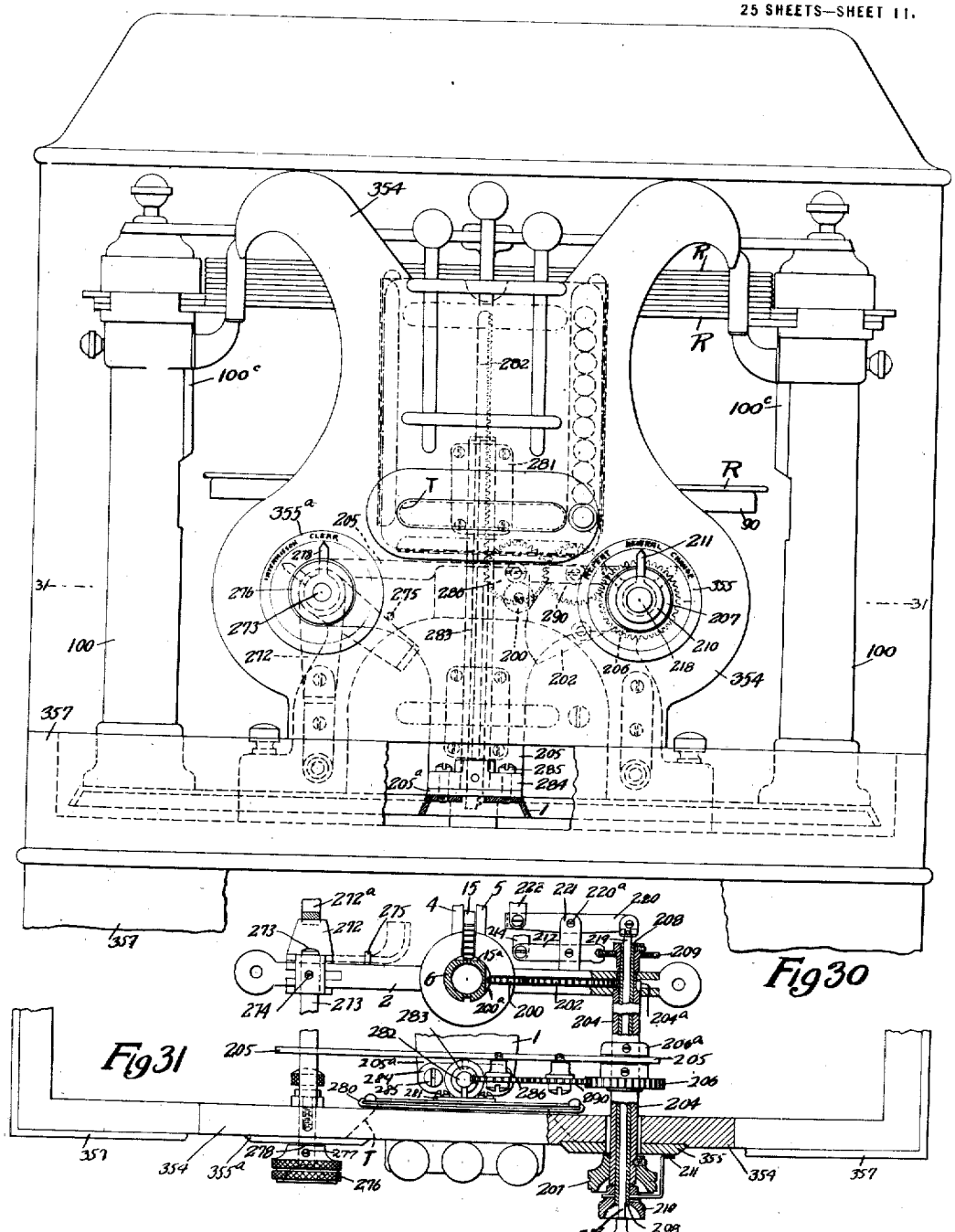

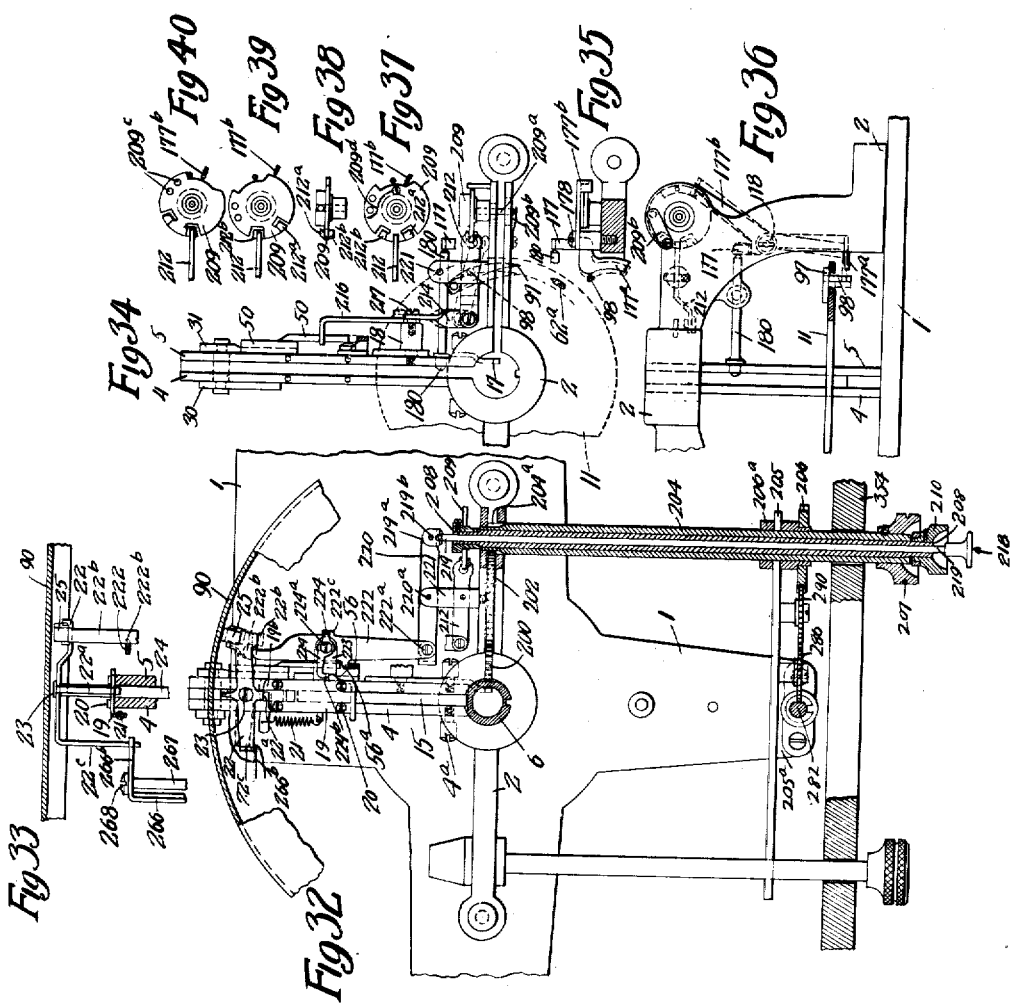

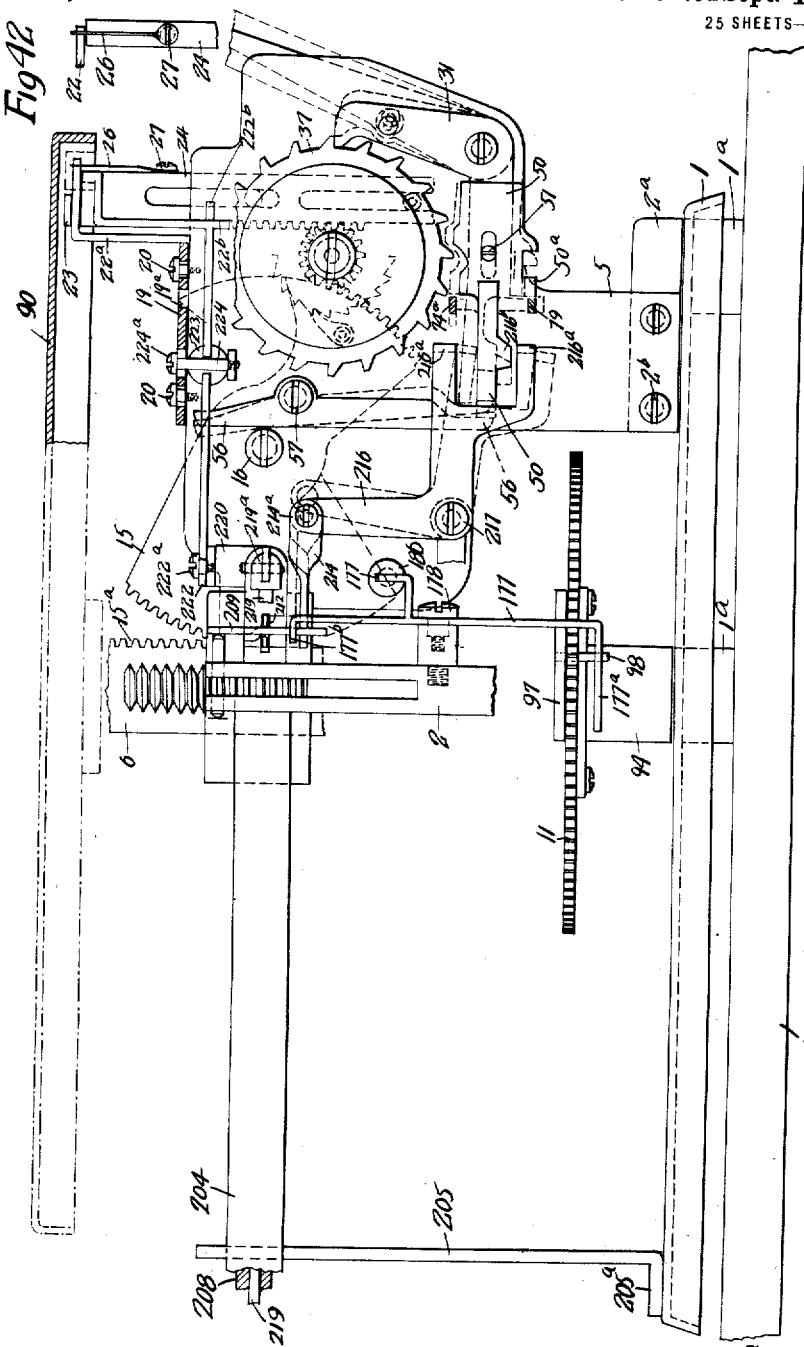

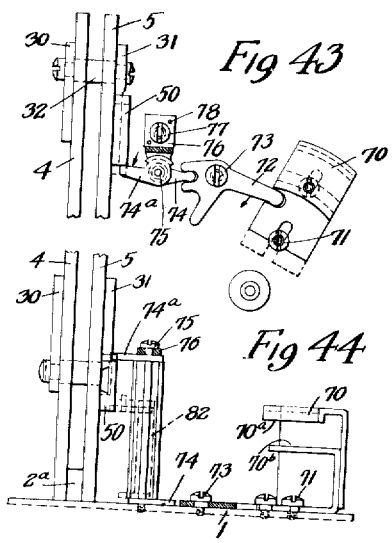
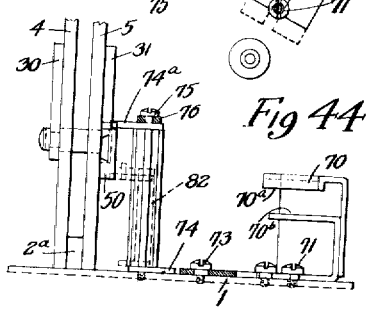
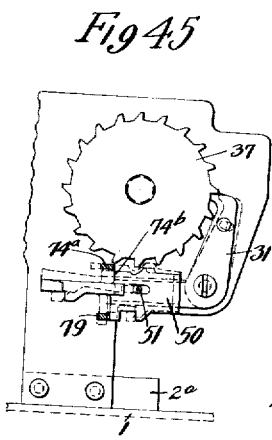
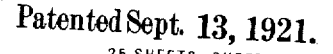
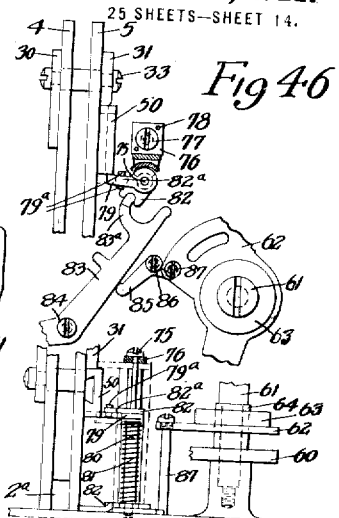
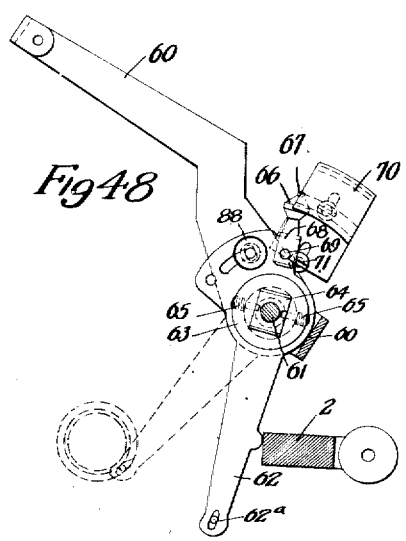
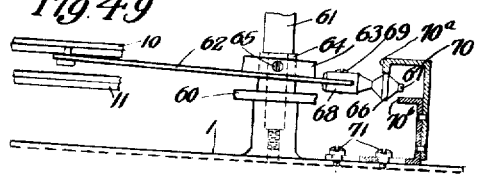
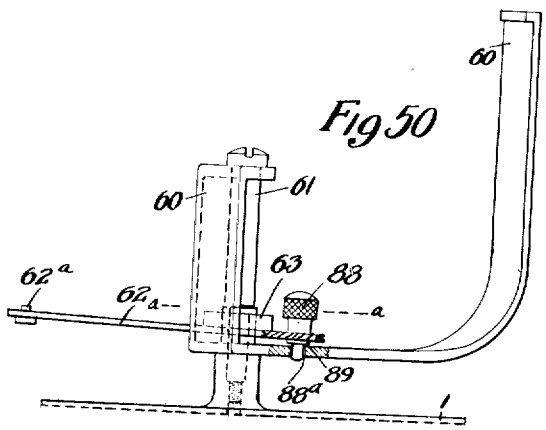
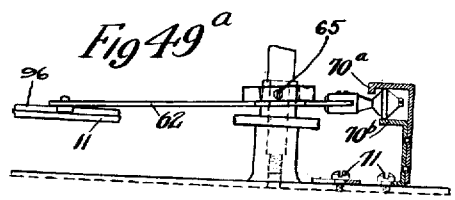

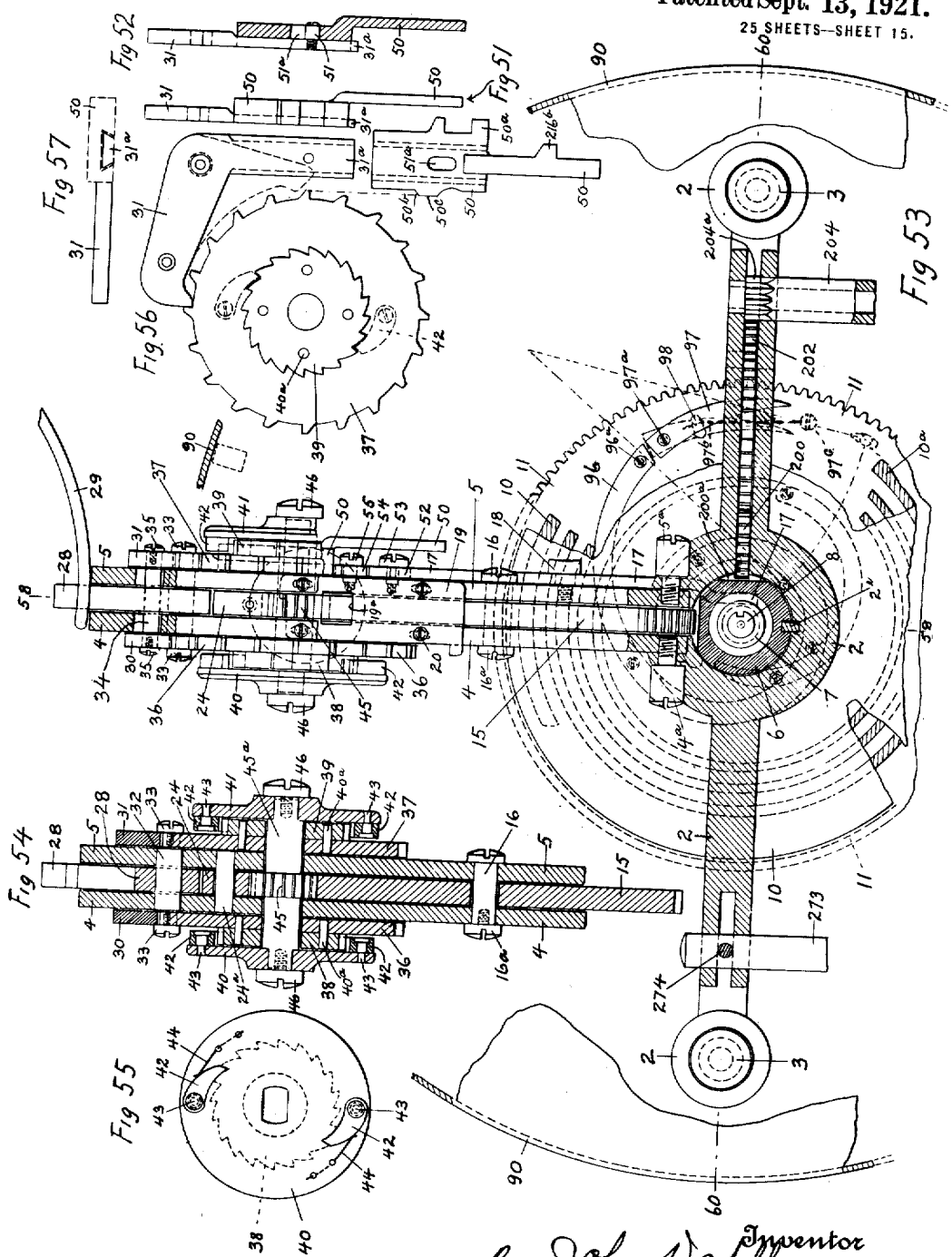

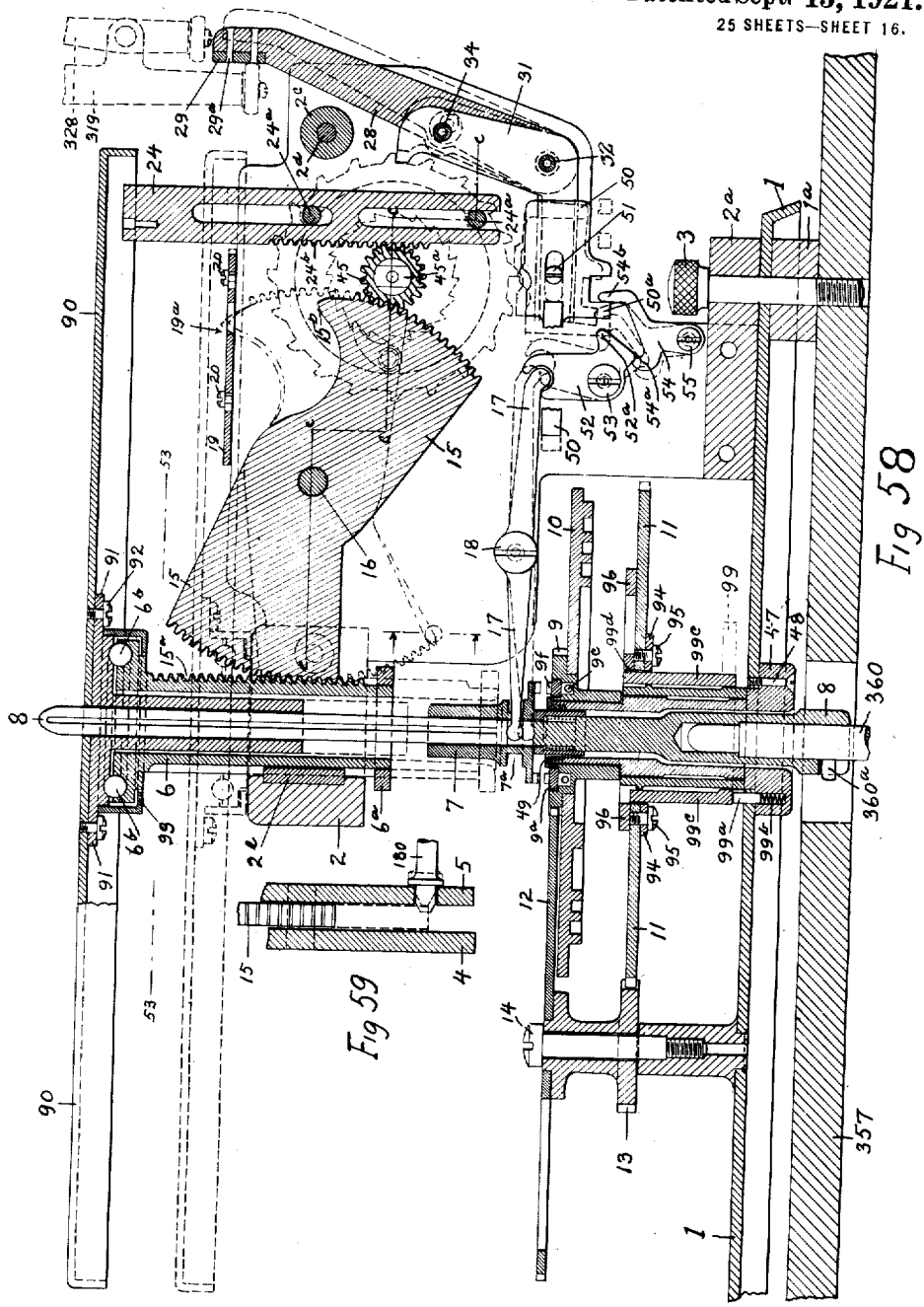

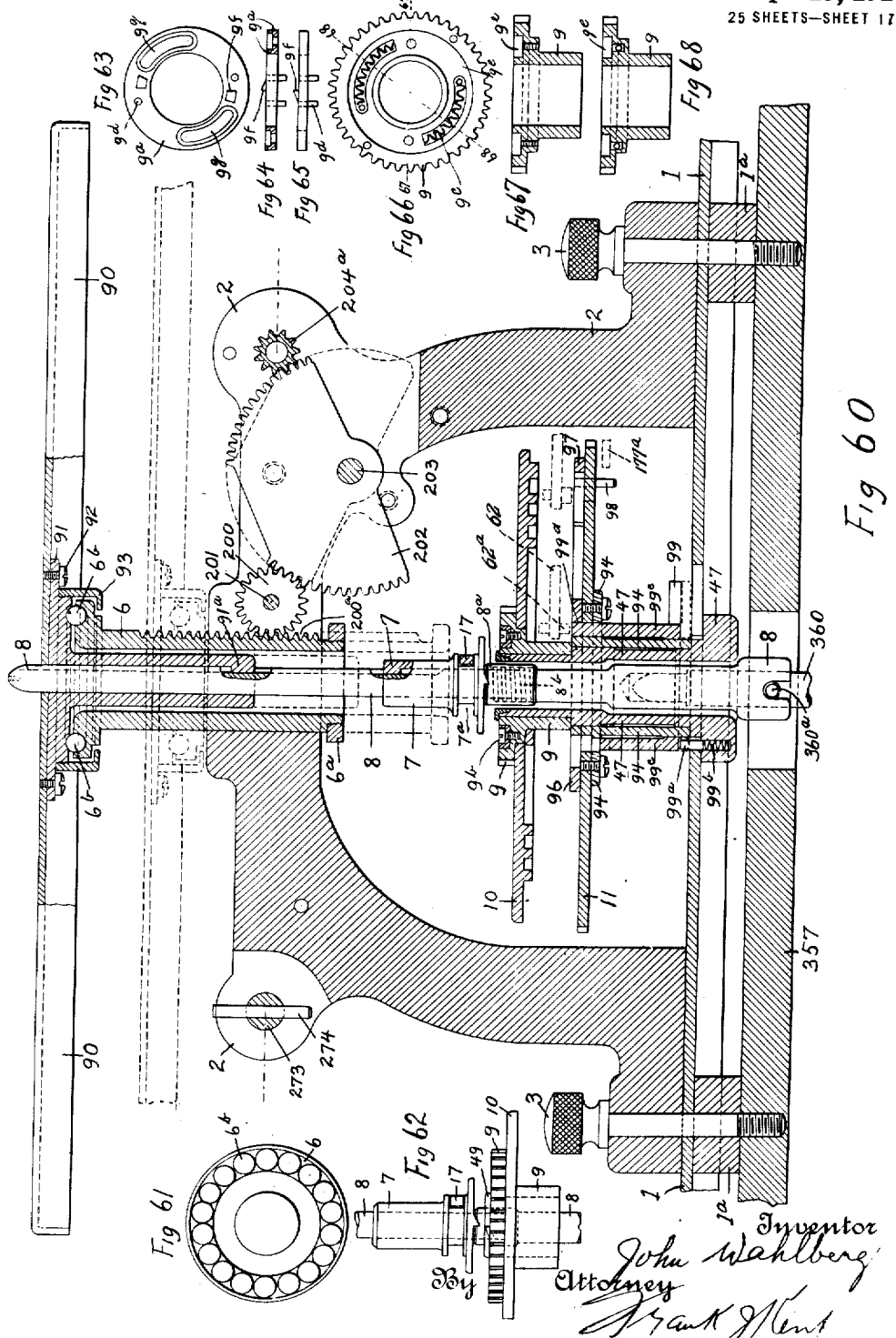

J. WAHLBERG.
PHONOGRAPH.
APPLICATION FILED JUNE 22, 1920.
1,390,404.
Patented Sept. 13, 1921.
25 SHEETS—SHEET 18.
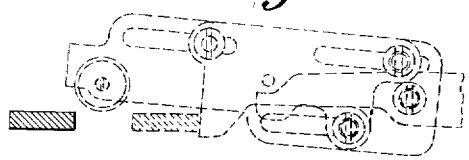
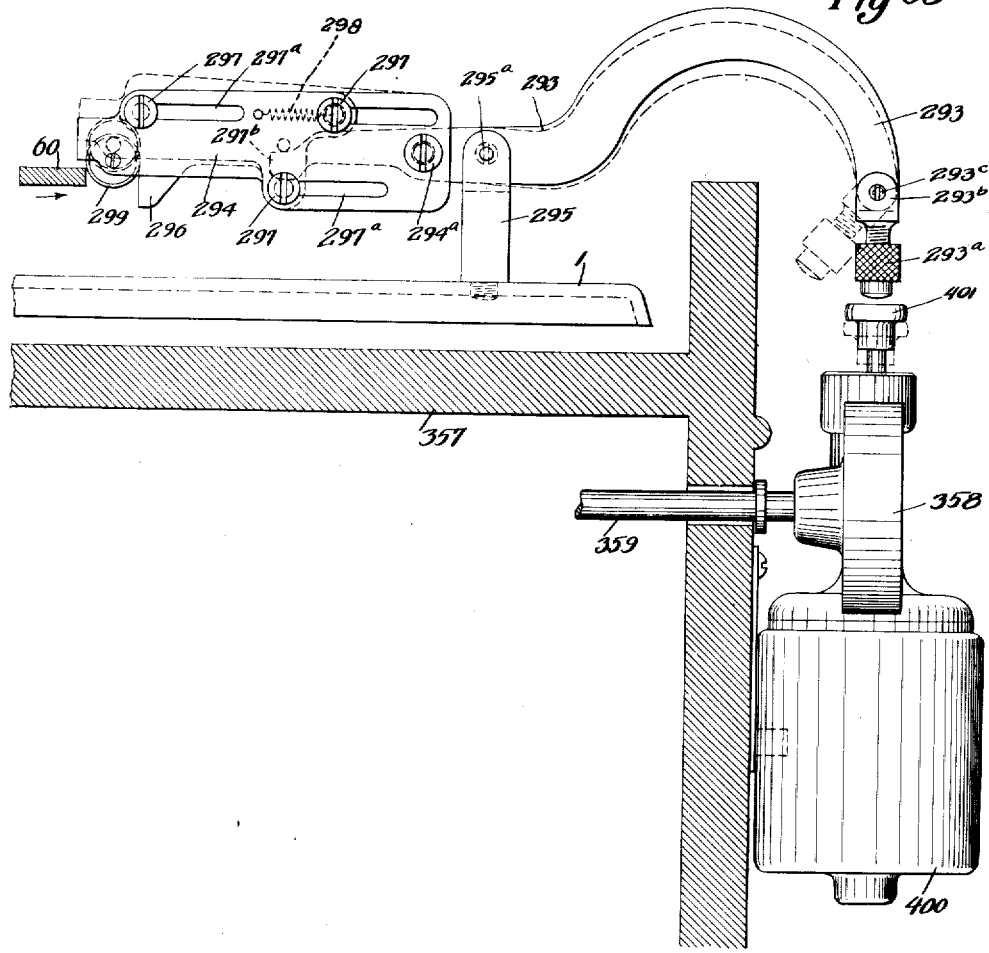
INVENTOR
John Wahlberg
BY
Frank J. Kent
ATTORNEY

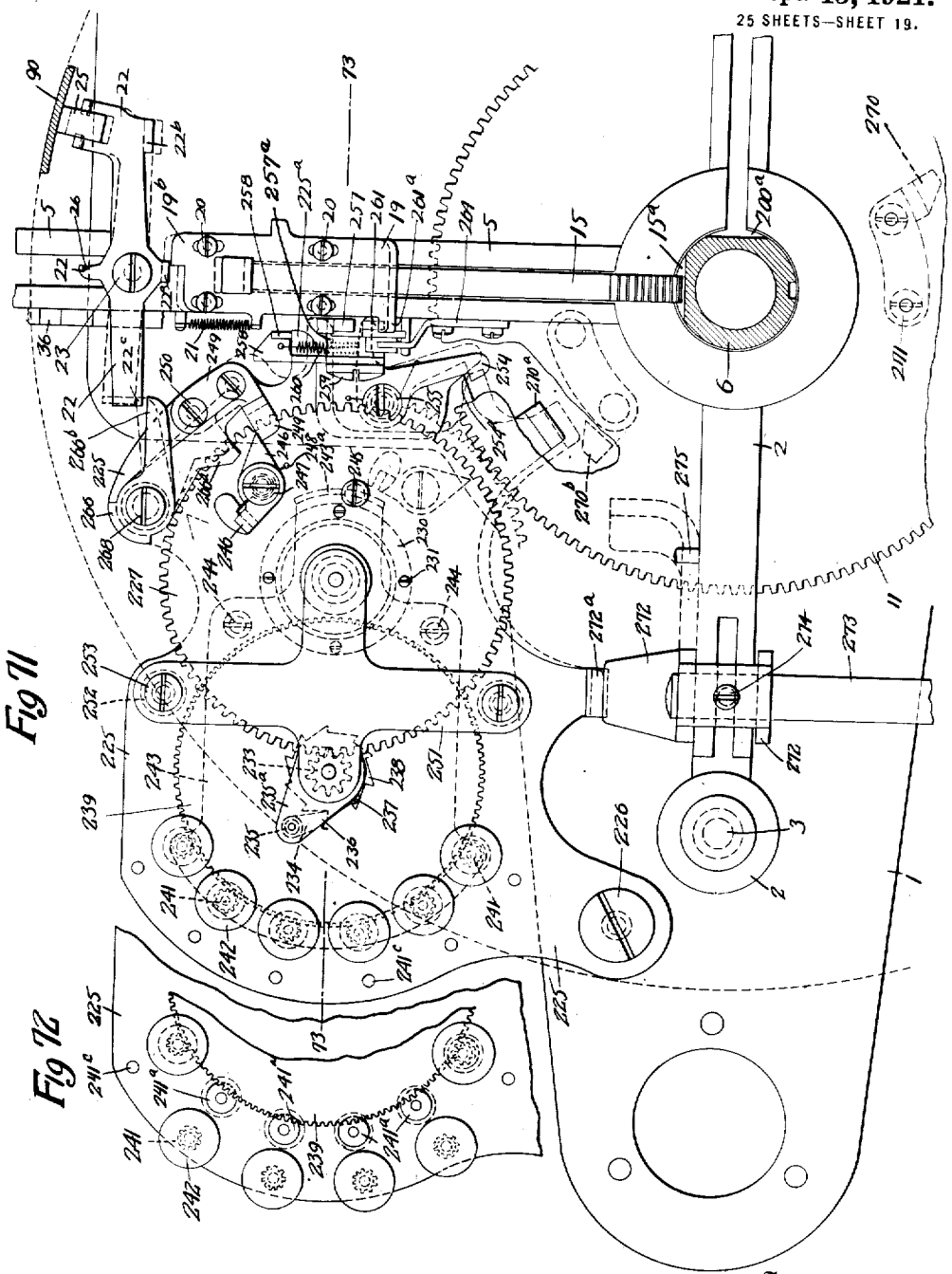

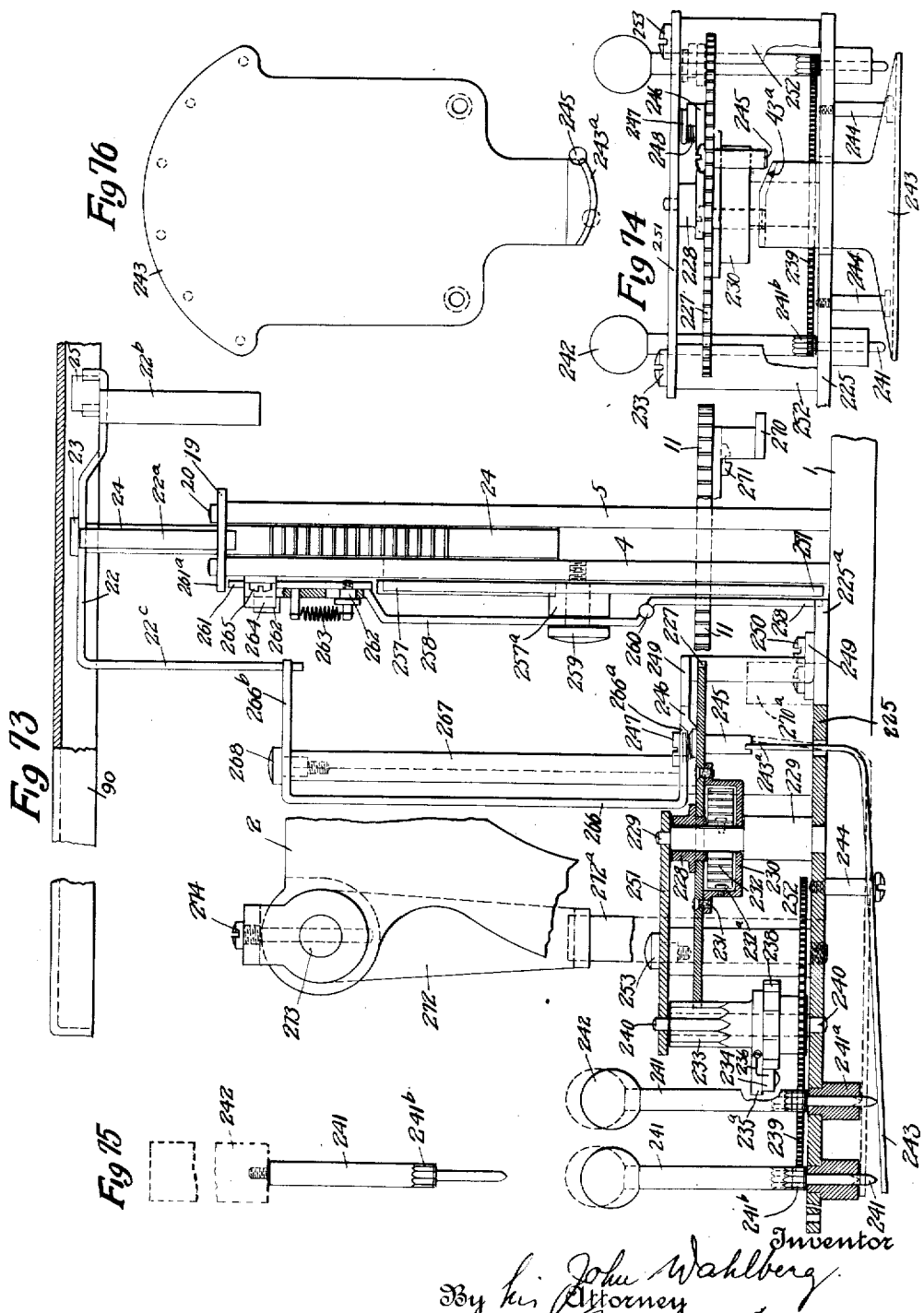

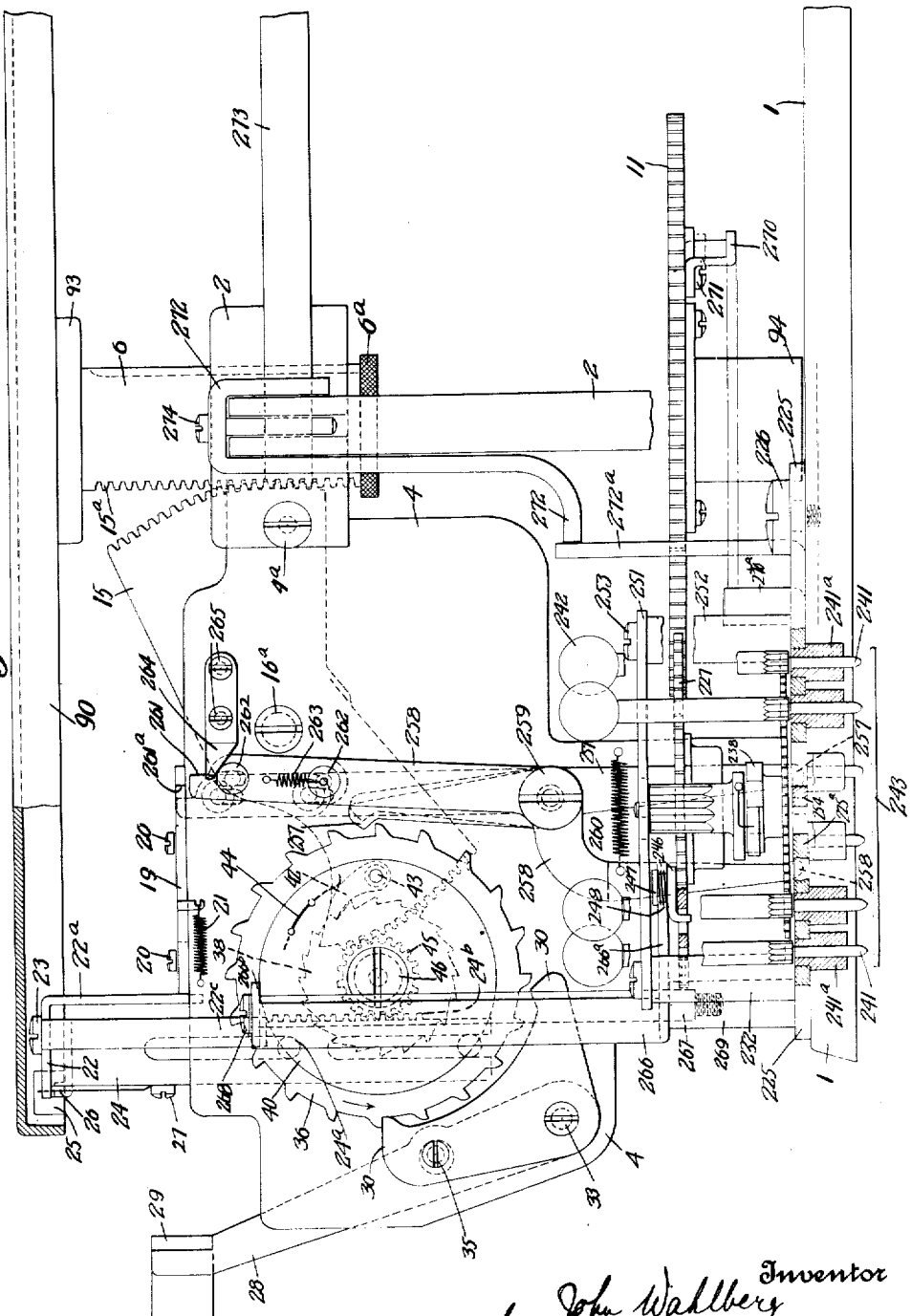

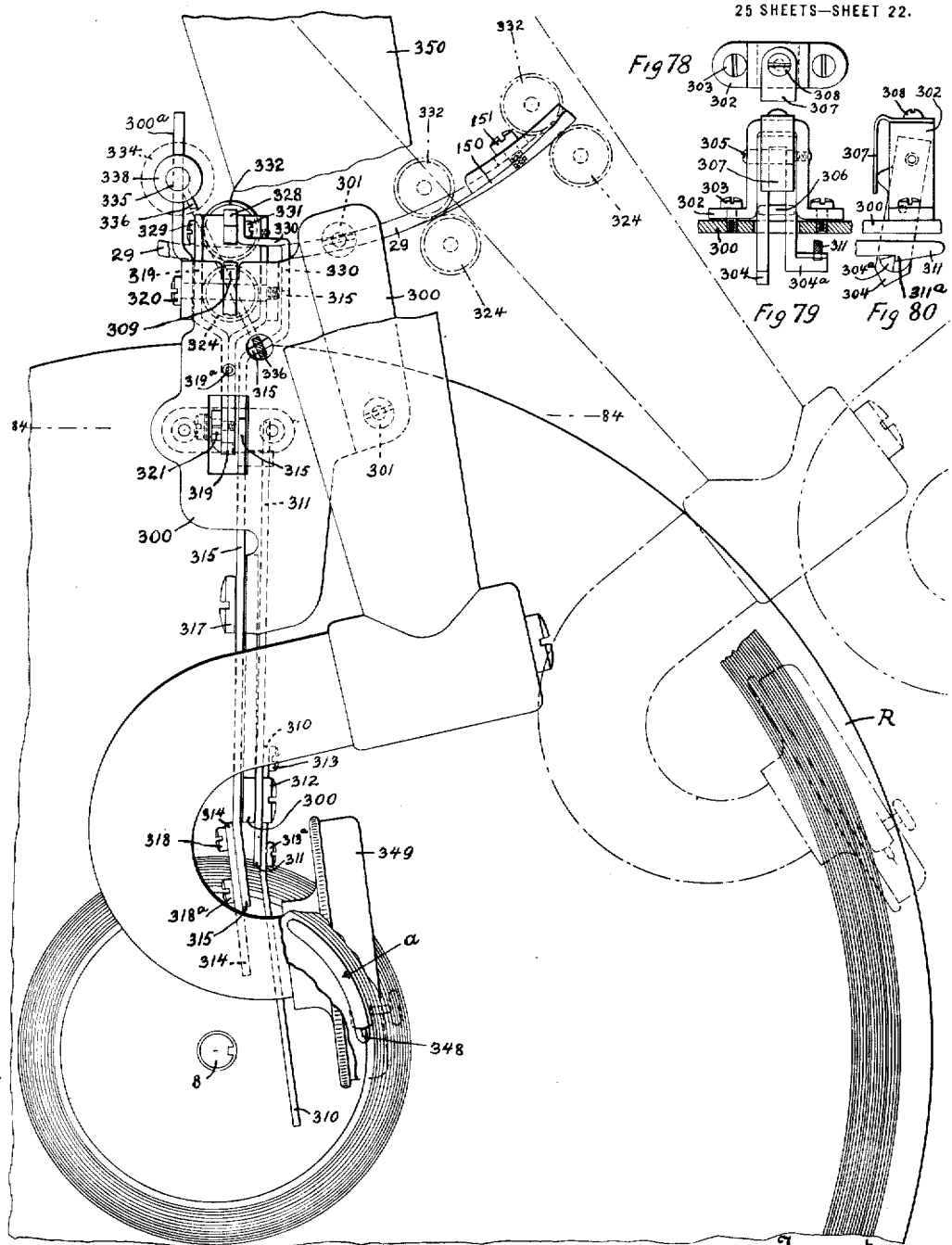

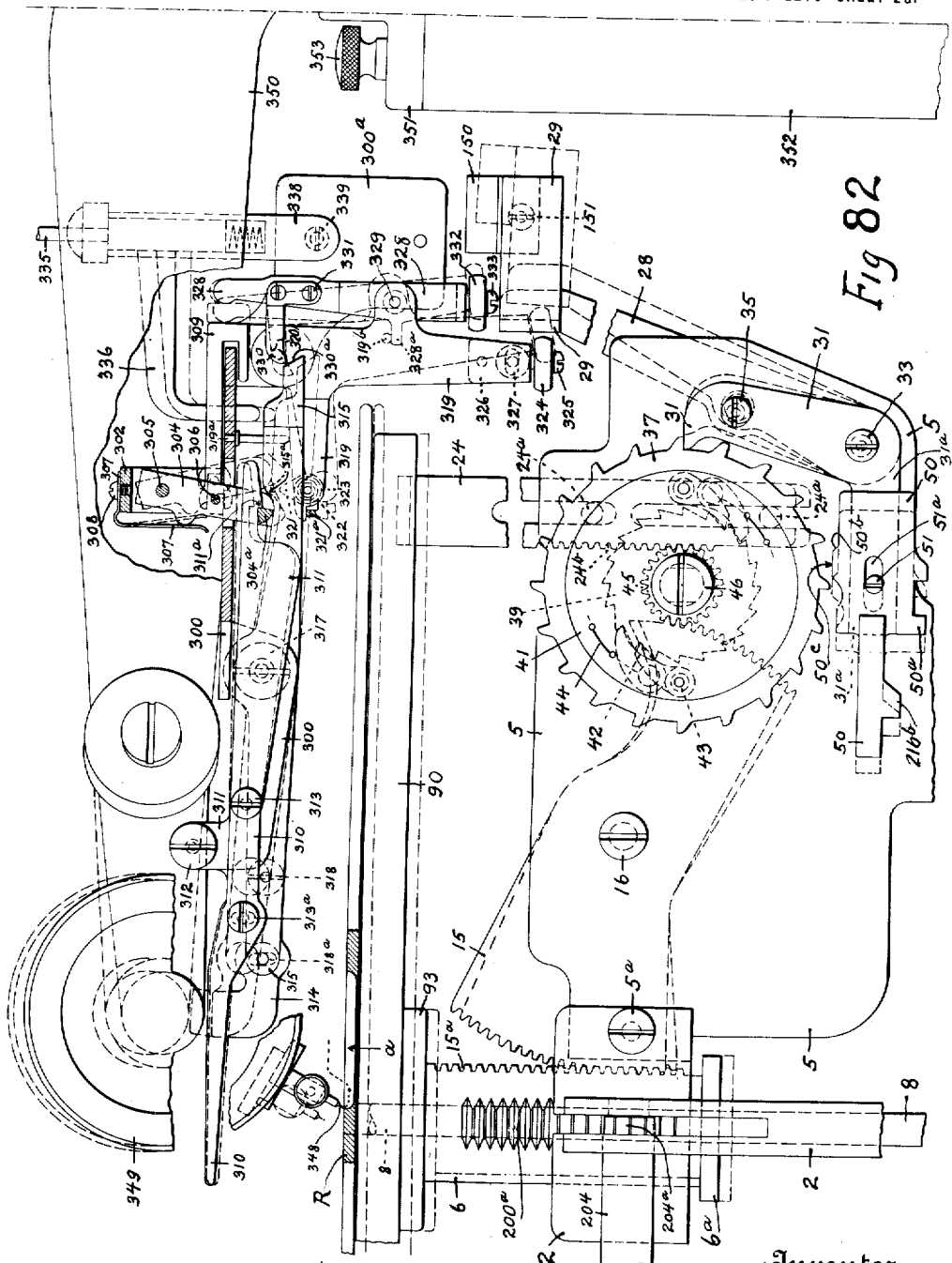

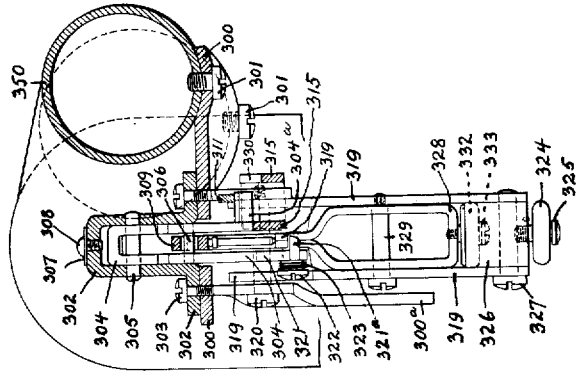
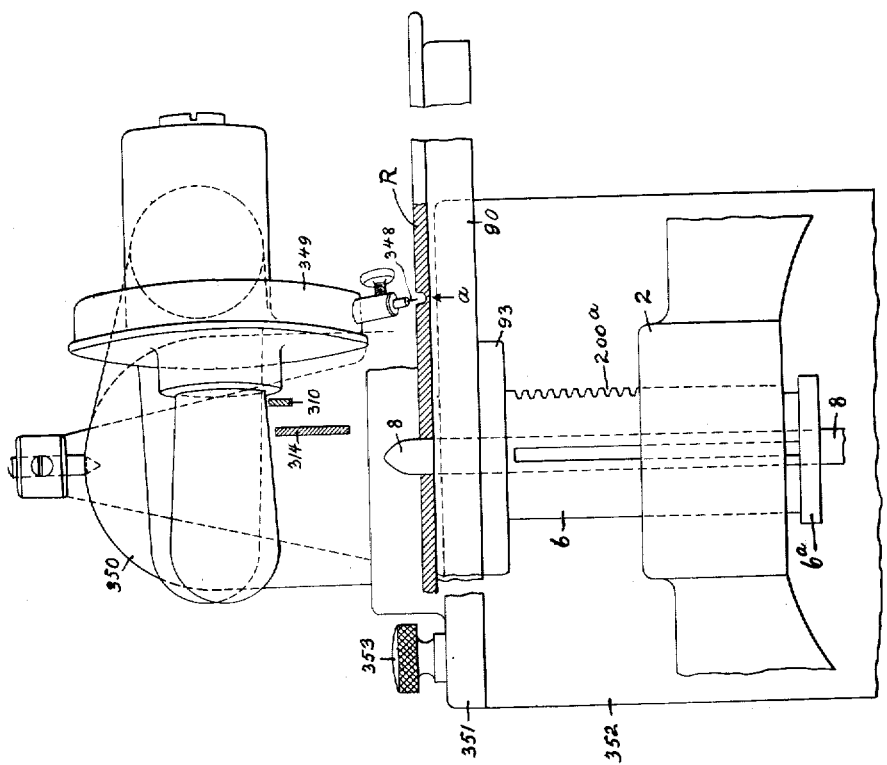

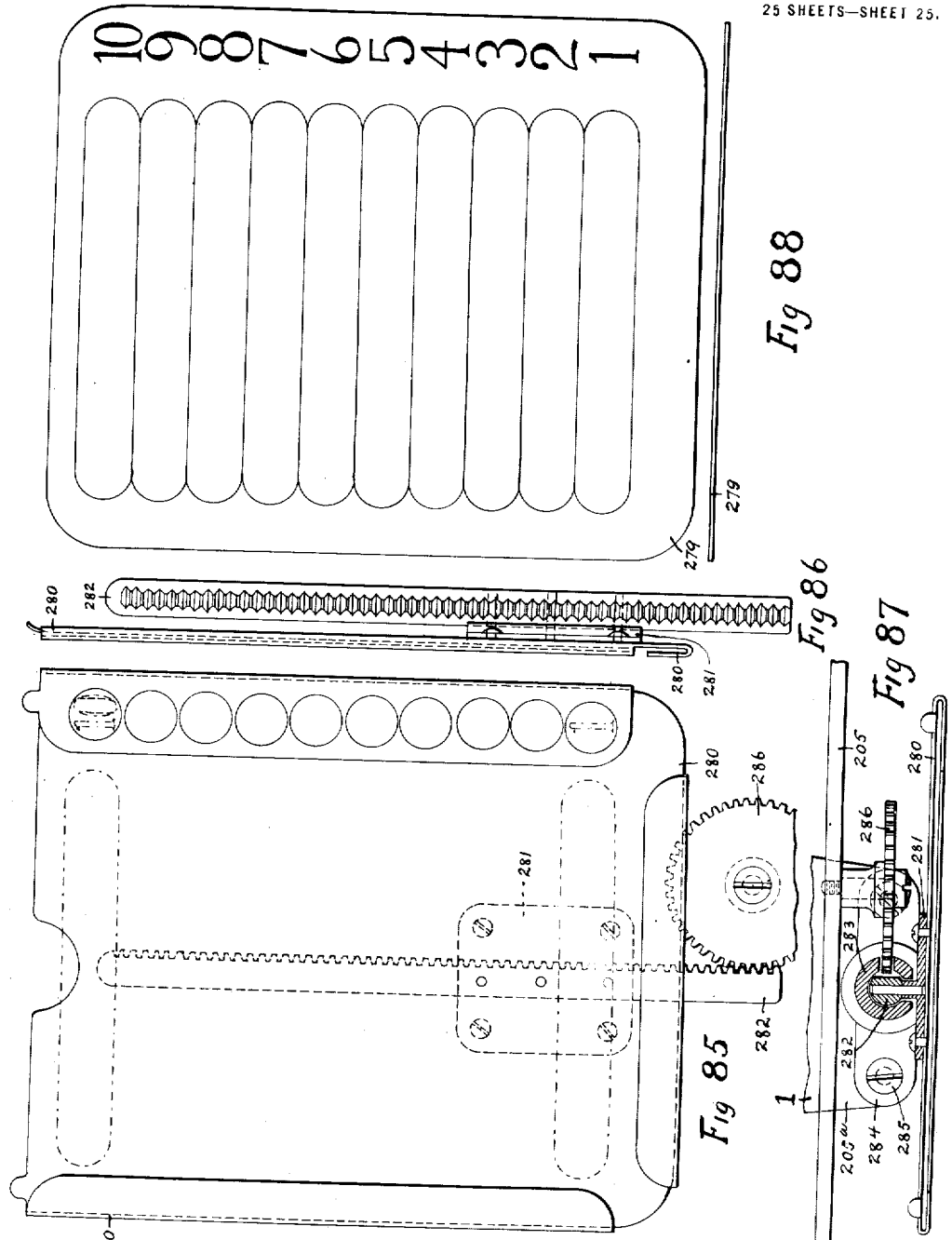

UNITED STATES PATENT OFFICE.

JOHN WAHLBERG, OF NEW YORK, N. Y.

PHONOGRAPH.

1,390,404.  Specification of Letters Patent.  Patented Sept. 13, 1921.

Application filed June 22, 1920. Serial No. 390,789.

*To all whom it may concern:*

Be it known that I, JOHN WAHLBERG, a citizen of the United States, residing at New York, in the county of New York and State of New York, have invented certain new and useful Improvements in Phonographs, of which the following is a specification.

The general objects of this invention are to provide practical and successful mechanism for automatically changing the records of a phonograph.

Special objects of the invention are to accomplish the changing of the records rapidly and with accuracy and certainty.

Other objects are to enable the automatic playing of the records in a definite sequence, with or without an intermission therebetween, as may be desired, and also to enable the omission of any undesirable records or the repetition of any of the records or any portions thereof.

Another important object is to provide the mechanism in such form that it may be readily applied to standard phonographs, and in such way as to utilize the power of the phonograph motor for the purpose of changing the records.

In connection with the automatic operation, it is one of the objects of the invention to provide a visible indicator which will furnish the audience a program and give notice of the selections or subjects as they are about to be rendered.

My invention furthermore aims to accomplish the above without interfering with the use of the phonograph in the usual way and permitting the operator to control the machine as may be desired.

According to a preferred embodiment of the invention, the records are supported in superposed relation in a stack above the turn-table, and at the end of the playing of a record on the turn-table, the stylus carried by the sound-box is tripped by means of a depression provided at the end of the sound groove this tripping impulse of the sound-box being utilized to free a power device which operates to lift the stylus off the record and in turn operates an index mechanism to lower the turn-table which throws into operation devices which swing the stylus to one side, lower a fresh record on the turn-table and then return the stylus and lower the same on the new record. When the turn-table is lowered a program carrier is shifted to display or announce the title of the selection about to be played.

A special feature of the invention is the fact that the records are actually lowered and placed upon the turn-table instead of being simply "dropped" thereon as has been proposed heretofore.

Other special features relate to the manner in which the tone-arm is swung to one side and then positively "held" in that position while the new records are being lowered, and also to the manner in which the tone-arm is then swung back over the records and temporarily restrained while the stylus is gradually and easily lowered into engagement with the record groove.

Other special features relate to the provision of means by which the stylus may be lifted from the record at any point in the playing of a piece and means by which the mechanism may be tripped at any time to stop the playing of a record and to substitute a new record therefor. An important feature relates to the utilization of the weight of the sound-box as a means for operating the trip lever.

Another important feature is the utilization of the lowering force of the turn-table as a power for throwing the tone-arm swinging and record-feeding mechanism into operation.

Many other novel and important features of the invention will appear as the specification proceeds.

In the accompanying drawings I have illustrated the invention embodied in one of its practical commercial forms but as this illustration is primarily for purposes of disclosure it will be understood that the invention is not limited to this particular form of structure and that it may be modified in many respects without departure from the true spirit and scope of the invention as herein defined and claimed. I wish it further understood that the terms which I have employed herein are used in a descriptive rather than in a limiting sense, except however for such limitations that may be imposed by the state of the prior art.

In the drawings referred to:

Figure 1 is a plan and sectional view of the apparatus, the section through the central hub being taken on substantially the plane of line 1—1 of Fig. 2, with fragmentary parts of a record and the rim of the turn-table indicated at R and at S respectively, and with a part of the tone-arm broken away at B to expose parts beneath the same;

Fig. 2 is a vertical sectional view of parts of the apparatus between the planes of lines 1—1 and 2—2 of Fig. 1, but with the tone-arm swung inward and with the stylus about to enter the controlling depression at the end of a sound groove, the record being indicated in section at this point as is also the rim of the turn-table, and certain of the parts are indicated in tripped position in the dotted lines. The tone-arm is shown as broken away to expose parts behind the same and the window in the front of the casing for exposing the title of the record is shown at T.

Fig. 3 is a sectional view of parts between the planes of lines 3—3 and 1—1 of Fig. 1, with the tone-arm in the same position as in Fig. 2 and with portions of the cam mechanism, the manually operable means for lifting the sound-box and the intermission movement broken away and shown in section;

Fig. 4 is a broken plan view of the record magazine and supporting devices;

Fig. 5 is a vertical sectional view of said parts, as on substantially the plane of line 5—5 of Fig. 1, indicating the record lowering fingers and the record controlled thereby, in different positions;

Fig. 6 is a cross sectional view of one of the supporting columns, as taken on substantially the plane of line 6—6 of Fig. 5;

Fig. 7 is a broken plan and partly sectional view on substantially the plane of line 7—7 of Fig. 5, showing in dotted lines the gearing below the base plate at the foot of the columns and details related to the index mechanism;

Figure 1:
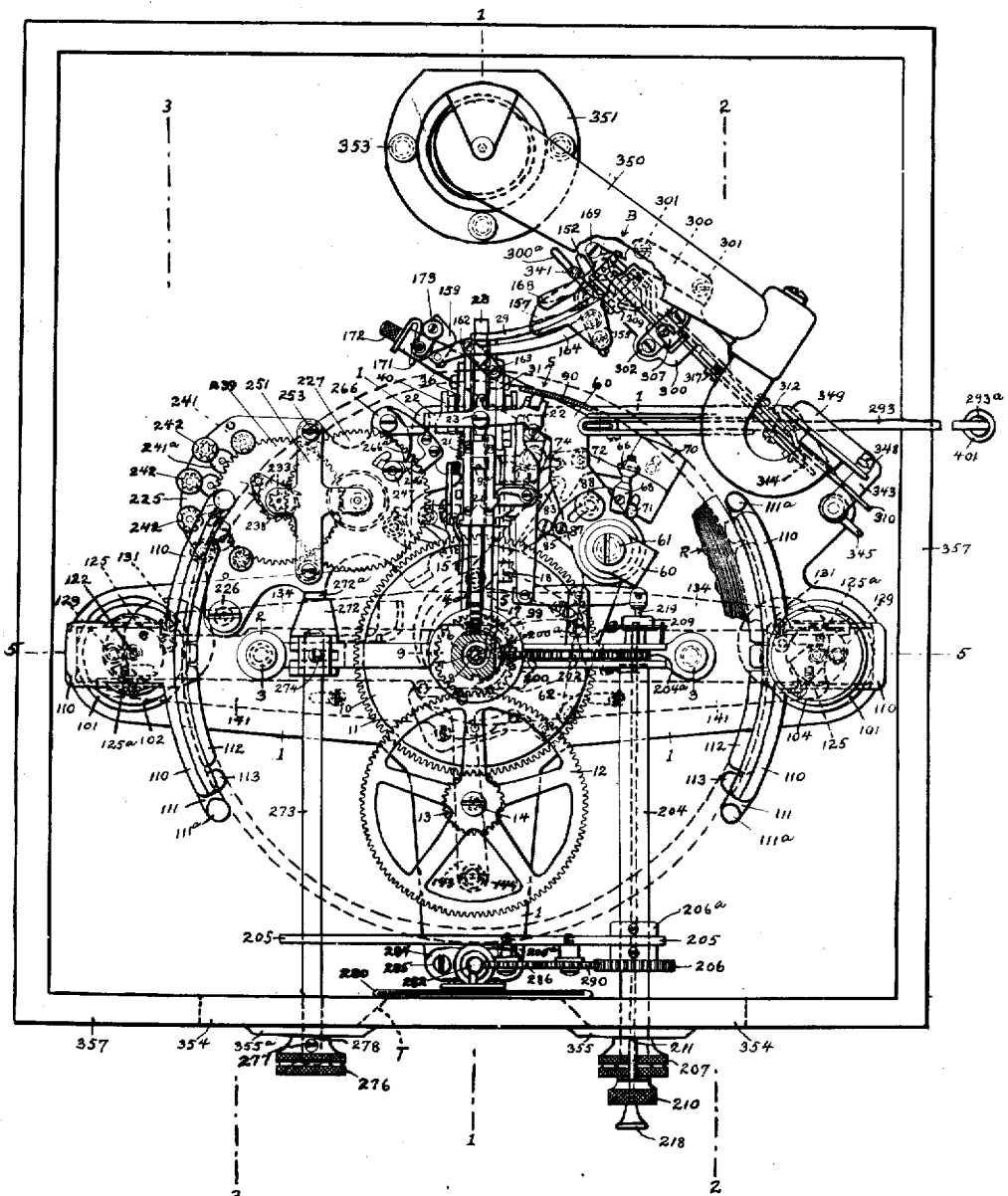

Figs. 7ª and 7ᵇ are detail plan views of the segment actuating spindles;

Fig. 8 is a broken plan of lever 143 and rack bar 141 below the base plate;

Fig. 9 is a broken detail view of the rotatable cam 99 and correlated parts;

Fig. 10 is a vertical sectional view similar to Fig. 5, illustrating other steps in the lowering of the records onto the turn-table;

Fig. 11 is a detached detail view of cam 99;

Figs. 12, 13, 14, 15, 16 and 17 are detached detail views of the arcuate record separating and supporting slides and arcuate record-guiding and spacing plates;

Figs. 18, 19 and 20 are sectional, plan and side views respectively of the upper or head portion of one of the columns;

Fig. 21 is a view on a somewhat enlarged scale, looking toward the record shifting slides and fingers appearing at the left in Fig. 4;

Fig. 22 is a plan and sectional view as on substantially the plane of line 22—22 of Fig. 21 and showing the record lowering finger 113, in retracted position in dotted lines;

Fig. 23 is a broken detail view of the lower end of the columns shown in Fig. 21;

Fig. 24 is an enlarged broken plan view of parts illustrated in Fig. 1, illustrating a form of electric drive for winding the spring motor and showing particularly the parts for swinging the tone-arm clear of the record;

Fig. 25 is a diagrammatic view of the latch restoring mechanism indicated in dotted lines in Fig. 24;

Fig. 26 is a vertical sectional view on substantially the plane of line 26—26 of Fig. 24;

Fig. 27 is a horizontal sectional and plan view of parts taken on substantially the plane of line 27—27 of Fig. 2 and showing particularly the mechanism for swinging the tone-arm toward the turn-table;

Fig. 28 is an enlarged detail view of the yieldable parts which directly operate to swing the tone-arm toward the turn-table;

Fig. 29 is a vertical sectional view on substantially the plane of line 29—29 of Fig. 27, illustrating use of the mechanism for gaging the stylus and indicating in dotted lines the path traversed by the stylus in the swinging of the tone-arm from the gaging position over to the record playing position;

Fig. 30 is a front elevation of the apparatus, illustrating particularly the manual controls and the program indicator, the base plate being shown as partly broken away and in section;

Fig. 31 is a plan and part horizontal sectional view on substantially the plane of line 31—31 of Fig. 30;

Fig. 32 is a horizontal plan and sectional view, of the brake for the turn-table, the controlling means for the brake, and the control for the index mechanism and the vertical displacement of the turn-table;

Fig. 33 is a broken detail and part sectional view of the brake parts;

Fig. 34 is a plan and part sectional view of the index pawl lock control mechanism;

Fig. 35 is a broken plan and sectional view of the lever 177 which controls the cam point 97;

Fig. 36 is a front elevation of such parts;

Fig. 37 is a view of the index pawl controlling cam 209 in normal position;

Fig. 38 is an edge view of the same in such position;

Figs. 39 and 40 are views similar to Fig. 37, showing the cam 209 as turned to lock the index pawl, and to lower the turn-table, respectively;

Fig. 41 is a side elevation of the indexing mechanism and other parts illustrated in Figs. 32 to 40, on the order of Fig. 2, but drawn on a larger scale;

Fig. 42 is a detail of the spring operating on the brake lever;

Fig. 43 is a broken and part sectional plan view of the mechanism for operating the tilting or rocking arm actuating slide 70, with the index pawl locking slide 50 shown in dotted lines in projected positions;

Fig. 44 is a sectional elevation of these same parts taken looking upwardly toward Fig. 43;

Fig. 45 is a detail of the index pawl and locking slide in different positions, shown by full and dotted lines;

Fig. 46 is a plan and sectional view, similar to Fig. 43 illustrating the index pawl locking slide restoring mechanism;

Fig. 47 is a broken and part sectional front elevation of these parts;

Fig. 48 is a plan view, with parts in section, of the tilting or rocking arm 62, the actuating slide 70 therefor, and the tone-arm swinging lever 60;

Figs. 49 and 49ᵃ are fragmentary side views showing how arm 62 is tilted or rocked by the slide 70;

Fig. 50 is another edge view, omitting the slide but including the tone-arm swinging lever 60;

Figs. 51 and 52 are plan and part sectional views respectively of the index pawl and the locking slide thereon;

Fig. 53 is a plan and sectional view illustrating particularly the gear segment 15 and index mechanisms and taken on substantially the plane of line c—c of Fig. 58;

Fig. 54 is a horizontal sectional view of the index and turn-table supporting segment mechanism, as taken on substantially the plane of line c—c of Fig. 58;

Fig. 55 is an inner face view of one of the pawl carrying disks, with the ratchet of the index wheel which the pawls engage, indicated in dotted lines;

Fig. 56 is a detail of one of the index wheels with the pawls which engage the ratchet thereof, indicated in dotted lines and showing the near index pawl with the locking slide disengaged therefrom and the other or far-side index pawl in dotted lines;

Fig. 57 is an end view of the index pawl with the locking slide indicated in position thereon in dotted lines;

Fig. 58 is a vertical sectional view on substantially the plane of line 58—58 of Fig. 53 showing particularly the turn-table indexing and brake raising and lowering mechanism and the clutch operating devices;

Fig. 59 is a broken sectional view illustrating operation by the turn-table lowering segment 15 of the plunger 180 which causes the point 97 on the snail cam 96 for swinging the tone-arm to be rendered inoperative after the last record is played;

Fig. 60 is a vertical sectional view on substantially the plane of line 60—60 of Fig. 53, with parts broken away to illustrate the manner in which the turn-table and the clutch are slidably keyed on the vertical extension spindle 8 and illustrating the manner in which the turn-table supporting bushing 6 is elevated by gears 200, 202 and pinion 204ᵃ;

Fig. 61 is a plan view of the turn-table supporting bushing 6 and the ball race carried thereby;

Fig. 62 is a broken side elevation of the clutch which couples the vertical spindle 8 to the drive gear 9;

Figs. 63, 64 and 65 are plan, cross-sectional and side views respectively of the lower clutch element or ring;

Fig. 66 is a plan of the clutch driven gear 9 with which the clutch ring is connected by a shock absorbing connection, the shock absorbing springs of such connection appearing in this view;

Figs. 67 and 68 are cross-sectional views of this gear on substantially the planes of lines 67—67 and 68—68 of Fig. 66;

Figs. 69 and 70 are views of the control mechanism for the electric motor which winds the spring motor of the phonograph;

Fig. 71 is a broken plan view of parts constituting the "intermission movement" with the timing elements set for relatively "long" intermissions;

Fig. 72 is a broken detail showing all but the two of the timing elements disengaged and the parts set for a relatively "short" intermission;

Fig. 73 is a broken vertical sectional view taken partly on the plane of line 73—73 of Fig. 71;

Fig. 74 is a broken end view of the intermission attachment, taken looking toward the left in Fig. 73;

Fig. 75 is a detached view of one of the rotary "drags" or timing elements, illustrating in dotted lines a different and heavier style of weight than the ball type shown in Figs. 73 and 74;

Fig. 76 is a plan view of the plate for ungearing the active timing element or elements at the end of the elapsed period and illustrating the manner in which it is operated by the stud 245 on the spring barrel gear 227;

Fig. 77 is a view taken looking toward the left of Fig. 73 with different parts broken away, shown in section and indicated in dotted lines;

Fig. 78 is a detached plan view of the arched support 302 for the pivoted cam lever 304;

Figs. 79 and 80 are front and right side elevations of the same showing the cam lever 304 as restrained by the latch 311ᵃ;

Fig. 81 is a broken plan view of the tone-arm bracket 300 and parts carried thereby, showing the tone-arm in full lines in the inner position at the end of playing a record, in dot and dash lines at the commencement of playing and in dash and two dot lines as swung outward, clear of the record, the tripping depression in the record being indicated by arrow a;

Fig. 82 is a right side elevation and broken sectional view of the tone-arm, the trip lever and lifting mechanism for the sound-box, the stylus of the sound-box being shown as about to drop in the tripping depression at the inner end of the sound groove in the record;

Fig. 83 is an end view of the tone-arm, with the trip lever 310 and lifting lever 314 shown in section beneath the pivoted elbow of the tone-arm and with the record broken away and shown in section and the stylus in the act of dropping in the tripping depression;

Fig. 84 is a cross-sectional view of the tone-arm on substantially the plane of line 84—84 of Fig. 81, indicating the manner in which the bracket 300 is secured to the under side of the tone-arm;

Fig. 85 is a front view of the program or title card holder and the gear which operates the same;

Fig. 86 is a side elevation of the holder;

Fig. 87 is a horizontal sectional and plan view of the card holder as mounted in its support;

Fig. 88 illustrates face and edge views of the program or title card.

Referring to the several parts now by reference characters:

1 designates a base plate carrying a supporting frame 2 and shown as secured by dowel screws 3 to the base 357 of the phonograph cabinet, cushions 1ª being shown as positioned beneath the base plate to form shock-absorbing feet. Attached to or forming a part of the central or hub portion of the frame 2 (see particularly Figs. 1, 2, 3, 53 and 58) are two spaced rearwardly extending side plates 4 and 5 which support the indexing mechanism and which are shown as detachably secured to the central hub of the frame 2 by the screws 4ª and 5ª, Fig. 53.

*Turn-table.*

The turn-table which is designated 90, is shown as supported by a bushing or sleeve 6 guided for vertical sliding movement in the hub portion of the supporting frame 2, said bushing carrying a ball race at its upper end (Figs. 58 and 60), and the turn-table having a corresponding ball race at the under side thereof, between which are confined the balls 6ᵇ, which in conjunction with said races serve to concentrically guide as well as rotatably support the turn-table on the bushing. The turn-table is detachably confined to the bushing 6 by a flanged retaining ring 93 shown as screwed fast to the under side of the turn-table and as engaging beneath the outstanding head portion of the upper end of the bushing 6. The upward shifting movement of the bushing is shown as limited by means of a stop collar 6ª screwed onto the lower end of the bushing, and the bushing is positively held against turning movement in the vertical shifting thereof by means of a key 2ᵉ secured in the hub portion of the frame 2, and fitting in a vertical slot in the forward side of the bushing (Figs. 53 and 58).

The turn-table is rotated by means of a vertical extension spindle 8 slidingly keyed thereto as indicated at 91ª in Fig. 60, said spindle constituting an extension of the upright or drive shaft 360 of the phonograph motor, it being shown in Figs. 58 and 60 as socketed at its lower end to fit over the drive shaft 360 and as having a key slot to receive the driving pin or key 360ª on the drive shaft and forming at its upper end a guide for the records R on the turn-table (Fig. 5). This extension spindle construction provides for the ready application of the invention to an ordinary phonograph, and the sliding driving connection with the turn-table enables the turn-table to be driven irrespective of the vertical shifting movements of the same.

*Turn-table elevating mechanism.*

The turn-table is elevated by means consisting in the illustration of a control shaft 204 extended out through the front panel 354 of the phonograph, as shown particularly in Figs. 1, 2, 31 and 60 and provided at its outer end with a knob or hand-turn 207, and at its inner end with gear teeth forming a pinion 204ª in mesh with the teeth of an intermediate gear 202 pivotally supported in the frame 2 at 203 and meshing with a pinion 200 journaled at 201 and engaging a rack 200ª cut in the side of the turn-table supporting sleeve 6, (Fig. 60). It will be evident that by turning the finger hold 207 (Figs. 1 and 31), in a right-handed direction the turn-table will be elevated.

*Turn-table lowering mechanism.*

The turn-table is supported in its elevated and intermediate positions by means of a double-ended gear segment 15 pivoted at 16 in the side plates 4 and 5 and engaging at its forward end with a rack 15ª cut in the rearward side of the turn-table supporting bushing 6 and at its rearward end with a pinion 45 fast on the shaft 45ª (Figs. 53, 54, 58, 77, 82). This double-ended segment 15 and the pinion 45 operate between the side plates 4 and 5, and fastened on the outer ends of the pinion shaft by screws 46 are disks 40 and 41 (Figs. 54, 55), carrying pawls 42 pivoted at 43 on the inner faces of the disks, said pawls being yieldingly pressed by springs 44 into engagement with ratchets 38 and 39 affixed to the outer faces of the index wheels 36 and 37, which are loosely engaged on the pinion shaft 45ª. The turning movement of the index wheels 36 and 37 is governed by pawls 30 and 31 pivoted at the outer faces of the side plates 4 and 5 on a common pivot stud 32 and connected by a pin 34 (Figs. 53 and 54) so as to cause them to oscillate in unison. These index pawls are controlled from the tone-arm by means of an upwardly and rearwardly projecting trip lever 28 standing between the side plates 4 and 5 and connected with the pawls through the medium of the pivot 32 and pin 34, said trip lever carrying at its upper end an arcuate track 29 curved to suit the swing of the tone-arm and adapted to be engaged by a tripping device carried by the tone-arm. It will be evident that when the trip lever 28 is rocked rearwardly by the tripping device on the tone-arm, (Figs. 2 and 3) the index pawls will each be tripped from engagement with one tooth of the co-acting index wheel and will then be rocked back, by means later described, so as to engage the next tooth, this resulting in the lowering of the turn-table one step, or a distance substantially corresponding to the thickness of one of the records R on the turn-table. This lowering action is indicated in a general way by the dotted lines in Figs. 2 and 82. The pawl-and-ratchet connections between the index wheels and the pinion shaft 45ª form positive connections permitting lowering of the turn-table only by the index mechanism but permit of the raising of the turn-table through the elevating mechanism described without affecting such index mechanism, the pawls 42 on disks 40 and 41 simply riding over the teeth in ratchets 38 and 39 during the elevating movement while the index wheels remain inactive.

*Turn-table control.*

The rotary movement of the turn-table is controlled in the present disclosure, by a brake element 25 (Figs. 2, 3, 71 and 77), engaging the inner side of the turn-table rim and carried by a lever 22 pivoted at 23 on the top of a vertically shiftable rack 24 guided for vertical movement between the side plates 4 and 5 (Figs. 53 and 54) as by means of the pin-and-slot connections indicated at 24ª (Fig. 58) and provided at its lower forward edge with gear teeth in engagement with the pinion 45. This construction as will be seen causes the brake to follow the vertical shifting movements of the turn-table so that at any elevation of the turn-table the brake stands in proper position to control the same. The brake lever 22 is acted on by a spring 26 exerting tension to throw the brake into engagement with the turn-table rim but the operation of the brake is controlled both automatically and by hand, as will be later described.

*Record magazine.*

The records to be played are superposed in a stack as indicated particularly in Fig. 5 and in a general way in Fig. 30, and are supported in this relation in a magazine over the turn-table. This magazine is mounted on two upright tubular columns 100 standing on the base plate 1 at diametrically opposite sides of the turn-table and consists of a pair of opposed separating slides 110 having pointed or wedge-shaped edges to enter between the bottom and the second lowermost record, a pair of opposed guiding and spacing plates 111, and below these a pair of opposed supporting slides 112. The record-engaging portions of these so-called slides are in the form of arcuate plates or leaves as shown more clearly in Fig. 4, slidably fitted one over and the other under the guiding and spacing plates 111 at the upper ends of the columns. These record-shifting slides normally stand as shown in Figs. 1, 4 and 5, with the lower supporting slides 112 projecting into position to engage the bottom or lower record for the purpose of supporting the stack and with the separating slides retracted, free of the stack. As shown in the latter figure, and in detail in Figs. 12, 13, 16 and 17, these slides are made with rearwardly projecting lugs or base portions slidingly received in the opposed horizontal guide passages 100ᵇ provided in the upper ends of the columns. The separating slides and supporting slides 110 and 112 respectively slide diametrically of the turn-table in and out in these guide passages while the interposed spacing plates 111 remain stationary, serving as guides partly encircling the lower or bottom record and forming also supports carrying the upstanding guide pins 111ª. These stationary guide pins assist in guiding the records as they are placed in the magazine and hold them in the formation of a vertical stack.

Coöperating with the record-separating and supporting slides are the record-lowering fingers 113 which as shown in Figs. 4 and 21 have supporting portions standing at the ends of the arcuate supporting slides 112 in position to engage and support the bottom record when the supporting slides are retracted.

The columns 100 are supported at their bases in pedestals 101 and held therein by means of screws 100ª, said pedestals being secured on the base plate 1 by screws 101ª and positioning studs or dowels 101ᵇ (Fig. 5). At the top the columns are held in parallel spaced relation by a removable spacing bar 105 having plugs 106 secured to the ends thereof by screws 107, said plugs slidingly fitting in sockets provided in the screw caps 104 which are fastened on the columns over the lug portions of the slides.

The records are further guided by a dependent tubular stem or pin 108 (Fig. 5) carried by the spacing bar 105 and shown as secured thereto by a fastening nut 109. This dependent guide pin preferably is extended down to a point quite close to the upper end of the spindle 8 so as, by means of its engagement in the center opening in the records, to positively guide the records down onto the turn-table.

The transverse guide passages 100$^b$ for the record-shifting slides are shown as formed in separate head pieces 102 shown in Figs. 10, 18, 19 and 20 as fitted over the tops of the columns and secured in place by pins 103, the upper ends of these heads being screw-threaded to receive the caps 104 above referred to.

Slide and finger operating mechanism.

Within each of the columns 100 is mounted a centrally disposed oscillatory shaft 122, and to one side of that a helically grooved shaft 128. Shafts 122 serve to operate the record-shifting slides, and the shafts 128 are provided to operate the record-lowering fingers. The shafts 122, as best shown in Figs. 5 and 10, are journaled at their lower ends in the column bases 101 and at their upper ends in the screw caps 104, and carry near their upper ends, crank disks 123, fixed thereto by transverse keys 124 and provided with upstanding crank pins 125 and 125$^a$ standing at opposite sides of the center thereof. The crank pins 125 as shown in Fig. 18, project up only far enough to engage the lower record-supporting slides 112. The other crank pins 125$^a$ however are longer and project up through elongated slots 125$^b$ in the supporting slides 112 and the spacing plate 111 into operating engagement in sockets in the upper record-separating slides 110. Both the upper and the lower slides are furthermore provided with longitudinal slots 122$^a$ to clear the upper ends of the spindles 122. The stationary spacing plates 111 are simply provided with openings 122$^b$ for the upper ends of the spindles or shafts 122 and are thereby held stationary.

The slide-operating shafts 122 are actuated in the illustration by means of gear segments 126 (Figs. 7, 7$^a$, 7$^b$, 5 and 10) fixed on the lower ends of the same and engaged by the teeth at the opposite ends of a double-ended rack 141 slidingly guided on the studs 142 at the under side of the base plate 1 and actuated by a swinging lever 143 pivoted at the under side of the base plate on the stud 144 and connected with the middle portion of the rack by a pin connection 143$^a$, Fig. 8. These slide operating shafts 122 are also shown as manually operable by means of an outstanding lever or handle provided on one of the shafts at 122$^b$ in Figs. 4 and 5.

The rack-actuating lever 143 is forked at its free end so as to extend partially about the axis of the turn-table spindle and carries at the extremities of such forks upstanding pins 145, projecting up through slots 145$^a$ in the base plate (Figs. 7-9) into position to be successively engaged by the laterally projecting point of a rotatable cam 99 which is concentric to the extension spindle.

The cam 99 it will be observed, as it rotates in a right-hand direction in Figs. 7 and 9, will engage first the right-handed pin 145 so as to swing the lever 143 to the right and will then, in its continued rotation, engage the left-hand pin 145, forcing that pin outward, swinging the lever to the left and restoring the parts to the position shown in full lines in Figs. 7 and 9. In the movement of the rack in the first or right-handed direction by reason of the swinging of the lever 143 to the right, the shafts 122 will be turned left-handedly, which will cause the crank pins 125 to retract the record-supporting slides 112 as indicated in dotted lines in Figs. 13 and 17, and the crank pins 125$^a$ to advance the record-separating slides 110 as indicated in dotted lines in Figs. 12 and 16.

The retraction of the slides 112 and the projection of the slides 110 takes place practically simultaneously so that as the support is removed from beneath the bottom record, a support is provided for the other records of the stack, above the bottom record by the wedging in of the separating slides between the bottom record and the record next above it. As the support is thus withdrawn from beneath the bottom record, this record settles onto the lowering fingers 113 and the balance of the stack is temporarily supported, and slightly raised by the wedge-shaped separating slides 110.

In the returning left-hand movement of the double-ended rack 141 the shafts 122 are returned in a right-handed direction back to their original positions, in the course of which the crank pins 125$^a$ operate to retract the separating slides 110 and the crank pins 125 operate to advance the supporting slides 112 into position to receive the balance of the stack thus released by the separating slides.

The record-lowering fingers 113 (as shown particularly in Figs. 5, 10 and 21) are secured by screws 114 and dowel pins 115 on arms 116 pivoted at 117 on sleeves 119 slidably engaged on the slide-actuating shafts 122. The out swinging movements of these record-lowering fingers are controlled by stop pins 118 engaged in slots in the pivoted finger-supporting arms 116 and the fingers are prevented from falling back by the guide tracks 100ᶜ disposed at opposite edges of the vertical slots 100ᵈ provided in the inner opposed sides of the columns, the back portions of the curved record-lowering fingers riding over these guide tracks in the vertical sliding movements of the fingers, as indicated particularly in Figs. 5 and 22.

The shafts 128 are caused to actuate the lowering finger sleeves 119 through the medium of connecting lugs or pins 120 carried by said sleeves and engaging in the helical or worm grooves provided in the shafts 128.

The shafts 128 also are actuated by a double-ended rack similar to the one first described and indicated at 134 as slidingly supported on guide studs 135 at the under side of the base plate and as provided with gear teeth at its opposite ends meshing with pinions 132 pivoted on the under side of the base plate at 133 and carrying gears 131 in mesh with pinions 129 secured by nuts or fastenings 130 on the lower ends of the helical shafts. This speed-increasing gearing causes a relatively slow and comparatively slight shifting movement of the rack 134 to impart a rather quick and extensive rotational movement to the helical shafts.

The record-lowering finger operating rack 134 is actuated by a lever 136 pivoted on the upper side of the base plate at 138 and carrying a pin 137 projecting down through a slot 137ᵃ in the base plate into engagement with a notch 137ᵇ (Fig. 10) in the edge of the rack. This lever 136 as clearly shown in Fig. 9 is in the nature of a bell crank having an angularly projecting arm 136ᵃ standing in the path of the cam point 99 and arranged to be engaged thereby after said cam point has first engaged and operated the right-hand pin 145 of the swinging rack-operating lever 143. The bell crank lever 136 which actuates the record-lowering finger-operating rack 134 is thus not actuated until after the lever 143 has first been swung to the right for the purpose of advancing the separating slides 110 and retracting the supporting slides 112. In other words, the lowering-finger actuating lever 136 is not operated until the separating and supporting slides have operated to separate the lower or bottom record and to deposit the same on the lowering fingers.

As the lever 136 is swung to the left by the engagement of the point of the cam 99 therewith, a left-handed shifting movement is imparted to the double-ended rack 134 and this through the speed-increasing gearing described, imparts a relatively quick rotation to the helical shafts 128 in a right-handed direction. The pitch of the helical grooves is such as to cause the same during such rotative movement, to quickly lower the sleeves 119 carrying the record-lowering fingers 113.

As these fingers 113 are lowered they are prevented from dropping back by riding over the guide tracks 100ᶜ, but as they approach the lower end of their movement they pass down over the inclines at the lower ends of the guide tracks and at this moment the inclined portions 116ᵃ on arms 116 engage the inner edges 100ᵉ at the lower ends of the slots 100ᵈ in columns 100 (Figs. 5, 21 and 22) and are thereby tilted outward and hence positively retracted as indicated in dotted lines in Fig. 5, so as to gently and positively deposit the record carried thereby onto the turn-table or onto the other records previously deposited on the turn-table.

The record-lowering and depositing fingers are returned to their initial upper position by the reverse rotation of the helical shafts 128, such movement being assisted by the coiled springs 121 surrounding the shafts 122 and bearing on supporting collars 121ᵃ at the lower ends thereof. In the course of such upward return movement the record-lowering fingers 113 are again positively forced outwardly into their record-supporting position by riding up over the inclined lower ends of the guide tracks 100ᶜ.

The operations just described result in the depositing of the lowermost record of the stack on the turn-table.

The return movement of the lowering finger operating lever 136 is effected in the illustration by a rocking lever 139, in the nature of a walking beam pivoted intermediate its ends at 140 on the upper side of the base plate 1 and engaged at its forward end by the left-hand pin 145 of lever 143 and engaging at its rearward end with the projecting arm 136ᵃ of lever 136. When the lever 136 is rocked toward the left as indicated in dotted lines in Fig. 9, the return lever 139 is rocked in a left-handed direction so as to stand immediately in rear of the left-hand pin 145 of the lever 143. Consequently, the point of the cam 99, after it leaves the arm 136ᵃ of lever 136 and engages the left-hand pin 145, rocks the return lever 139, through the interposed pin 145 toward the left causing the same to rock the bell crank lever 136 right-handedly, back to its initial position, and this right-handed movement imparts a left-handed direction of rotation to the helical shafts 128 causing them to raise the lowering fingers to their normal upper positions.

From the above it will be apparent that in the course of a single revolution of the cam 99 the lever 143 will first be swung to the right to advance the separating slides 110 and retract the supporting slides 112, the bell crank lever 136 will then be swung to the left to lower the record-lowering fingers 113 and that the lever 143 will be swung back to its left-hand position to retract the separating slides 110 and advance the supporting slides 112, and the bell crank lever 136 will be swung back to its right-handed position to elevate the record-lowering fingers 113 into position to take the next record.

This slide and finger-actuating cam 99 remains at rest during the normal or record-playing operation of the phonograph, and only comes into operation after the stylus has been lifted from the record and the tone-arm has been swung out to one side of the turn-table.

These results are attained by slidingly keying said cam to the hub 94 of a gear 11 (Figs. 5, 24, 58 and 60) which comes into operation when the mechanism is tripped at the end of playing a record and by depressing said cam after a predetermined rotative movement of its supporting gear 11 into position to engage and operate the slide and finger-actuating levers described. Specifically, the cam 99 is shown as slidably keyed to the hub of gear 11 by having a segment of its hub portion 99$^c$, as shown in Figs. 24, 58 and 60, projecting up through and working in a segmental slot 99$^d$ formed in the hub portion of the gear. The cam is held normally in its inoperative elevated position by means of the spring-pressed supporting plunger illustrated at 99$^a$ in Figs. 58 and 60, which are shown as supported in the base plate 1 and as operating against the lower end of the hub of the cam, and is depressed into the plane of operative engagement with the slide and finger-shifting levers by the inner tiltable section 62 (Fig. 10) of the tone-arm swinging lever 60 later described.

The gear 11 is rotatably supported on the base plate about an upstanding tubular post 47 shown in Fig. 58 as secured to the base plate by means of screws 48. This view also clearly shows how the tubular post 47 is disposed concentrically with respect to and forms a free passage for the spindle extension 8.

The upper end of the tubular supporting post 47 is of reduced diameter and shouldered to form a bearing for the pinion 9 which carries the upper snail cam disk 10, which stands opposite the upper face of the gear 11, which carries on said upper face a snail cam-track 96, and thus constitutes a lower snail cam element. In the view last referred to I have also shown how the body of the lower gear 11 may be formed as a separate element secured to the hub portion 94 of such gear by screws 95.

The upper and lower cam disk 10 and 11 are connected by speed-reduction gearing, arranged in the illustration, in the ratio of 12 to 1 and consisting of a gear 12 in mesh with the pinion 9 and carrying at its under side a pinion 13 in mesh with the combined gear and snail cam element 11, gear 12 with its pinion 13 being suitably journaled on a pivot pin 14. Thus the lower snail cam will rotate when the upper snail cam is driven but at $\frac{1}{12}$th the rate of speed thereof. These two snail cams are employed for swinging the tone-arm in opposite directions.

Clutch.

The tone-arm swinging snail cams are controlled by means of a clutch element 7 slidably keyed on the extension spindle 8 and provided on its under face with a tooth or teeth (Figs. 58, 60 and 62) to engage the tooth or teeth of a coöperating clutch element carried by the pinion 9. This clutch element is shown in Figs. 63 to 66 as a ring 9$^a$, seated in an annular channel 9$^e$ provided in the upper face of the pinion 9 and provided with upstanding teeth 9$^f$ to be engaged by the teeth of the slidable clutch element 7.

A shock-absorbing connection is interposed at this clutch to prevent injury to any of the parts by the sudden engagement of the clutch elements. This shock-absorbing connection is shown in the form of springs 9$^c$ seated in segmental pockets provided in the bottom of the channel 9$^e$ in pinion 9 (Figs. 27, 66), said springs each bearing at one end against the end wall of the groove in which it is seated, and at the opposite end against a pin 9$^d$ dependent from the under side of the clutch ring 9$^a$. The clutch ring is held seated in the channel by the screws shown at 9$^b$ in Figs. 27 and 60 as extending through segmental slots 9$^g$ provided in the ring in the seats provided therefor in the bottom of the channel. The length of the segmental slots in the clutch ring and the strength of the shock-absorbing springs determine the shock-absorbing rotative movement of the clutch ring on the pinion.

A flanged screw-collar 49 is illustrated in Figs. 58 and 60 as engaged in the upper end of the tubular post 47 for retaining the parts described in position thereon.

The slidable clutch element 7 is normally yieldingly supported free from engagement with the companion clutch member by a spring-pressed supporting collar 8$^a$ loosely engaged on the extension spindle beneath the movable clutch element as shown in Figs. 58 and 60.

The engagement of the movable clutch element 7 with the companion element 9 is effected, in the present disclosure, by means of a clutch-shifting lever 17 pivoted on the side plate 5 at 18 and engaging at its forward end in an annular groove 7$^a$ provided in the slidable clutch sleeve 7. This clutch-shifting lever 17 is actuated by connections under the control of the index mechanism, now to be described.

Clutch operation.

The engagement of the clutch elements 7 and 9 is effected through the medium of a slide 50 shown in detail in Figs. 51, 52, 56 and 57 and consisting of a member formed with an under-cut dovetail groove to fit the correspondingly shaped angularly projecting arm 31$^a$ of the index pawl 31. The movement of this slide on the arm of the index pawl is governed by a pin 51 received in a slot 51$^a$ in the slide.

The connections from the clutch lever 17 to the actuating slide 50 include a lever 52 pivoted at 53 on the side plate 5 having a forked upper end receiving the ball-shaped outer end of the clutch lever and provided with an angularly projecting arm 52$^a$ standing in position to be engaged and depressed by a dependent lug 50$^a$ on the slide 50.

The clutch element is returned to the normal inoperative position by a returning lever 54 pivoted at 55 on the side plate 5 and provided with one arm 54$^a$ positioned to engage the forward side of the arm 52$^a$, and with a second arm 54$^b$ standing in rear of the dependent lug 50$^a$ of the slide 50 (see Fig. 58).

A special feature of the clutch operation is the utilization of the weight and the lowering force of the turn-table to provide the power for positively engaging the movable clutch element 7 and holding it in the engaged relation. This operation is brought out in Figs. 58 and 82, where it will be seen that the slide 50 is provided at its upper side with a shoulder 50$^b$, which, when the index pawl is rocked outwardly to free one tooth of the index wheel, is lifted, by the rocking of the pawl, up into position to be engaged by the next to the lowermost tooth of the index wheel (see the upper dotted lines in Fig. 58). It follows from this that when the index wheel is released, the next to the lowermost tooth will engage this shoulder 50$^b$ and will shift the slide 50 outwardly on the supporting arm 31$^a$ of the pawl carrying the slide to a position where the dependent lug 50$^a$ thereof overstands the arm 52$^a$ of the forked lever 52. The shoulder 50$^b$ is inclined or formed as a cam surface as indicated so that the actuating tooth will, after it has advanced the slide 50 ride over the shoulder and onto the plane surface or projection 50$^c$ adjacent thereto, bodily depressing the slide in so doing.

In depressing the slide 50 in the manner described the dependent lug 50$^a$ forces downward the arm 52$^a$, rocking lever 52 toward the right in Fig. 58 and thereby shifting the clutch lever 17 so as to throw the movable clutch member 7 down into engagement with the gear-carried clutch element 9. This downward rocking movement of the arm of the index pawl, it will be observed, also throws the tooth of the pawl inward into position to engage and hold the next tooth of the index wheel.

When the movable clutch element 7 is thus engaged it is held in such engaged relation for a predetermined period by reason of the fact that the now lowermost tooth of the index wheel overstands the projection 50$^c$ of the pawl slide as shown in dotted lines in Fig. 82.

It will be clear from this that when the pawl is tripped from holding engagement with the tooth of the index wheel the slide 50 will be shifted into operative relation with respect to the rocking lever 52, and that the slide will then be depressed to rock the clutch lever 17 into the clutch-engaging position and to throw the pawl 31 back into holding engagement with the next tooth of the index wheel 37—also that the parts will be retained in this relation by reason of the lower tooth overstanding the projection on the slide. The other pawl 30 by reason of its connections with pawl 31 previously described is of course at the same time similarly operated, first to release its companion index wheel 36 and to then take hold of the next tooth thereon.

Tone-arm.

The tone-arm shown is of standard construction embodying a swinging tubular arm 350 pivoted in a bearing 351 (Figs. 2 and 3) which, for the purposes of providing the necessary room for the mechanism described, is supported at an elevated position on a tubular post 352, it being shown as secured thereon by through bolts 353.

The tone-arm carries a record-engaging stylus 348 shown as attached in a conventional way to a sound-box 349 carried by an elbow or goose neck pivoted on the free end of the tone-arm for rising and falling movement to accommodate possible undulatory movements of the record.

For the purpose of supporting the trip mechanism about to be described on the tone-arm, I have provided a bracket 300 which may be applied to the tone-arm by securing screws 301 as indicated in Fig. 84.

Trip mechanism.

The apparatus is automatically tripped at the end of the playing of a record by a special tripping impulse imparted to the stylus and the sound-box as the stylus reaches the inner or end portion of the sound groove. In the present illustration this tripping impulse is supplied by permitting the stylus to drop in a depression or curved slot $a$, Fig. 81, formed in the face of the record and indicated at $a$ in Figs. 2, 81, 82 and 83.

The sound-box being pivotally connected with the tone-arm as above described, is free to fall as the stylus drops in the depression, and this falling impetus of the sound-box furnishes the necessary force to operate a trip lever 310 which I have illustrated (Fig. 82) as a bar made up of the two pieces 310 and 311 and pivotally supported at 312 on the tone-arm bracket 300 with the forward or trip portion 310 extending beneath the pivoted elbow or goose neck portion carrying the sound-box (Fig. 83) and with the rearwardly extending latch portion 311 thereof provided with a hook 311ª for holding engagement with a tooth or lug 304ª on the lower end of the spring-operated lever 304.

The forward or sound-box actuated portion 310 of the trip lever is pivotally connected with the latch portion 311 of the lever by means of a screw 313, and is held in properly adjusted relation to the latch portion by a securing screw 313ª shown in Fig. 82 as passing through a slot in the contact portion 310 into the latch portion 311. This construction enables an adjustment of the trip lever to suit different sound-boxes.

The power lever 304 above referred to and shown particularly in Figs. 78 to 82 is pivoted at 305 in an arched support 302 secured on the bracket 300 by screws 303 and is acted on by a spring 307 secured to the top of the arched support 302 by a screw 308. This lever 304 therefore constitutes a spring-operated power device under the control of the sound-box actuated trip lever 310 and furnishes, through connections now to be described, a positive force for operating a lever for lifting the stylus off the record, and for operating the index pawl trip lever 28 to lower the turn-table.

This sound-box lifting lever is indicated at 315, pivoted at 317 on the tone-arm bracket 300 and is shown as provided with an inclined cam shoulder 315ª (Fig. 82) disposed in rear of and in position to be engaged by the lug or tooth 304ª of the spring-impelled lever 304. The forward end of the lifting lever extends into lifting position beneath the pivoted goose neck portion carrying the sound-box (Fig. 83) and is shown (Fig. 82) as provided with an adjustable lifting portion 314 pivoted on a screw 318 and secured in angularly adjusted relation by a screw 318ª passing through a slot in such lifting portion. This construction enables an adjustment of the lifting lever to suit the particular sound-box used.

The operating connections from the motive lever 304 to the index pawl trip lever 28 consists in the present disclosure of a bell crank lever 319 pivoted on the bracket 300 at 320 and carrying a tooth or pallet 321 at its upper forwardly extending arm standing in position to be engaged and operated by the lower end of the power lever 304 and provided at the lower end of the dependent arm thereof with a roller 324 pivoted on a stud 325 and arranged to engage the arcuate track 29 on the free end of the index pawl trip lever 28.

From this it follows that when the sound-box drops at the end of a sound record the trip lever 310 will be actuated to release the power element 304, and that this element as it swings rearwardly (Fig. 82) will first depress the rearward end of the lifting lever 315 to lift the stylus off the record and will then, by engagement with the tooth 321 of the bell crank lever 319 rock said bell crank lever downwardly so as to swing the lower end thereof into tripping engagement with the arcuate track 29 on the index pawl trip lever 28. Consequently, the tripping of the stylus causes the stylus to be quickly lifted up off the record and throws the index pawls to accomplish the lowering of the turn-table.

*Latch-restoring mechanism.*

The trip lever 310 is restored into latching engagement with the power lever 304 by a slide 309 mounted on the bracket 300 in rear of the power lever and having a forked forward end to engage a pin 306 on the power lever. This slide is automatically operated as the tone-arm is swung outward to clear the record by a restoring lever 328 pivoted on the bell crank lever 319 at 329, the upper end of this restoring lever standing in rear of the outer end of the slide 309 as shown in Fig. 82 and the lower end of the same carrying a roller 332 on pivot 333 and designed to engage, in the outward swinging movement of the tone-arm, a restoring cam 150 shown particularly in Fig. 81 as secured on the outer end of the arcuated track 29 by a screw 151.

Therefore, as the tone-arm is swung outward the restoring lever 328 will be rocked by its cam 150 to advance the restoring slide 309 so as to swing the power lever 304 forwardly far enough for the latch portion 311ª on the trip lever to again engage with the tooth or lug 304ª of the power lever (Figs. 79, 80 and 82). The sound-box is supported at such time by the lifting lever 315 through the medium of a forwardly extending arm 330 on the restoring lever 328 which engages over the rear end portion of the sound-box lifting lever 315. The rear end of such sound-box lifting lever is shown as inclined as indicated at 330ª in Fig. 82 so as to permit the restoring lever 328 in the course of the inward or return swinging movement of the tone-arm, as it passes free of the inner portion of the restoring cam 150, to rock outwardly at its upper end, whereby the point of the projection 330 will ride over the inclined face 330ª and will thus gradually release its hold on the lifting lever so as to cause the forward end of the same to gradually lower the stylus onto the record.

In the restoring or forward swinging movement of the power lever 304 the lower end of the same rides over the pallet 321 which is shown as pivoted at 322 on the forward arm of the bell crank lever 319 and as yieldingly sustained in its upstanding relation by a spring 323. This pallet can thus yield in the forward or restoring movement of the power lever but operates as a rigid abutment in the rearward or active swinging movement of the power lever, having for the purpose a forwardly extending tooth as shown at 321ª in Figs. 82 and 84 engaging beneath a forwardly projected portion of the bell crank lever 319.

This bell crank lever 319 is shown in the present disclosure as formed with spaced parallel side portions (Fig. 84) between which the restoring lever 328 is pivoted at the rear, and the arcuate track-engaging roller 324 is shown as adjustably held between the spaced sides by means of a block 326 engaged therebetween and secured by a screw 327 engaged with said sides and passing through a slot formed in the block and shown in dotted lines in Fig. 82. This permits of an adjustment of the tripping roller to suit the special relation of these parts to the arcuate track 29.

The upward and inward swinging movement of the bell crank lever 319 is shown as limited and controlled by a stop 319ª dependent from the bracket 300 and arranged to be engaged by a forwardly extending arm of such bell crank lever. Similarly the swinging movements of the restoring lever 328 are limited by the engagement of the forwardly extending arm 328ª thereon with a stop pin 319ᵇ on the vertical leg of the bell crank lever 319.

In connection with the restoration of the trip lever into holding engagement with the power device it will be noted that at the time the power lever 304 is pushed forwardly, the sound-box is supported by the lifting lever 315 and free of the trip lever 310 so that the trip lever is free to oscillate and to drop back into latching engagement with the tooth 304ª of the power lever, the trip lever being balanced to effect this automatic re-engagement of these parts.

The tripping and automatic lifting movement of the stylus is graphically illustrated by the dotted lines appearing beneath the stylus in Fig. 82 and from which it will be seen that practically as soon as the stylus drops in space at the commencement of the depression and without contacting the walls of said depression it is lifted so as to be entirely free of the record, and therefore in such a position as to enable the tone-arm being swung to one side, clear of the record.

*Independent lifting of the stylus.*

The stylus may be arbitrarily lifted off the record at any point in the traverse of the tone-arm by a hand control consisting in the illustration of a push button 334 (Figs. 3 and 82) on the upper end of a plunger 335 which carries a finger 336 projecting down through the bracket 300 into position over the rearward end of the lifting lever 315. This plunger is normally supported in an elevated inactive position by a spring 337 seated in the lower end of the housing 338 in which the plunger is guided for vertical movement, said housing being shown as secured on the bracket 300 by a screw 339 and as closed at the top by a screw cap 340.

On depressing the push button 334 it will be seen that the lifting lever 315 will be rocked to elevate the sound-box and thus lift the stylus off the record, and furthermore that the stylus can be thus elevated at any time during the playing of a record. When the stylus is thus lifted the tone-arm is free to swing one way or the other so that portions of a record may be skipped or repeated, as may be desired, and without affecting any other portions of the apparatus.

*Tone-arm swinging mechanism.*

At the end of playing a record and after the mechanism has been tripped in the manner described, the tone-arm is swung to one side, clear of the record or records on the turn-table by a tone-arm swinging lever 60 pivoted on a post 61 mounted on the main base plate 1 of the machine (Figs. 2, 3, 26, 29, 49 and 50) and actuated by an arm 62 projecting in between the two snail cams 10 and 96 and carrying a double-ended lug or shoe 62ª for engagement with one or the other of the snail cams.

The tilting arm 62 is shown as frictionally connected with the tone-arm swinging lever 60 by means of a pin 88 on the outer end of the arm 62 adjustably secured in place by the nut 89 and engaging in a slot 88ª provided in lever 60 (Figs. 48 and 50).

The snail cam-engaging arm 62 of the swinging lever 60 is carried by a collar 63 surrounding a squared or angular portion 64 of the swinging lever and pivoted thereto by the pivot screws or pins 65. These pivots are arranged transversely of the swinging axis of the lever and thus enable the arm 62 to have a tilting movement in a vertical plane such as to carry the shoe 62ª at the inner end thereof into and out of engagement with the respective snail cams 10 and 96.

The outer end of the tilting cam-engaging arm 62 carries a double conical roller 66 journaled on a pivot pin 67 fastened in a block 68 secured by the screw 69 to the outer end of the arm, and this roller in conjunction with the slide 70 provides the means for tilting the arm into coöperative relation to one or the other of the two snail cams.

The slide 70, as possibly best shown in Figs. 44 and 49, and 49ª, is provided with upper and lower arcuate tracks 70 and 70ᵇ offset at different radial distances from the pivot post 61, the first of which is arranged to engage the roller 66 for the purpose of tilting the cam arm 62 into engagement with the upper snail cam when the slide is shifted outward, the second (70ᵇ) being arranged, when the slide is shifted inward, (Fig 49ª) to engage the roller and tilt the cam arm down into operative relation to the lower snail cam 96.

The arm-tilting slide 70 is shown as slidingly guided on the base plate 1 for radial shifting movements toward and away from the pivot center 61 of the swinging lever 60 by the guide studs 71 received in slots in the base of the slide.

Pivotally engaged with the base of the slide 70 (Fig. 43) is one end of an intermediate rock lever 72 pivoted on the main base plate 1 at 73 and forked at its opposite end to pivotally engage the end of a rocking lever 74 pivoted on the upright post 75 and having an elevated arm 74ª standing above and forward of a shoulder 74ᵇ provided on the index pawl locking slide 50 (Fig. 45).

When the pawl 31 is tripped in the manner above described the pawl-carried slide 50 is lifted up into position to bring the shoulder 74ᵇ thereon in back of and in position to actuate the arm 74ª as indicated in the dotted lines in Fig. 45, so that as the slide 50 is shifted by means of the tooth of the index wheel, the lever 74 will be rocked in the direction of the arrow in Fig. 43, and this will rock the intermediate lever 72 in the direction indicated by the arrow so as to throw the base-supported slide 70 inwardly as indicated in the dotted lines and into the position shown in detail in Fig. 49ª, where the lower track 70ᵇ carried thereby has operated to lift the outer end of the cam arm 62 and to throw the shoe 62ª on the inner end of the arm into engagement with the lower snail cam 96 (Figs. 24 and 26).

By the same movement of the pawl-carried slide 50 the clutch element 7 has been thrown into engagement as described under the heading "Clutch operation," so that when the tilting arm is rocked down into engagement with the lower snail cam 96, said cam is rotated to swing the arm 62 inwardly and thus rock the tone-arm swinging lever 60 in an outward direction for the purpose of swinging the tone-arm outwardly or clear of the record (see particularly Fig. 24).

The outward swinging movement of the tone-arm is effected from the tone-arm swinging lever 60 through the medium of a roller 173 mounted on a pivot 174 (Fig. 26) on bracket 175 which is secured to the upper angularly turned end of the lever 60 by a screw 176, said roller engaging an abutment face 300ª provided on the tone-arm bracket 300, as clearly shown in Fig. 24.

The shape of the lower snail cam 96 also is clearly shown in this figure, from which it will be apparent that one revolution of the cam will effect the outward swinging movement of the tone-arm.

The inward or return swinging movement of the tone-arm is effected by means of the upper snail cam 10, the tilting arm 62, for that purpose, being automatically tilted up into engagement with the upper snail cam at the end of a predetermined period, during which the record-lowering fingers have operated to lower the new record on the turn-table.

This return swinging movement is initiated by the outward shifting movement of the slide 70 so as to carry the upper track 70ª up over the incline of the double conical roller 66 and to thereby rock the outer end of the arm 62 downwardly, as indicated in Fig. 49, elevating the shoe 62ª at the inner end of the arm into engagement with the upper snail cam.

The outward shifting movement of the slide 70 is accomplished by the reverse actuation of the intermediate lever 72 through the medium of a slide-returning lever 83 pivoted on the base plate 1 at 84 (Figs. 9, 7, 24, 27), engaging with an arm of the lever 72 at its outer end and having its inner end standing in position to be engaged and actuated by the point of rotatable cam 99, after that cam has operated the record-lowering fingers and returned them to their normal positions.

Consequently, after the record-changing operation is entirely completed the tilting portion 62 of the tone-arm swinging lever 60 is engaged with the upper snail cam and this cam, in its rotation to the right in Figs. 27 and 53, swings the inner end 62 of the tone-arm swinging lever 60 outwardly and causes the outer end of said lever to move inwardly and to carry the tone-arm, and with it the stylus, back into position to engage the start of the sound groove in the freshly deposited record on the turn-table.

The connections by which this return movement of the tone-arm is effected are illustrated in Figs. 27 and 28 and include a cam piece 171 adjustably secured by screw 172 on the outer end of the tone-arm swinging lever 60 and positioned to engage a tappet 159 pivoted at 160 to one arm of a bell crank lever 162, whose opposite end is pivoted at 163 on the side plate 5 of the frame 2 and whose elbow is connected by a pivot 165 to a link 164, said link being connected at its opposite end by a pivot 166 with a lever 152 pivoted at 153 and forming one element of a pair of jaws for engagement with a dependent stud 341 carried by the tone-arm bracket 300, the other element of such pair of jaws being shown as a lever 157 pivoted to the first jaw lever 152 at 158. The pivotal support for these jaws is shown as a plate 155 carried by the index pawl tripping track 29. The normal position of these parts is shown in the full lines in Fig. 28, in which the first jaw lever 152 is held by a spring 154 coiled about the pivotal axis 153 of said lever in engagement with a stop 152ª, and the supplementary jaw 157 is held retracted against a stop 156 by a spring coiled about its pivotal axis 158.

In the outward swinging movement of the lever 60 the tappet 159, which is spring-pressed, is simply swung on pivot 160 by the cam 171 without operating the tone-arm controlling jaws. In the return swinging movement of the lever 60 this cam 171 engages the tappet 159 at the reverse side thereof, and said tappet standing rigid at this time (Fig. 27), the bell crank 162 is rocked left-handedly so as to pull inward on the link 164 causing the jaw 152 to engage the tone-arm carried pin 341 so as to swing the tone-arm inwardly, this same movement of the jaw 152 sliding the supplementary jaw 157 outwardly over the guiding abutment 156 and thereby causing the jaws to close upon the pin 341 as shown in the dotted lines. At the time that these jaws thus close on the tone-arm pin 341, the tone-arm has been swung inwardly far enough to bring the stylus into position over the commencement of the record groove, and approximately at this time the point of the cam 171 clears the point of the tappet 159, permitting the jaws to snap free of the tone-arm pin 341. At approximately this time also the sound-box lifting lever 315 is released from the control of the overstanding finger 330 (Fig. 82) so as to gradually lower the stylus onto the record.

A more sensitive and effective control of the tone-arm is provided by equipping the supplemental control jaw 157 with a spring-pressed tappet 157ª at the end thereof which exerts an outward pressure on the pin 341 and which operates as the jaws release their hold on the tone-arm to overcome the inwardly swinging inertia of the tone-arm and thereby prevents the tone-arm, at the moment it is released, from swinging inwardly too far. This tappet 157ª, in other words, operates as an auxiliary control to insure that the stylus will accurately engage with the beginning of the record groove, preventing it from possibly skipping the first few turns of the groove.

*Shifting of the slide and finger-actuating cam 99.*

In addition to its functions as an arm for swinging the tone-arm shifting lever 60, the tilting arm 62 is utilized as a means for controlling and shifting the cam 99 down into position to engage and operate the slide and finger-shifting levers. In Fig. 24 it will be seen that when the lever arm 62 is shifted by the track 96 the lower snail cam to its innermost position, it will overstand the upper end of the sleeve or hub 99ᶜ of the cam 99 which, at this point, is inclined somewhat as shown particularly in Figs. 10 and 11. As at this time the outer end of lever arm 62 is positively held by the lower track 70ᵇ of slide 70 (Fig. 49ª), the shoe 62ª at the inner end of the lever arm 62 will positively depress the hub of the cam and thus shift the point of cam 99 down into position to engage and operate the elements 145 and 136ᵇ of the slide and finger-operating levers and also in position to finally operate the lever 83 which returns the slide 70 to its outermost position (Fig. 49).

Thus, in the first revolution of the lower snail cam 96, the tone-arm will be swung outwardly to clear the record, and in the second revolution of said cam, the finger-actuating cam 99 will be depressed and will operate the record-shifting slides and fingers to place a fresh record on the turn-table. During this second revolution of the snail cam 96 and while the record-shifting fingers are operating, the tone-arm will be positively held in its outer position clear of the turntable by reason of the shoe 62ª on lever arm 62 being positively held in engagement with the hub of cam 99 and positively guided by segmental slot 99ᵈ in hub 94 of the gear 11 and because of the fact that the outer end of the tone-arm swinging lever 60 is then engaged with the abutment face 300ª of the tone-arm as shown in the dotted lines in Fig. 24.

To insure of the point of cam 99 positively engaging with the slide-returning lever 83 I have shown a spring-pressed hold-down lever 146 (Figs. 7 and 10) pivoted at 147 on the base plate 1 and operated on by spring 148, said lever overstanding the point of the cam when in its depressed relation but yielding, by reason of its spring mounting, to the thrust of said cam during its first or inactive revolution.

After the cam 99 has rocked the lever 83 to return the slide 70 which then throws the shoe 62ª on the inner end of the lever arm 62 up into engagement with the upper snail cam (Fig. 49), said cam 99 has completed its work and is then positively shifted back to its initial position, free of the slide and finger operating devices, by reason of the point of the cam riding up over an upwardly inclined shoulder 149 fixed in proper position on the base plate 1 by screws 149ª (Figs. 7 and 9). This return movement is assisted by plungers 99ª, seated in the base plate 1 (Fig. 58) beneath the hub of the cam and acted on by springs 99ᵇ, which also serve as yielding supports for holding the cam normally in its upper inactive position.

*Resetting mechanism for index pawl slide.*

After the records have been changed and the tone-arm is swung back into position to start the playing of a new record, the slide 50 on the index pawl is automatically returned so as to uncouple the clutch 7, and to put the slide in position for the next operation. This is accomplished from a dependent stud 87, on the outer end of the tilting arm 62 of the tone-arm swinging lever, which, as shown in Figs. 24, 46 and 47, engages one arm of a small bell crank lever 85, pivoted at 86 on the base plate 1, whose other arm engages with the side of the slide-returning lever 83. Lever 83 has an arm 83ª engaging in the fork of a lever 82 pivoted on the stud 75 (Figs. 44 and 46) and carrying at its upper end a rigid arm 82ª projecting toward the pawl slide 50 and serving to operate the spring-pressed finger 79 which is mounted on a sleeve 80 (Fig. 47) engaged on the pivot stud 75 and pressed upwardly by the spring 81. The finger 79 has lugs 79ª projecting up into engagement with the side of the rigid lever-arm 82ª so that said finger will swing with said arm. The forward edge of the finger 79, as shown particularly in Figs. 27 and 46, may be beveled or rounded so that when the outer end of the slide-restoring lever 83 is swung to the right in Fig. 46, in the act of shifting the slide 70 outwardly, and the arm 83ª of the lever 83 rocks lever 82 to the right, the spring-pressed finger 79 will pass beneath the dependent lug 50ª of the pawl slide 50 so as to stand in front of the same, as indicated in Fig. 41. The spring-pressed pawl-slide restoring finger 79 is thus positioned in front of the lug 50ª on the slide at the same time that the base slide 70 is shifted outwardly to rock the tilting arm 62 of the tone-arm swinging lever 60 up into engagement with the upper snail cam and hence before the tone-arm swinging lever commences its inwardly swinging movement.

From this it will be clear that as the tone-arm swinging lever swings back to bring the stylus into engagement with the new record, a point is reached, as indicated in Figs 27 and 46, where, at approximately the end of the stroke of lever arm 62, an incline 10ª, swings the same still further, so that the dependent pin 87 carried by said lever arm rocks the bell crank 85 and causes it to swing the lever 83 to the left in these figures, and this, through the connection 83ª, rocks lever 82 to the left, causing the restoring finger 79 to push the slide 50 back to its outermost position, as indicated in Fig. 41.

This restoration of the pawl-locking slide 50 not only places the slide in position to be actuated by the tooth of the index wheel, when next the pawl is tripped, but also uncouples the clutch element 7 through the engagement of the dependent lug 50ª of the clutch-return slide with the finger 54ᵇ of the clutch-returning lever 54, as shown in the full lines in Fig. 58. Thus, after all the automatic operations have been performed the parts are automatically restored to their inactive position, ready for the next record-changing operation.

*Automatic stop.*

After all the records in the magazine have been played, it is desirable that the machine be automatically stopped. This is accomplished, in the present disclosure, by providing the double gear segment 15 (Figs. 41, 58, 71 and 77) with a tooth or projection 15ᵇ arranged to engage in an opening 19ª in the brake-controlling slide 19 when said segment has lowered the turn-table to its lowest point, or in other words, after the last record has been played. The slide 19 is slidably guided on top of the side plates 4 and 5 by guide screws 20 (Figs. 1 and 24) and is normally held in an outward position by a spring 21 (Fig. 32) so that the tooth 19ᵇ thereof stands in position to engage a stud 22ª dependent from the brake lever 22 (Fig. 33) to hold the brake in the "off" or inactive position.

Thus, as the segment 15 lowers the turn-table after the playing of the last record, the slide 19 is automatically retracted so as to release the brake lever and permit the brake-applying spring 26 (Figs. 3, 32, 41 and 47) to assert itself and to swing the brake 25 into stopping engagement with the turn-table.

*Automatic throw-off.*

In addition to applying the brake, I have provided in the present machine, mechanism for automatically rendering the tone-arm swinging mechanism and record-changing devices inoperative when the last record is played.

This mechanism, as shown particularly in Figs. 26, 36, 24, 41, 34, 35 and 59, consists of a plunger 180 whose point projects through the side plate 5 of the frame 2 into position to be engaged by the lower edge of the forward portion of the double segment 15 as said segment turns in the final lowering movement of the table said plunger engaging at its outer end with the upper end of a lever 177 pivoted on the frame at 178 and having a shoe 177ª at its lower end adapted, when projected, as shown in the dotted lines in Figs. 35 and 36, to strike the pin 98 dependent from the movable switch 97 (Fig. 24) pivoted at 97ª on the lower gear 11 and forming the beginning of the snail cam 96.

The movable point 97 on the lower snail cam 96 is normally held in its outer operative relation by a spring 97ᵇ on the underside of gear 11 and bearing against the controlling pin 98, which, as shown in Fig. 53, works down through a slot 98ª cut in the gear 11.

Thus, when the turn-table reaches its lowermost position and the plunger 180 is thrust outwardly by the table-lowering segment 15, the switch point 97 at the beginning of the lower snail cam 96 will be automatically shifted inwardly, as it passes the shoe 62ª at the inner end of the lever arm 62, so as to clear the same as indicated in Fig. 34. Therefore, if the brake should fail to hold, or should permit the gears to revolve far enough for the point of the lower snail cam to reach the shoe 62ª on the inner end of the cam-engaging arm 62 of the tone-arm swinging lever, the point of the cam will be automatically shifted into inoperative relation, and this automatic shifting of the cam point will take place on each subsequent revolution of the snail cam 96 in case the same should be permitted to continue its revolutions.

*Starting and stopping.*

The machine may be started and stopped at any time by control mechanism consisting in the illustration of a push button 218 (Figs. 2 and 32) carried by a rod 219 coupled at its inner end by means of a link 219ª and pivot pin 219ᵇ to one end of a lever 220 pivoted at 220ª in a bracket 221, the other end of said lever being connected to a slide 222 by a pivot screw 222ª, said slide working in a guide 223 and having a hook 222ᵇ at its outer end extending in back of a finger 22ᵇ of the brake lever 22 (Fig. 33). The brake-retracting slide 222 also is shown provided with a shoulder 222ᶜ engaging the outer end of a rocking lever 224 pivoted at 224ª on bracket 223 and arranged to engage at its end with a shoulder 224ᵇ on the brake-controlling slide 19.

From this description it will be seen that when the push button 218 is pressed inwardly the slide 222 will be drawn back so as to retract the brake 25 and that when the push button is pulled outwardly, the slide 222 will be pushed out so as to release its hold on the brake lever 22 and so as to rock the lever 224 for the purpose of retracting the brake-controlling slide 19. This retraction of the slide 19 frees the shoulder 19ᵇ (Fig. 32) from engagement with the dependent arm 22ª of the brake lever 22, thus permitting the brake-applying spring 26 (Figs. 71 and 77) to swing the brake lever 22 so as to set the brake 25 against the turn-table.

When the push button 218 is pressed inwardly to retract the brake lever 22, the dependent finger 22ª of the brake lever shifts the controlling slide 19 backwardly (Fig. 32) until said finger passes beyond the nose 19ᵇ of the slide, whereupon the slide is snapped outwardly by its spring 21 into engagement over the edge of the finger 22ª, through which it then operates to lock the brake in its off position. The controlling slide 19 thus normally holds the brake-applying mechanism inoperative but is under the full control of the push button 218 in addition to being automatically controlled by the gear segment 15 as above described.

The operation of the starting push button 218 also has the effect of returning the actuator slide 50 on the index pawl 31 to the normal position indicated in Fig. 41. The means for this purpose is shown in the view referred to as a restoring lever 56 pivoted on the side plate 5 of the frame 2 at 57 and having its lower end standing in front of the index pawl slide and its upper end standing in position to be engaged by a hook or projection 56ª on the brake-retracting slide 222 (Fig. 32). The retraction of the slide 222 to release the brake therefor through the lever 56 returns the index pawl slide to its normal position in readiness to be actuated by the index wheel 37.

*Arbitrary control of record-changing mechanism.*

An important feature of the invention is that the records may be arbitrarily changed at any time wholly independently of the automatic control.

This is accomplished from the turn-knob or hand-hold 210 (Figs. 1, 2, 30, 31, 32 and 41) which is fixed on the outer end of a tubular shaft 208 carrying at its inner end a cam 209 engaged by the forked end of a pivoted lever 212, to the opposite end of which there is attached a link 214 pivoted at 214ª (Fig. 41), to the upper arm 216 of a bell crank lever pivoted on the side plate 5 at 217, the lower arm of such bell crank lever being forked and provided with angularly projecting lugs 216ª standing above and below the projected end of the index pawl slide 50. This projected portion of the slide 50 carries a dependent lug or extension 216ᵇ which, when the slide is in its normal retracted position, stands directly above the lower lug 216ª. Consequently, when the index pawl slide is in retracted position and the bell crank lever 216 is rocked to the left in Fig. 41 by the operation of the turn-knob 210, the lower lug 216ª will engage the projection 216ᵇ and will lift the slide 50 into the dotted line position, thereby tripping the index pawl 31 out of engagement with the tooth of the index wheel 37 to lower the turn-table and causing the index wheel 37 to project the slide 50 in the manner above described. to actuate the clutch 7 and set into operation the automatic record-changing mechanism.

When the bell crank 216 is rocked in the reverse direction or toward the right in Fig. 41, the upper lug 216ª will be brought down over the top of the index pawl slide 50 and will hold the slide in this position so as to positively lock the index pawl 31 against any tripping movement. When the index pawl 31 is thus locked it will be apparent that the machine will not be automatically tripped at the end of playing a record and that therefore the record on the turn-table or portions thereof may be repeated as many times as desired by simply operating the push button 334 to lift the sound-box and then manually swinging the tone-arm and releasing the push button to again lower the sound-box into operative relation at the commencement of any selected portion of the record.

The cam 209 as illustrated in detail in Figs. 37, 38, 39 and 40 is provided with two reversely inclined cam shoulders 212ª and 212ᵇ, the first inclined rearwardly and serving to rock the lever 212 in a direction to pull on the link 214 and trip the index pawl, and the second being inclined toward the front, as viewed in Figs. 32, 34 and 38, so as to rock the lever 212 as indicated in the dotted lines in Fig. 34 for the purpose of pushing on the link 214 to rock the bell crank 216 down into the non-tripping position indicated in dotted lines in Fig. 41.

The neutral position of the cam 209 is shown in Fig. 37 where the forked end of the lever 212 stands at an intermediate point between the two cam faces 212ª and 212ᵇ. A pointer 211 may be provided on the turn-knob as shown in Figs. 30 and 31 to indicate this condition on a suitable dial 355. When the turn-knob 210 is rotated to the right, the cam face 212ª will be brought into action as shown in Fig. 40 to trip the index pawl and set into operation the automatic record-changing mechanism. When on the other hand the turn-knob is rotated to the left, as in Fig. 39, the other cam face 212ᵇ will be rendered operative to lock the index pawl 31 and permit the record to be repeated.

In order that the control cam 209 may be locked in either the "neutral" or the "repeat" positions, I have shown the cam as temporarily held in either of these positions by a pin 209ª acted on by a spring 209ᵇ (Figs. 34 and 40) and engaging in seats 209ᶜ provided in the face of the cam.

In order that the cam 209 will automatically return to the neutral position after it has been operated to change a record, I have shown it provided with a returning spring 209ᵈ (Fig. 37) which engages the pin 209ª and throws the cam 209 back to neutral position as soon as the hold is released on the turn-knob 210.

When the control cam 209 is turned to the "repeat" position indicated in Fig. 39, it operates the lever 177 as shown in Fig. 36 to throw the switch point 97 of the lower snail cam 96, this being accomplished through the medium of an arm 177ᵇ carried by lever 177 and projecting up into position to be engaged by the control cam. Consequently, when the control is thrown to the repeat position, not only will the indexing mechanism be locked, but operation of the tone-arm swinging lever 60 also will be guarded against.

To make the control as convenient as possible I have shown the rod 219 of the starting and stopping push button 218 as extending through the tubular shaft 208 of the record-changing control mechanism, and said latter shaft as extending through the tubular shaft 204 of the turn-table elevating mechanism. Consequently, by means of the three conveniently located concentric finger holds 207, 210 and 218 at the front of the panel of the phonograph, the turntable may be raised, the record-changing mechanism may be controlled, and the machine may be started and stopped at will.

*Program indicator.*

The name of the record being played is displayed in the machine illustrated by means of the program card 279 illustrated in detail in Fig. 88 and bearing the names of the records to be played, in regular sequence on the face thereof. The machine shown is intended for playing ten records and consequently the program card carries ten titles arranged in the order of the first record on the turn-table and the nine records in the magazine. This lower title at the commencement of the operation of the machine is visible through a window T provided in the front panel of the phonograph as shown in Figs. 2, 30 and 31, and as the records are shifted one by one the program card is correspondingly lowered to bring the titles successively into register with the window.

The program card is shown as supported in a carrier frame 280 secured by a bracket 281 to a rack 282 (Figs. 30, 31, 32 and 85) which slides in a vertical guideway 283 carried by a bracket 284 which is secured on the forward portion of the main base plate 1 by screws 285. The carrier rack 282 is engaged by a gear 286 in mesh with a gear 290, which latter gear is in mesh with a gear 206 fast on the turn-table elevating shaft 204. These connections, in conjunction with the gear elements 204ª, 202 and 200 (Fig. 31) provide a train of connections from the turn-table supporting bushing 6 to the program carrier 280 which will cause said carrier to move in step with the turn-table, the weight of the carrier frame 280 and rack 282 assisting such movements. This train of gearing is so proportioned that the program card will have a greater relative movement than the turn-table. This permits the use of relatively large lettering on the program card, enabling the program to be easily read at a distance from the phonograph.

The gears 286 and 290 are shown in Figs. 30, 31 and 87 as supported on upright bearing plate 205 having an angularly turned foot portion 205ª secured beneath the guide-supporting bracket 284; and this upright plate is also shown utilized in these views to provide a bearing for the outer end of the shaft 204.

Stylus gage.

In order that the stylus shall be properly tripped at the end of a selection, it is necessary that the stylus shall be set so as to drop the proper distance in the tripping depression at the end of the sound groove in the record. For this reason I have provided a device for automatically locating the stylus at the proper level. This device as shown particularly in Fig. 29, consists of a gage plate 343 carried by a plunger 344 whose upward movement is limited by a pin 345 coming into engagement with a stop collar 346 on the upper end of the post 347 in which the plunger is guided. The stop member 346, which may be in the form of a ring screwed on the upper end of the post, is initially set so that when the gage plate is lifted as far as the pin 345 will allow, it will support the stylus 348 at just the proper position with respect to the sound-box. The device is usually operated by slipping the stylus loosely into its holder and then raising the gage plate into the dotted position shown so as to push the stylus into its holder to the proper extent, whereupon it will be fixed in such relation by the usual clamp screw, or other means. During this stylus-gaging operation, the sound-box is supported at a definite fixed level by the adjustable portion 314 of the lifting liver 315, as shown in plan in Figs. 1 and 27 and in side elevation in Figs. 29 and 82. As the tone-arm is swung inward from this gaging position, the sound-box is automatically lowered by the lifting lever 315 as before described, so as to bring the stylus gently down into engagement with the beginning of the sound groove in the record.

Automatic motor-winding mechanism.

The invention contemplates a provision of means for automatically winding the motor and keeping it at the proper tension. This mechanism is illustrated particularly in Figs. 1, 24, 69 and 70 and, as there shown, consists of a small electric motor 400 generally styled a "motrola" and driving through reduction gear housed in the casing 358, the motor-winding shaft 359. This electric motor carries a controlling switch operated by push button 401.

The outward swinging movement of the tone-arm operating lever 60 is utilized for the purpose of operating the motor-controlling switch, said lever in its outward swinging movement, tilting a lever 293 which carries at its outer end an adjustable point 293ª for engagement with the switch button 401. This adjustable point is shown in the form of a screw engaged on the lower end of a stud 293ᵇ which is pivoted at 293ᶜ in the outer end of a lever 293. This construction permits the operating point 293ª to be adjusted to suit the switch button and also permits of its being swung into and out of operative relation with respect to the push button. Lever 293 is shown as pivoted at 295ª in the upper end of a post 295 secured on the base plate 1.

The inner end of the switch-operating lever 293 has a pivoted section 294 pivoted at 294ª, and mounted on this section is a slide 296, slidably supported on the pivoted section by screws 297 working in slots 297ª. This slide 296 is normally held in the outwardly shifted position shown in Fig. 69 by the spring 298, and in which relation the lower supporting screw 297 stands beneath the inner end of the lever 293.

A friction-reducing roller 299 is shown journaled at the inner end of the pivoted lever section 294 in position to be engaged by the tone-arm swinging lever 60.

As the tone-arm swinging lever 60 is shifted outwardly it engages this roller 299, lifting the inner end of the switch-operating lever 293 and depressing the outer end of the same so as to actuate the switch of the electric motor. After thus rocking the switch lever 293 the tone-arm swinging lever 60 contacts with the dependent portion of the slide 296 as shown in Fig. 70, thereby shifting the slide inwardly and carrying the lower screw 297 from beneath the inner end 297ᵇ of the main part of lever 293. When this occurs the pivoted section 294 is free to swing upwardly and, in case the spring is already sufficiently wound, the push button 401 of the switch is free to raise and to lift the outer end of lever 293. The construction of this switch need not be gone into, it being sufficient to state that it is of an automatic type which snaps upwardly when the spring of the phonograph motor is sufficiently wound.

From this it will be seen that at the commencement of the outwardly swinging movement of the tone-arm swinging lever the switch lever 293 will be operated to cut in the electric motor, and that the switch lever will be automatically "broken" in the further outward movement of the tone-arm swinging lever to permit the switch to snap "off" as soon as the spring motor is under sufficient tension. This construction automatically keeps the phonograph motor at the proper tension for the best results.

*Intermission movement.*

It is possible with this invention to play the records in close sequence, one after the other. In the rendition of a musical program, however, a much more desirable effect is obtained if an intermission is had between the conclusion of one record and the commencement of the next. The record-changing operation affords, it is true, a slight interval of time between the rendition of the records, but as the operation of the machine is quite rapid, this interval is hardly appreciable. I therefore provide what I have termed an intermission movement which can, when desired, be thrown into operation to actually halt the machine and give a desired time interval between records.

This mechanism as best appears in Figs. 1, 3, 24 and 71 to 77, comprises a base plate 225 pivoted on the main base plate 1 at 226 and carrying a spring-operated timing train. This train consists in the illustration of a winding gear 227 for engagement with the gear 11 of the main mechanism and carrying a spring barrel 230 secured to the gear by screws 231 and containing a spring 232 which is fast at its outer end at 232ª to the barrel and is made fast at its inner end to a fixed pivot stud 229. Bushing 228 forms the upper bearing for the winding gear 227. The upper frame plate 251 coöperates with the lower plate 225 to provide bearings for the gear elements of the timing train and is shown as supported in spaced relation thereon by post 252 to which it is secured by screws 253. The spindle of the winding gear 227 is designated 229, and said winding gear is shown as permanently in mesh with a pinion 233 carrying a pawl 234 pivoted at 235 on an outstanding arm 235ª, said pawl being held by a spring 236 supported at 237, in engagement with a ratchet 238, said ratchet having affixed thereto a gear 239. This gear and the pinion 233 are supported on the spindle 240 journaled between the top and bottom plates of the intermission movement frame.

The actual timing devices consist of one or a number of vibratory spindles 241 journaled loosely in bearings 241ª in the lower frame plate 225, said spindles being unsupported at their upper ends so as to be free to vibrate or gyrate and provided with gear teeth 241ᵇ at their lower portions for engagement with the gear 239. These vibratory timing elements are also preferably weighted at their upper free ends as indicated at 242.

These loosely journaled spindles when driven by the gear 239 set up a vibratory movement which checks and very materially retards their rotary movement, and this checking or braking action is increased by weighting the upper or free ends of the spindles due, I believe, to the fact that the weights reduce the natural period of vibration. By increasing the number of the timing elements in mesh with the gear 239, the movement of such gear is reduced and the intermission period thereby increased and conversely, by reducing the number of timing devices the gear 239 is permitted to run faster and hence the intermission period is reduced.

The engagement of the winding gear of the intermission movement is governed from the second index wheel 36 by means of a lever 257 pivoted on the side plate 4 (Fig. 77) and having its upper end standing in position to be engaged and shifted by the adjoining tooth of the index wheel, when said wheel is tripped at the end of a record, and having its lower end standing in position to engage the arm 257ª of the bell crank 254. This bell crank, as shown in Fig. 71, is pivoted on the main base plate 1 at 255 and terminates in a hook designed to engage a shoulder 241ª on the base plate 225 of the intermission movement. The hook of this bell crank is normally held engaged with the shoulder 254ª by means of a spring, and said hook as indicated in the view referred to, therefore normally prevents the intermission movement from swinging inwardly far enough for the winding gear to engage the driving gear 11. When, however, the lever 257 is actuated by the tooth of the index wheel 36, the hook 254 will be tripped and the intermission movement will be free to swing inwardly and to carry the spring-winding gear 227 into mesh with gear 11.

The impulse for swinging the intermission movement to bring the winding gear into mesh with the gear 11 is furnished by a spring 260 (Fig. 77) connected with the lower portion of a lever 258 pivoted on the center 259 and whose extreme lower end is shown in Figs. 71 and 77 as engaged with a shoulder 225ª on pivoted base plate 225.

The lever 258 which shifts the intermission movement into mesh with the power gear 11 carries at its upper end a slide 261 guided by the pins 262 and operated on by the projecting spring 263. When the intermission movement stands in its outer position as shown in Figs. 71 and 77, the slide is held repressed by an overstanding inclined cam element 264 secured on the side plate 4 by screws 265 and arranged to bear on the upper guiding pin 262 of the slide. When, however, the intermission movement is tripped by the operation of the lever 257 through the tooth of the index wheel 36, the lower end of lever 258 will be swung inwardly by spring 260 to carry the winding gear 227 into mesh with the driving gear 11, and the upper end of the lever 258 will be rocked to the left as shown in dotted lines in Fig. 77 to carry the slide 261 beyond the restraint of the repressing cam 264, in which position the slide will stand in rear of the tooth 261ª of the brake-controlling slide 19.

The intermission movement may thus be automatically tripped at the end of the playing of a record to bring the spring-winding gear 227 into mesh with the driving gear 11, which is then in operation by reason of the tripping of the index mechanism above described, and the winding gear 227 will consequently be rotated to store up energy in the spring 232. During this energy storing action the pawl 234 carried by the pinion 233, simply "clicks" over the ratchet 238, and the gear 239 remains stationary.

At the end of a predetermined winding movement of the gear 227, a trip 270 secured by screw 271 to the under face of the gear 11, engages with an upstanding lug 270ª on the base plate 225 and swings the intermission movement back to its outer position (Fig. 71). Gear 227 being now unmeshed from the gear 11 is free to turn under the impulse of its spring 232, which it does, driving pinion 233 and through the pawl and ratchet connection, the gear 239, which operates the slow-motion vibrating timing devices 241.

In this outward or unmeshing action of the intermission movement, the upstanding lever 258 is rocked in a right-handed direction (Fig. 77) and operates through the slide 261, which was previously described as having been positioned in back of the nose 261ª on the brake-controlling slide (dotted lines in Fig. 77), to draw back the brake-controlling slide 19, causing it to release its hold on the brake lever 22 and permitting the brake spring to assert itself and apply the brake 25. Consequently, after the spring 232 of the intermission movement is wound and the gears are unmeshed to permit such movement to operate, the brake 25 is automatically applied to the turn-table and the main mechanism is stopped. This prevents wasting the energy of the phonograph spring motor during the intermission.

At the end of the fixed intermission the brake 25 is automatically retracted by a tappet 246 pivoted on the winding gear 227 at 247 and acted on by spring 248, said tappet being positioned to engage a lower arm 266ª of a brake-retracting lever 266 whose upper arm 266ᵇ is arranged to directly engage an arm 22ᶜ dependent from the brake lever 22. This brake-retracting lever 266 is shown as pivoted on the post 267 by the screw 268 (Fig. 73). Thus it will be seen that after the passage of a desired interval of time the brake 25 is automatically retracted and the machine is again started, the parts before described then continuing their functions and completing the changing of the records and the starting of a new record.

Increased power for automatically retracting the brake 25 at the end of the intermission is obtained by automatically cutting the timing devices out of operation as the trip 246 on the winding gear 227 approaches the brake-retracting lever. The means for this purpose consists in this disclosure of a lever 243 (Figs. 73, 74, 76 and 77) pivoted on the stud 244 beneath the base 225 of the intermission movement and having an angularly upstanding end 243ª projecting up through a slot in the base 225 into position to be engaged by a dependent stud 245 on the winding gear. The outer end of the plate or lever 243 stands beneath the protruding lower end of the spindles 241 in position to lift said spindles for the purpose of unmeshing them from the gear 239. The parts are so proportioned that this will occur just before the trip 246 reaches the brake-retracting lever 266. When the timing elements are thus uncoupled, the winding gear 227 snaps the trip 246 into engagement with the brake-retracting lever, causing the brake 25 to be quickly and positively retracted.

After actuating the brake-retracting lever 266 the spring-pressed tappet 246 brings up against a stop 249 shown in the form of a bracket fixed on the base plate 225 by screws 250.

The pivoted and spring-pressed construction of the tappet 246 enables the same to pass in a spring-winding direction past the back stop 249. This enables a preliminary winding of the spring 232.

The gears 11 and 227 are allowed to remain in mesh only long enough to accomplish less than a single revolution of the winding gear 227 as indicated in dotted lines in Fig. 71; and to positively prevent any over-winding I may provide a second or auxiliary unmeshing lug on the driving gear 11, as indicated in dotted lines at 270ᵇ. By this means, even though the gears 11 and 227 mesh in different relations at different times, the danger of over-winding the spring 232 is eliminated because one of the unmeshing lugs 270 or 270ᵇ will swing the intermission movement out of mesh before the winding gear 227 will have completed a full revolution.

I find in practice that with two of the vibratory timing elements in mesh an intermission of approximately one minute can be obtained, and that the intermission can be lengthened minute by minute by the addition of each two timing elements. In Figs. 24 and 71, six of the timing elements are shown in use, producing an intermission of about three minutes. This period may be shortened by simply removing any number of the timing elements from their bearings. Thus in Fig. 72 I have shown four of the timing elements as removed and supported temporarily in sockets 241$^c$ provided therefor in the outer portion of the base plate 225.

*Control of intermission movement.*

The intermission movement can be rendered operative or inoperative, as desired, from a turn-knob 276 shown in Figs. 1, 3 and 71, as secured by a set screw 277 on the outer end of a handle rod 273 which has secured to its inner end, by the screw 274, a dependent hold-out lever 272 arranged to be swung into engagement with an upstanding lug 272$^a$ (Fig. 71) on the base plate 225 of the intermission movement. With these parts thus engaged, it will be seen that the intermission movement will be prevented from swinging inwardly into meshing engagement with the driving gear 11, and that when the knob 276 is turned to the left in Figs. 1 and 30, the hold-out member 272 will be swung to one side so as to permit the intermission movement to come into action at the end of the playing of a record.

In Figs. 30 and 31 I have shown how an indicator or pointer 278 may be provided adjacent the turn-knob 276 to register on a suitable dial 355$^a$ at the front of the panel of the phonograph. The swinging movement of the hold-out member to the inactive position is shown in Figs. 30 and 31 as limited by pin 275 on the back of the frame 2.

*Complete operation.*

In using the machine the first record is usually placed on the turn-table and the balance of the records, nine in this instance, are placed in the magazine (Fig. 5). The stylus, if it has not been previously set is then adjusted to the proper depth in its holder on the sound-box by means of the gage provided therefor (Fig. 29). The machine is then started by pressing the button 218 at the front of the panel and by manipulating the button 334 on the tone-arm, the tone-arm is swung inwardly and the sound-box is lowered to bring the stylus into engagement with the beginning of the sound groove (Fig. 2). When the record has been played and the stylus reaches the inner end of the sound groove it drops in the tripping depression there provided, and the drop thus imparted to the pivoted sound-box causes the same to actuate the trip lever 310, which normally holds the motive device 304 on the tone-arm inoperative. This motive device, in the form of the spring-pressed lever 304, when thus released, actuates the sound-box lifting lever 315 to snap the stylus up off the record and to rock the dependent bell crank lever 319. The latter member thus actuated swings outwardly the index pawl trip lever 28 by engagement with the arcuate track 29 carried thereby and trips the index pawls 30 and 31 from holding engagement with the index wheels 36 and 37. The index wheels thus released lower the turn-table one step, and this rotative movement of the one index wheel 37 actuates the slide 50 of the index pawl 31 which operates the clutch-shifting lever 17 to throw in the clutch 7 (Fig. 2). The shifting movement of the pawl slide 50 also through the chain of connections previously described simultaneously causes the track slide 70 to be shifted inwardly so as to tilt the inner end 62 of the tone-arm shifting lever 60 into engagement with the lower snail cam 96 on the gear 11 which being then in operation, swings the tone-arm swinging lever 60 so as to swing the tone-arm outwardly, clear of the record on the turn-table (Fig. 24).

As the snail cam 96 completes its first revolution the shoe 62$^a$ on the inner end 62 of the tone-arm swinging lever depresses the cam 99 into position to operatively engage the slide and finger-shifting levers 143 and 136. Of these, lever 143 is first actuated to cause the record separating slides 110 to advance and separate the bottom record in the magazine from those above and temporarily support the same and the record supporting slides 112 to retreat and leave the bottom record resting on the record lowering fingers 113. The other lever 136 is then actuated by the cam 99, first to lower the lowering fingers 113 which retreat from under the record as they approach their lowermost position by reason of the inclines 116$^a$ of the finger supports 116 engaging the abutments 100$^e$ at the lower ends of slots 100$^d$ on the inner walls of the tubular columns 100 to deposit the fresh record on the previously played record, and then to return the lowering fingers 113 to their elevated normal position, the supporting slides 112 in the meantime having advanced and the separating slides 110 having retreated to their first positions to leave the remaining records of the stack resting on the supporting slides 112 (Fig. 5).

The cam 99, after thus operating the record-shifting slides and fingers, shifts the base plate carried slide 70 outwardly, tilting the shoe 62$^a$ on the inner end 62 of the tone-arm swinging lever 60 into engagement with the upper snail cam 10 which then operates to swing the tone-arm back into position over the turn-table, whereupon the sound-box lifting lever 315 gradually and easily lowers the stylus into engagement with the commencement of the sound groove in the new record deposited on the turn-table (Fig. 27).

As soon as the stylus is properly engaged with the sound groove in the record, the yieldable holding elements 157, 157ª (Fig. 27) snap free of the dependent stud 341 on the tone-arm, leaving the tone-arm then free to swing with the movement of the stylus in the usual manner. From this moment and at any time during the rendition of a record, it is possible to arbitrarily and abruptly terminate the playing of the record and automatically substitute a new record from the magazine by simply turning the knob 210 right-handedly in Fig. 30 to register the pointer 211 with the mark "change". After this operation, the knob automatically returns to its neutral position.

This operation of the knob has the effect of tripping the index pawls from engagement with the index wheels, thus causing the turn-table to lower one step (the thickness of a record) and simultaneously causes the title card to be lowered so as to shut from view the title of the record just lowered and to display in window T (Fig. 30) the title of the record about to be played. As this lowering movement of the turn-table and the record supported thereby is practically instantaneous, it will be understood that a tripping movement is imparted effected by the tripping depression at the to the stylus and sound-box, similar to that end of the sound groove, with the result, as hereinbefore described, that the sound-box depresses the trip lever 310, the stylus is lifted and the automatic record-changing mechanism is set into operation, first, to swing the stylus clear of the record on the turn-table and to cut in the electric motor for winding the spring of the phonograph motor (Figs. 24 and 69); second, to lower a new record; and third, to swing the stylus back over and into engagement with the beginning of the sound groove in the new record. In the course of these operations, the electric motor has had time to restore the energy of the phonograph motor and to be cut out of operation. All parts of the automatic mechanism having then come to rest, no mechanical sounds are audible from the moment that the stylus engages the sound groove or at any time during the rendition of the record.

It will be evident from this that any of the records in the magazine may thus be cut out at will. Should it be desired to repeat a record, the control knob 210 is turned to the left or to the word "repeat" on the front of the panel (Fig. 30). This has the effect of locking the index pawls so as to prevent the lowering of the turn-table. The trip mechanism on the tone-arm in this instance, therefore, only functions to lift the stylus up off the record and the push button 334 on the tone-arm may then be employed as a handle to swing the stylus back into engagement with the beginning of the sound groove. As long as the knob remains in the "repeat" position, the record may be replayed in this way as many times as desired. It will be seen that when the knob is left in this position, records not provided with the tripping depression may be played in the conventional way. Also, if desired, the magazine may be charged with a series of the ordinary records—that is, without the tripping depression and these may be changed automatically by simply turning the control knob to the "change" position at the end of each reproduction.

In the ordinary automatic operation of the machine with the control knob in the "neutral" position, (Fig. 30) the records will be played in regular sequence with an interval of approximately twenty seconds between the records. When a longer intermission is desired, the intermission control knob 276 which normally stands at the "clear" position (Fig. 30) is turned to the left "intermission" position. This has the effect of releasing the intermission movement which then comes into operation with each tripping movement of the index pawls, as hereinbefore described.

It will be noted that tripping of the mechanism improperly, that is, at a time when the tone-arm is swung to its outward position, is prevented by means of rollers 324 and 332 of the bell crank lever 319 and restoring lever 328 respectively which at this time stand in engagement with opposite sides of the arcuate track 29 of the index pawl trip lever 28 (Fig. 27).

If double-faced records are employed, the records will be played through in one order and then if it is desired to play the other sides, the stack of records will be lifted off the turn-table and then simply be reversed, with the bottom record on the turn-table and the others supported in the magazine. In doing this the program card will be withdrawn from its holder and replaced therein in reversed relation, the titles on the back of the card being arranged to indicate properly the new sequence. In making out these cards, when the order of playing the records is determined upon, the titles will be arranged in such relation on one face of the card and then the stack of records will simply be reversed and the titles taken therefrom in this reversed order, will then be applied to the opposite face of the card.

If the intermission movement is used, an intermission or rest will be automatically provided between the playing of the different records. This prevents the playing from becoming monotonous or tiresome and adds a point of interest in that it enables a certain amount of discussion between the different renditions.

The invention furthermore is so designed that attachments which are customarily applied to phonographs, such as the so-called "dancing dolls," may still be used. These attachments are usually applied to the upper end portion of the record guide spindle in the center of the turn-table, which is made to receive a rod or other connection. This idea is carried out as shown in Fig. 5 by making the dependent guiding spindle of the record magazine, of tubular or hollow construction so that a rod or other connection of such attachments may be passed down through this hollow record guide into engagement with the extension spindle, and be driven thereby.

I claim:—

1. In apparatus of the character described, a rotating turn-table, and a record magazine comprising arcuate record supporting slides for normally supporting a stack of records, arcuate record separating slides above said supporting slides for separating the bottom record from the records above the same and for temporarily supporting said upper records, means for retracting the supporting slides and substantially simultaneously advancing the separating slides, and for then retracting the separating slides and substantially simultaneously advancing the supporting slides, record-lowering fingers arranged to take the bottom record from the supporting slides as the same are retracted and means for operating the lowering fingers to deposit the record on the rotating turn-table.

2. In an apparatus of the character described, a rotating turn-table, slides for supporting a stack of records above the turn-table, slides above said supporting slides for separating the record at the bottom of the stack from the records above the same, means for advancing said separating slides and for retracting the supporting slides and for then retracting the separating slides and advancing the supporting slides, and record-placing fingers arranged to receive the bottom record as the supporting sides are retracted from supporting engagement therewith.

3. In apparatus of the character described, a record magazine comprising record-lowering fingers arranged to receive and support the bottom record of a stack of records, sildes for normally supporting said stack of records at a predetermined constant level, separating slides for isolating the bottom record from those above the same and means for advancing the separating slides and retracting the supporting slides diametrically of the record and for then advancing the supporting slides and retracting the separating slides.

4. In apparatus of the character described, a record magazine comprising guides for a vertical stack of records, record-lowering devices engaging beneath the lowermost record of the stack, record-supporting devices engaging beneath the lowermost record for normally supporting the stack at a constant level, means for retracting said supporting devices to leave the lowermost record supported on the lowering devices, and means for temporarily supporting the remaining records of the stack above the lowermost record when the supporting devices are retracted to deposit the lowermost record on the lowering devices.

5. The combination with a rotating turn-table, of devices for placing the bottom record of a stack on said rotating turn-table, devices for supporting a stack of records at a predetermined level above said placing devices, means for retracting said supporting devices to leave the bottom record of the stack resting on said placing devices and means for temporarily supporting the records above said bottom record when the supporting devices are retracted.

6. In combination with a rotating turn-table, a finger for lowering the bottom record of a stack onto said rotating turn-table, a record-supporting slide for normally supporting a stack of records at a predetermined constant level above said placing finger, means for retracting said supporting slide to deposit the bottom record on the placing finger, and means for temporarily supporting the records above the bottom record when the supporting slide is retracted.

7. In combination with a turn-table, a placing finger for lowering the bottom record of a stack onto said turn-table, a record-supporting slide for normally supporting a stack of records above said placing finger, means for retracting said supporting slide to deposit the bottom record on the placing finger, and means including a separating slide for temporarily supporting the records above the bottom record when the supporting slide is retracted and means for advancing the same between the lower record and the records thereabove.

8. In combination with a turn-table support, a placing finger for lowering the bottom record of a stack onto said turn-table, a record-supporting slide for normally supporting a stack of records above said placing finger, means for retracting said supporting slide to deposit the bottom record on the placing finger, means for temporarily supporting the records above the bottom record when the supporting slide is retracted, and a stationary spacing device between the supporting slide and the temporary supporting means of substantially the thickness of a normal record.

9. In apparatus of the character described, a record magazine comprising record-separating and supporting slides spaced one above the other, means for alternately shifting said slides in opposite directions and record-placing fingers disposed at the sides of the supporting slides in position to receive a record therefrom as said supporting slides are retracted.

10. In apparatus of the character described, a record magazine comprising record-separating and supporting slides spaced one above the other, means for alternately shifting said slides in opposite directions, record-placing fingers disposed at the sides of the supporting slides in position to receive a record therefrom as said supporting slides are retracted, and a stationary spacer interposed between the separating and supporting slides of substantially the thickness of a normal record.

11. In apparatus of the character described, a record magazine comprising record-separating and supporting slides spaced one above the other, means for alternately shifting said slides in opposite directions, and a spacer interposed between the separating and supporting slides of substantially the thickness of a normal record and independent of the shifting movements of the slides.

12. A magazine for phonograph records comprising an arcuate supporting slide for engagement beneath the rim of a record, record-placing fingers normally standing at the ends of said arcuate slide for receiving a record therefrom, means for retracting the arcuate supporting slide, an arcuate separating slide above the supporting slide, and means for advancing said separating slide when the supporting slide is retracted.

13. A magazine for phonograph records comprising an arcuate supporting slide for engagement beneath the rim of a record, record-placing fingers normally standing at the ends of said arcuate slide for receiving a record therefrom, means for retracting the arcuate supporting slide, an arcuate separating slide above the supporting slide, means for advancing said separating slide when the supporting slide is retracted, and an arcuate spacer between the separating and supporting slides.

14. A magazine for phonograph records comprising an arcuate supporting slide for engagement beneath the rim of a record, record-placing fingers normally standing at the ends of said arcuate slide for receiving a record therefrom, means for retracting the arcuate supporting slide, an arcuate separating slide above the supporting slide, means for advancing said separating slide when the supporting slide is retracted, an arcuate spacer between the separating and supporting slides, and guide posts carried by said spacer for engagement with the edges of a stack of records on the supporting slides.

15. A record magazine comprising a stationary record guiding and spacing plate, separating slides above and supporting slides below said stationary record guiding and spacing plate, and means for alternately shifting said slides in reverse directions.

16. A record magazine comprising a stationary spacing plate, separating and supporting slides above and below said spacing plate, means for alternately shifting said slides in reverse directions, and record-placing fingers operating substantially at right angles to the movements of said slides.

17. A record magazine comprising a stationary spacing plate, separating and supporting slides above and below said spacing plate, means for alternately shifting said slides in reverse directions, said slides operating in substantially horizontal planes and a record-lowering finger operating in a substantially vertical plane away from and toward the supporting slides.

18. A record magazine comprising a stationary spacing plate, separating and supporting slides above and below said spacing plate, means for alternately shifting said slides in reverse directions, said slides operating in substantially horizontal planes and a record-lowering finger operating in a substantially vertical plane away from and toward the supporting slide, and means for laterally positively shifting the record-lowering finger.

19. In apparatus of the character described, a rotating turn-table, supporting columns at opposite sides of the same, arcuate slides mounted on the tops of said columns for supporting a stack of records at a predetermined level above the rotating turn-table and arcuate slides for separating the lowermost record from the records above the same, and record-lowering fingers mounted on the columns and arranged to receive at said predetermined level the lowermost record and to deposit the same upon the rotating turn-table.

20. In apparatus of the character described, a rotating turn-table, supporting columns at opposite sides of the same, slides mounted on said columns for supporting a stack of records and for separating the lowermost record from the records above the same, record-lowering fingers mounted on the columns and arranged to receive the lowermost record and to deposit the same upon the rotating turn-table, and means within the columns for operating said slides and lowering fingers.

21. In apparatus of the character described, a turn-table, supporting columns at opposite sides of the same, slides mounted on said columns for supporting a stack of records and for separating the lowermost record from the records above the same and record-lowering fingers mounted on the columns and arranged to receive the lowermost record and to deposit the same upon the turn-table, means within the columns for operating said slides and lowering fingers including devices for retracting the lowering fingers laterally away from the record deposited on the turn-table.

22. In apparatus of the character described, a turn-table, supporting columns at opposite sides of the same, slides mounted on said columns for supporting a stack of records and for separating the lowermost record from the records above the same, record-lowering fingers mounted on the columns and arranged to receive the lowermost record and to deposit the same upon the turn-table, means within the columns for operating said slides and lowering fingers including shafts rotating within the columns and operatively connected with the slides and lowering fingers.

23. In apparatus of the character described, a turn-table, supporting columns at opposite sides of the same, slides mounted on said columns for supporting a stack of records and for separating the lowermost record from the records above the same, and record-lowering fingers mounted on the columns and arranged to receive the lowermost record and to deposit the same upon the turn-table, shafts mounted within the columns and having eccentric connections with the slides and other shafts within the columns having helical groove connections with the lowering fingers.

24. In apparatus of the character described, a turn-table, supporting columns at opposite sides of the same, slides mounted on said columns for supporting a stack of records and for separating the lowermost record from the records above the same, record-lowering fingers mounted on the columns and arranged to receive the lowermost record and to deposit the same upon the turn-table, and shafts mounted within the columns and having eccentric connections with the slides and helical groove connections with the lowering fingers for lowering and raising the same.

25. In apparatus of the character described, a turn-table, supporting columns at opposite sides of the same, slides mounted on said columns for supporting a stack of records and for separating the lowermost record from the records above the same, record-lowering fingers mounted on the columns and arranged to receive the lowermost record and to deposit the same upon the turn-table, shafts within the columns, eccentric connections from said shafts for operating the slides, the lowering fingers having sleeves slidably guided on said shafts.

26. In apparatus of the character described, a turn-table, supporting columns at opposite sides of the same, slides mounted on said columns for supporting a stack of records and for separating the lowermost record from the records above the same, record-lowering fingers mounted on the columns and arranged to receive the lowermost record and to deposit the same upon the turn-table, shafts within the columns, eccentric connections from said shafts for operating the slides, the lowering fingers having sleeves slidably guided on said shafts, and helically grooved shafts mounted in the columns and engaging said sleeves.

27. In apparatus of the character described, a turn-table, supporting columns at opposite sides of the same, slides mounted on said columns for supporting a stack of records and for separating the lowermost record from the records bove the same, record-lowering fingers mounted on the columns and arranged to receive the lowermost record and to deposit the same upon the turn-table, shafts within the columns, eccentric connections from said shafts for operating the slides, the lowering fingers having sleeves slidably guided on said shafts, said lowering fingers having a laterally yieldable connection with said sleeves and abutments on the columns for shifting said fingers laterally positively away from the turn-table.

28. In apparatus of the character described, a rotating turn-table, tubular supporting columns at opposite sides of said rotating turn-table, supporting means for a stack of records carried by said columns at a predetermined fixed level above the turn-table, a detachable tie bar connecting the columns and a dependent guide carried by said tie bar for entering the openings in the stack of records and removable with said tie bar.

29. In apparatus of the character described, a tubular column provided at its top with a lateral guide passage or passages, record-engaging slides operating in said lateral passage or passages, and means extending up through the tubular column for operating said slides.

30. In apparatus of the character described, a tubular column provided with a lateral guide passage or passages, record-engaging slides operating in said lateral passage or passages, said column having a longitudinal slot in one side thereof, a record-engaging member operating through said slot, and means within the column for actuating the slide and said record-engaging member.

31. In apparatus of the character described, a column provided with a lateral guide passage or passages, record-engaging slides operating in said lateral passage or passages, said column having a longitudinal slot in one side thereof, a record-lowering finger operating through said slot, means within the column for operating the slides and said record-lowering finger, and guide tracks at the sides of the slot for vertically guiding the record-lowering finger.

32. In apparatus of the character described, tubular supporting columns provided with opposed lateral guide passages, record-engaging devices sliding in said passages and means within the columns for actuating said record-engaging devices.

33. In combination, a rotating turn-table, substantially vertical columns at the sides of said turn-table provided with opposed lateral guide passages and with substantially vertical guide passages, record engaging devices operating in said lateral passages and record-lowering fingers operating in said vertical guide passages and away from and toward the turn-table.

34. In combination, a rotating turn-table, a supporting column at the side of the same, a record-lowering member guided for vertical movements on said column and laterally shiftable on said column and means for so actuating said record-lowering member.

35. In combination, a rotating turn-table, a substantially vertical support at one side of said turn-table, a record-engaging member guided for vertical movement on said support and shiftable laterally away from and toward the turn-table, and an abutment within the support engaged by said member in the vertical travel thereof for shifting the same laterally positively away from the turn-table.

36. In combination, a turn-table, a substantially vertical shaft at one side of the same, a sleeve slidably engaged on said shaft, a record-lowering finger supported by said sleeve but laterally yieldable with respect thereto and guide tracks provided with an inclined shoulder engaged by said finger in the course of the vertical movement of the sleeve for shifting the record-engaging member laterally positively toward the turn-table.

37. In combination, a rotating turn-table, substantially vertical shafts, at opposite sides of the same, a sleeve slidably engaged on each of said shafts, a record-engaging finger supported by each of said sleeves but laterally yieldable with respect thereto and guide tracks engaged by said fingers in the course of the vertical movement of the sleeves for guiding the record-engaging fingers toward and away from the turn-table, and helical shafts engaging the sleeves for shifting the same on the supporting shafts toward and away from the turn-table.

38. In combination, a turn-table, a substantially vertical shaft at one side of the same, a sleeve slidably engaged on said shaft, a record-engaging finger supported by said sleeve but laterally yieldable with respect thereto, guide tracks engaged by said finger in the course of the vertical movement of the sleeve for guiding the record-engaging finger toward and away from the turn-table, a helical shaft engaging the sleeve for shifting the same on the supporting shaft, and a column surrounding the shafts and forming a support for the guide tracks.

39. In combination, a turn-table, a substantially vertical shaft at one side of the same, a sleeve slidably engaged on said shaft, a record-lowering finger supported by said sleeve but laterally yieldable with respect thereto and guide tracks engaged by said finger in the course of the vertical movement of the sleeve for guiding the record-lowering finger toward and away from the turn-table, and record-supporting slides operated in a horizontal plane by the vertical shaft.

40. In apparatus of the character described, record-supporting and separating members, and means for operating the same in reverse directions comprising a shaft provided with eccentric projections at opposite sides of the center thereof engaging said members.

41. In apparatus of the character described, record-supporting and separating slides arranged one above the other, and means for actuating the same in opposite directions comprising a shaft having eccentric projections at opposite sides of the center thereof, one of said slides having an opening fitted to one of said projections and another opening through which the other projection freely passes, and the other slide having an opening fitted to receive the second projection.

42. In apparatus of the character described, a rotating turn-table, slides for supporting a stack of records above the rotating turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, and means for automatically setting said slides and record-placing fingers into operation upon the completion of the playing of a record on the rotating turn-table.

43. In an apparatus of the character described, a rotating turn-table, slides for supporting a stack of records above the rotating turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, a tone arm swinging over the rotating turn-table, and means controlled by said tone arm for swinging the same from beneath the record supporting slides and placing fingers and for starting the operation of the same to first release the bottom record of the stack and to then deposit same on the rotating turn-table.

44. In an apparatus of the character described, a rotating turn-table, slides for supporting a stack of records above the rotating turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, a tone arm swinging over the rotating turn-table, means carried by said tone arm for starting the operation of the record-supporting slides and record-placing fingers, and means for swinging the tone arm from beneath the record-placing fingers.

45. In an apparatus of the character described, a rotating turn-table, slides for normally supporting a stack of records above the rotating turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith and to place the bottom record on the rotating turn-table, means for automatically setting said slides and record-placing fingers into operation upon the completion of the playing of a record on the turn-table including a depression provided at the end of the sound groove in the record, a sound box carrying a stylus coöperating with said depression, and trip mechanism actuated from such coöperation.

46. In combination, a turn-table, columns at the sides of said turn-table, record-engaging slides mounted on said columns, shafts for operating said slides extending up through the columns and provided with gears, racks engaging said gears, and means for actuating said racks.

47. In combination, a turn-table, columns at the sides of said turn-table, record-engaging slides mounted on said columns, shafts for operating said slides extending up through the columns and provided with gears, racks engaging said gears, means for actuating said racks, including swinging levers connected with the racks, and a cam for sequentially operating said swinging levers.

48. In combination, a turn-table, columns at the sides of said turn-table, record-engaging slides mounted on said columns, shafts for operating said slides extending up through the columns and provided with gears, racks engaging said gears, means for actuating said racks including swinging levers connected with the racks and a cam for sequentially operating said swinging levers, said cam normally standing out of the path of said levers, and means for shifting said cam into position to operatively engage the levers.

49. In combination, a turn-table, columns at diametrically opposite sides of said turn-table, record-shifting slides mounted on said columns, shafts extending up through the columns and operatively connected with said slides, and means for oscillating said shafts to impart straight line movements to the slides diametrically of the turn-table.

50. In combination, a turn-table, columns at the sides of said turn-table, record-engaging slides mounted on said columns, shafts for operating said slides extending up through the columns and provided with gears, racks engaging said gears, means for actuating said racks including swinging levers connected with the racks and a cam for sequentially operating said swinging levers, said cam normally standing out of the path of said levers, means for shifting said cam into position to operatively engage the levers, and means for positively returning said cam into position free of engagement with the levers.

51. In apparatus of the character described, a turn-table, record-engaging slides at diametrically opposite sides of said turn-table, shafts for operating the same provided with gears and a double-ended rack in mesh with said gears.

52. In apparatus of the character described, record-engaging slides, shafts for operating the same provided with gears, a double-ended rack in mesh with said gears, and means for positively shifting said rack in reverse directions.

53. In apparatus of the character described, record-engaging slides, shafts for operating the same provided with gears, a double-ended rack in mesh with said gears, means for positively shifting said rack in reverse directions, and manually operative means for actuating the rack.

54. In apparatus of the character described, record-engaging slides, shafts for operating the same provided with gears, a double-ended rack in mesh with said gears, means for positively shifting said rack in reverse directions, and manually operative means for actuating the rack including a hand-lever connected with one of the shafts.

55. In apparatus of the character described, record-engaging slides, shafts for operating the same provided with gears, a double-ended rack in mesh with said gears, and means for positively shifting said rack in reverse directions including a swinging lever pivotally connected with an intermediate portion of the rack.

56. In apparatus of the character described, record-engaging slides, shafts for operating the same provided with gears, a double-ended rack in mesh with said gears, means for mechanically shifting said rack in reverse directions including a swinging lever pivotally connected with an intermediate portion of the rack, and provided with spaced projections, and a cam rotating between said projections.

57. In apparatus of the character described, record-lowering fingers, helical shafts for operating the same, gear elements on said shafts, and means for simultaneously operating said helical shafts including a double-ended rack operatively connected with the gear elements on the helical shafts.

58. In apparatus of the character described, record-lowering fingers, helical shafts for operating the same, gear elements on said shafts, gears in engagement with said gear elements, and a double-ended rack in mesh with the gears.

59. In apparatus of the character described, record-lowering fingers, shafts for operating the same, pinions on said shafts, gears in mesh with said pinions, and a double-ended rack in mesh with said gears.

60. In apparatus of the character described, record-lowering fingers, shafts for operating the same, pinions on said shafts, gears in mesh with said pinions, pinions carried by said gears, and a double-ended rack in mesh with said last-mentioned pinions.

61. In apparatus of the character described, a base plate, a double-ended rack slidably supported on said base plate, upright shafts mounted on the base plate and having gear elements connected with the double-ended rack, and record-engaging slides operated by said shafts.

62. In combination, a base plate, two racks mounted on said base plate, two sets of record-engaging slides and fingers, shafts for actuating one set of record-engaging slides having gear elements in mesh with one of the racks, and shafts for actuating the other set of record-engaging fingers having gear elements in mesh with the other rack.

63. In combination, a base plate, two racks mounted on said base plate, two sets of record-engaging slides and fingers, shafts for actuating one set of record-engaging slides having gear elements in mesh with one of the racks, shafts for actuating the other set of record-engaging fingers having gear elements in mesh with the other rack, and means for sequentially actuating the racks.

64. In combination, a base plate, two racks mounted on said base plate, two sets of record-engaging slides and fingers, shafts for actuating one set of record-engaging slides having gear elements in mesh with one of the racks, shafts for actuating the other set of record-engaging fingers having gear elements in mesh with the other rack, and means for sequentially actuating the racks including a rotating cam and sequentially arranged levers standing in the path of said cam and connected with the racks.

65. In combination, upright guides, record-lowering fingers slidably engaged on said guides, springs for yieldingly supporting said fingers on the guides, and means for drawing said fingers downward on the guides against the tension of said supporting springs.

66. In combination, upright guides, record-lowering fingers slidably engaged on said guides, springs for yieldingly supporting said fingers on the guides, and means for drawing said fingers downward on the guides against the tension of said supporting springs, said means including helical shafts engaged with the fingers, and means for rotating said helical shafts.

67. In combination, horizontally and vertically operating record-engaging slides and fingers, shafts for actuating the horizontally operating slides, the vertically operating fingers having sleeve portions sliding on said shafts and actuating means for the vertically operating fingers engaging said sleeve portions.

68. In combination, a base plate, record-lowering fingers, shafts for operating said fingers mounted on the base plate and provided with gear elements disposed at the under side of the base plate, members for operating said gear elements also disposed at the under side of the base plate and means for actuating said members disposed at the upper side of the base plate.

69. Record-shifting mechanism, including record-supporting slides, shafts for operating the same, a double rack slide connected with said shafts to operate both, a rotating cam, and a lever connected with the double rack slide and having forked ends disposed at different sides of said cam.

70. Record-shifting mechanism, including record-engaging slides, shafts for operating the same, a double rack slide connecting said shafts, a rotating cam, and spaced abutments disposed at different sides of the cam and connected with said double rack slides.

71. In combination, record-engaging slides, shafts for operating the same, a double rack bar connecting said shafts, a rotating cam and operating connections between the cam and double rack bar.

72. In combination, two sets of record-engaging slides and record-lowering fingers, a swinging lever for operating the slides, a swinging lever for operating the fingers, a rotating cam for sequentially actuating said levers in one direction, and means operated by said cam for shifting the levers in the reverse direction.

73. In combination, two sets of record-engaging slides and record-lowering fingers, a swinging lever for operating the slides, a swinging lever for operating the fingers, a rotating cam for sequentially actuating said levers in one direction, means operated by said cam for shifting the levers in the reverse direction, and including a projection on the first lever for engagement by the cam and a connecting lever engaged by said projection and engaging the second lever.

74. In combination, record-shifting fingers, a rotating cam, a member for operating certain of the fingers provided with spaced projections positioned to be sequentially actuated by the cam, a member for operating other of the record-shifting fingers having a part positioned to be actuated by the cam and a returning device for said second member positioned to be actuated by one of the projections of the first member.

75. In combination, record-shifting fingers, a rotating cam, a member for operating certain of the fingers provided with spaced projections positioned to be sequentially actuated by the cam, a member for operating other of the record-shifting fingers having a part positioned to be actuated by the cam, a returning device for said second member positioned to be actuated by one of the projections of the first member, and means for shifting the cam into and out of position to engage the projections.

76. In an apparatus of the character described, a rotating turn-table, slides for supporting a stack of records above the rotating turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, and means for automatically setting the supporting and separating slides and record-placing fingers into operation upon the completion of the playing of a record on the record support including a depression provided at the end of the sound-groove in the record, a sound box carrying a stylus affected by said depression and trip mechanism actuated from said sound box.

77. In combination, record-supporting slides and lowering fingers, a rotating member, a cam shiftably mounted on said rotating member, mechanism for actuating the record-supporting slides and lowering fingers, and means for automatically shifting the cam on the rotating member into and out of operative engagement with said mechanism.

78. In combination, record-supporting slides and lowering devices, levers for actuating the same, a rotatable cam for operating said levers, means for rotating said cam and means for shifting the cam into and out of engagement with the levers at different periods in the rotation thereof.

79. In combination, record-supporting and placing devices, levers for actuating the same, a cam for operating said levers, means for rotating said cam, means for shifting the cam into and out of engagement with the levers at different periods in the rotation thereof including a lever engaging the cam, and means for shifting said lever.

80. In combination, a base plate, record-shifting devices, operating members for said record-shifting devices mounted on the base plate, a cam slidably keyed on a rotatable member on the base plate and movable into and out of position to engage the operating members, and means for retaining said cam in the plane of operative engagement with said members.

81. In combination, a supporting base, levers mounted on said base, record-shifting devices operated by said levers, a cam for operating said levers, means for shifting said cam vertically on the base to engage and disengage the same with respect to the levers, and a hold-down device engageable with the cam before the same is shifted out of the plane of engagement with the lever.

82. In an apparatus of the character described, a rotating turn-table, slides for supporting a stack of records above the rotating turn-tables, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, and manually operable means for independently controlling the operation of said slides.

83. In an apparatus of the character described, a rotating turn-table, slides for supporting a stack of records above the turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, and means for automatically controlling operation of said slides and record-placing fingers.

84. In an apparatus of the character described, a rotating turn-table, slides for supporting a stack of records above the turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, means for automatically controlling operation of said slides and record-placing fingers and means for manually independently controlling operation of said slides and record-placing fingers.

85. In an apparatus of the character described, a rotating turn-table, slides for supporting a stack of records above the turn-table, slides above said supporting slides for separating the record at the bottom of the stack from the records above the same, means for advancing said separating slides and for retracting the supporting slides and for then retracting the separating slides and advancing the supporting slides, record-placing fingers arranged to receive the bottom record as the supporting slides are retracted from supporting engagement therewith, a tone arm and means associated therewith for controlling operation of said slides and placing fingers.

86. In combination with a phonograph, including a rotating turn-table and a swinging tone arm, means for supporting a stack of superposed records above said rotating turn-table with the lowermost record of the stack at a predetermined level, means for automatically separating the lowermost record from the stack, and means for supporting and lowering the same to the turn-table and for then supporting the remaining records of the stack with the then lowermost record at a temporary level while the lowering means are operating to deposit the lowermost record on the turn-table.

87. In combination with a phonograph, including a rotating turn-table and a swinging tone arm, means for supporting a stack of superposed records above said turn-table with the lowermost record of the stack at a predetermined level, and means for automatically separating the lowermost record from the stack and means for supporting and lowering the same on the rotating turn-table and for then supporting the remaining records of the stack with the then lowermost record at a temporary level, and means for automatically lowering the rotating turn-table before each new record is deposited thereon.

88. In combination with a phonograph, including a rotating turn-table and a swinging tone arm, means for supporting a stack of superposed records above said rotating turn-table with the lowermost record of the stack at a predetermined level, means for automatically separating the lowermost record from the stack and for supporting and lowering the same to the rotating turn-table and for then supporting the remaining records of the stack with the then lowermost record at a temporary level, and means carried by the tone arm for setting said automatic means into operation.

89. In combination with a phonograph, including a rotating turn-table and a swinging tone arm, means for supporting a stack of superposed records above said turn-table with the lowermost record of the stack at a predetermined level, means for automatically separating the lowermost record from the stack and for supporting and lowering the same to the rotating turn-table and for then supporting the remaining records of the stack with the then lowermost record at a temporary level, means carried by the tone arm for setting said automatic means into operation including a swiveled sound box carried by the tone arm, and a trip lever actuated by said sound box.

90. In a phonograph, the combination with a record having a depression at the end of the sound groove therein and deeper than said sound groove, a sound box carrying a stylus for coöperation with said record and arranged to be dropped by said depression, a trip lever actuated by such dropping of the sound box, an automatic record-feeding magazine, and mechanism under control of the trip lever for controlling said automatic record-feeding magazine.

91. In a phonograph, the combination with a record having a depression at the end of the sound groove therein and of greater depth than said sound groove, a sound box carrying a stylus for coöperation with said record and arranged to be dropped by said depression, a trip lever actuated by such dropping of the sound box, an automatic record-feeding magazine, mechanism under control of the trip lever for controlling said automatic record-feeding magazine, a vertically adjustable rotating turn-table, and automatic turn-table lowering mechanism also controlled by the trip lever.

92. In combination with a rotating turn-table, and a swinging tone arm, a swiveled sound box on the tone arm carrying a stylus, a stylus and sound box lifting lever mounted on the tone arm, a power device for operating said lifting lever, and a trip lever for holding said power device inoperative, said trip lever being controlled by the stylus and sound box.

93. In combination, a turn-table, a swinging tone arm provided with a sound box pivoted for vertical movement, a sound box lifting lever pivoted on the tone arm, a spring-operated member for actuating the lifting lever, and a trip lever for said member disposed in the path of the vertical movement of the sound box.

94. In combination, a turn-table, a tone arm provided with a sound box pivoted for vertical movement, a sound-box lifting lever mounted on the tone arm, a spring-actuated member for operating said lifting lever, and a trip lever for restraining the spring-actuated member having a part disposed in the path of the vertical movement of the sound box.

95. In combination, a turn-table, a tone arm provided with a swiveled sound box pivoted for vertical movement, a sound-box lifting lever mounted on the tone arm, a spring-actuated member for operating said lifting lever, a trip lever for restraining the spring-actuated member having a part disposed in the path of the vertical movement of the swiveled sound box, and manually operable means for actuating the lifting lever independently of the spring-actuated member.

96. In combination, a turn-table, a tone arm provided with a swiveled sound box pivoted for vertical movement, a sound-box lifting lever mounted on the tone arm, a spring-actuated member for operating said lifting lever, a trip lever for restraining the spring-actuated member having a part disposed in the path of the vertical movement of the swiveled sound box, and manually operable means for actuating the lifting lever independently of the spring-actuated member including a push button on the tone arm and having a projection to engage the lifting lever.

97. In combination, a turn-table, a tone arm provided with a swiveled sound box pivoted for vertical movement, a sound-box lifting lever mounted on the tone arm, a spring-actuated member for operating said lifting lever, a trip lever for restraining the spring-actuated member having a part disposed in the path of vertical movement of the swiveled sound box, and means operable in the swinging movement of the tone arm for operating the lifting lever to lift the sound box from the trip lever.

98. In combination, a turn-table, a tone arm provided with a swiveled sound box pivoted for vertical movement, a sound-box lifting lever mounted on the tone arm, a spring actuated member for operating said lifting lever, a trip lever for restraining the spring-actuated member having a part disposed in the path of the vertical movement of the swiveled sound box, means operable in the swinging movement of the tone arm for operating the lifting lever to lift the sound box from the trip lever and for restoring the spring-actuated member into restrained relation to the trip lever.

99. In combination, a turn-table, a tone arm provided with a swiveled sound box pivoted for vertical movement, a sound-box lifting lever mounted on the tone arm, a spring-actuated member for operating said lifting lever, a trip lever for restraining the spring-actuated member having a part disposed in the path of the vertical movement of the swiveled sound box, means for swinging the tone arm in opposite directions, and means operable in the outward swinging movement of the tone arm for automatically restoring the spring-actuated member into restrained relation to the trip lever.

100. In combination, a turn-table, a tone arm provided with a swiveled sound box pivoted for vertical movement, a sound-box lifting lever mounted on the tone arm, a spring-actuated member for operating said lifting lever, a trip lever for restraining the spring-actuated member having a part disposed in the path of the vertical movement of the swiveled sound box, means for swinging the tone arm in opposite directions, means operable in the outward swinging movement of the tone arm for automatically restoring the spring-actuated member into restrained relation to the trip lever, and means operable in the inward swinging movement of the tone arm for operating the lifting lever to gradually lower the sound box.

101. In combination, a turn-table, a tone arm provided with a swiveled sound box, a sound-box lifting lever mounted on the tone arm, a spring-actuated member for operating said lifting lever, a trip lever for restraining the spring-actuated member having a part disposed in the path of movement of the swiveled sound box, means for swinging the tone arm in opposite directions, and means operable in the outward swinging movement of the tone arm for operating the lifting lever to lift the sound box out of tripping relation to the trip lever.

102. In combination, a turn-table, a tone arm provided with a swiveled sound box, a sound-box lifting lever mounted on the tone arm, a spring-actuated member for operating said lifting lever, a trip lever for restraining the spring-actuated member having a part disposed in the path of movement of the swiveled sound box, means for swinging the tone arm in opposite directions, means operable in the outward swinging movement of the tone arm for operating the lifting lever to lift the sound box out of tripping relation to the trip lever, and means operable in the inward swinging movement of the tone arm for operating the lifting lever to gradually lower the sound box.

103. In combination with a turn-table and a swinging tone arm, indexing mechanism controlling the height of the turn-table including a trip lever provided with an arcuate portion and trip mechanism carried by the tone arm for riding over the arcuate portion of the trip lever.

104. In combination with a turn-table and a swinging tone arm, indexing mechanism controlling the height of the turn-table including a trip lever provided with an arcuate portion, trip mechanism carried by the tone arm for riding over the arcuate portion of the trip lever, said arcuate portion being drawn substantially as an arc struck from the pivotal center of the swinging tone arm.

105. In combination, a turn-table, an automatic record-feeding magazine, a swinging tone arm and control mechanism for the automatic record magazine including a trip lever having an arcuate portion substantially concentric to the pivotal center of the swinging tone arm and a trip device for engagement with said arcuate portion carried by the tone arm.

106. In combination with a swinging tone arm provided with a swiveled sound box, a trip lever operable by said sound box, a power device controlled by said trip lever, a restoring member for said power device, and an operating track disposed for engagement by said restoring member in the outward swinging movement of the tone arm.

107. In combination with a swinging tone arm provided with a swiveled sound box, a trip lever operable by said sound box, a power device controlled by said trip lever, a restoring member for said power device, and operating track disposed for engagement by said restoring member in the outward swinging movement of the tone arm, automatic record-shifting mechanism and a controller for said mechanism carrying the operating track aforesaid.

108. In combination with a turn-table and a vertically movable sound box, automatic record-feeding mechanism, a controller for the record-feeding mechanism, and a power device for actuating said controller under the control of the sound box and actuated by vertical movements of the same.

109. In combination with a turn-table and a vertically movable sound box, automatic record-feeding mechanism, a controller for the record-feeding mechanism, a power device, a trip lever for said power device positioned to be operated by the sound box in the vertical movements of the same, and operating connections from the power device to the controller.

110. In combination with a turn-table and a movable sound box, automatic record-feeding mechanism, a controller for the record-feeding mechanism, a power device, a trip lever for said power device positioned to be operated by the movable sound box, operating connections from the power device to the controller, including a bell-crank lever engaged at one end by the power device and an arcuate track on the controller engaged by the other end of said bell-crank.

111. In combination, a turn-table, automatic record-feeding mechanism, a controller therefor provided with an arcuate track, a swinging tone arm, a bell crank lever carried by said tone arm for engagement with one face of said track, a power device on the tone arm for actuating said bell crank lever and a restoring lever for said power device carried by the tone arm and arranged to engage another face of said arcuate track.

112. In combination, a turn-table, automatic record-feeding mechanism, a controller therefor provided with a track, a swinging tone arm, a lever carried by said tone arm for engagement with one face of said track, a power device on the tone arm for actuating said lever and a restoring lever for said power device carried by the tone arm and arranged to engage the opposite face of said track.

113. In combination, a turn-table, automatic record-feeding mechanism, a controller therefor provided with a track, a swinging tone arm, a lever carried by said tone arm for engagement with one face of said track, a power device on the tone arm for actuating said lever, a restoring lever for said power device carried by the tone arm and arranged to engage another face of said track, a trip lever on the tone arm for normally restraining the power device and a vertically movable sound box on the tone arm arranged to actuate said trip lever upon a falling movement of said sound box.

114. In a phonograph, a tone arm provided with a swiveled sound box pivoted for vertical movement, a power device and a trip lever for normally restraining said power device provided with a trip portion standing in the path of the vertical movement of the sound box and adjustable to suit the normal operating plane of the sound box.

115. In a phonograph, a reproducer supported for vertical swinging movement, a power device and a trip member for normally restraining said power device provided with a trip portion standing in the path of the vertical movement of the reproducer and adjustable to suit the normal operating plane of the reproducer.

116. In a phonograph, a sound box pivoted for vertical swinging movement, a power device and a trip lever for normally restraining said power device provided with a trip portion standing in the path of the vertical movement of the sound box and adjustable to suit the normal operating plane of the sound box.

117. In a phonograph, a tone arm provided with a swiveled sound box and a lifting lever for the sound box pivoted on the tone arm and provided with a sound box engaging portion adjustable to the normal operating plane of the sound box.

118. In a phonograph, a reproducer supported for vertical shifting movements and a lifting member for said reproducer provided with a portion for engagement with the reproducer and adjustable to suit the normal operating plane of the reproducer.

119. In a phonograph, a tone arm provided with a movable sound box and a lifting member for said sound box mounted on the tone arm and provided with a portion for engagement with the sound box and adjustable to suit the normal operating plane of the sound box, a power device on the tone arm and a trip member for normally restraining said power device provided with a trip portion standing in the path of movement of the sound box and adjustable to suit the normal operating plane thereof.

120. In a phonograph, a tone arm provided with a sound box mounted to swing in a substantially vertical plane, a trip member positioned beneath a portion of said sound box and arranged to be actuated thereby upon a falling movement of the sound box, and mechanism controlled by said trip member.

121. In a phonograph, a tone arm provided with a sound box mounted to swing in a substantially vertical plane, a trip member positioned beneath a portion of said sound box and arranged to be actuated thereby upon a falling movement of the sound box, and automatic record-feeding mechanism controlled by said trip member.

122. In a phonograph, a tone arm provided with a sound box mounted to swing in a substantially vertical plane, a trip member positioned beneath a portion of said sound box and arranged to be actuated thereby upon a falling movement of the sound box, mechanism controlled by said trip member, and means for automatically lifting the sound box out of tripping relation to the trip member.

123. In a phonograph, a tone arm provided with a sound box mounted to swing in a substantially vertical plane, a trip member positioned beneath a portion of said sound box and arranged to be actuated thereby upon a falling movement of the sound box, mechanism controlled by said trip member, and manually operable means for lifting the sound box out of tripping relation to the trip member.

124. In a phonograph, a tone arm provided with a sound box mounted to swing in a substantially vertical plane, a trip member positioned beneath a portion of said sound box and arranged to be actuated thereby upon a falling movement of the same, mechanism controlled by said trip member, and a record having a depression therein for dropping the sound box upon a trip member.

125. In a phonograph, a tone arm provided with a sound box mounted to swing in a substantially vertical plane, a trip member positioned beneath a portion of said sound box and arranged to be actuated thereby upon a falling movement of the same, mechanism controlled by said trip member, a record having a depression therein for dropping the sound box upon the trip member, and manually controlled means for dropping the sound box upon the trip member independently of such record-controlled means.

126. In a phonograph, a tone arm provided with a sound box mounted to swing in a substantially vertical plane, a trip member positioned beneath a portion of said sound box and arranged to be actuated thereby upon a falling movement of the same, automatic record-feeding mechanism controlled by said trip member, and a record having a depression therein for dropping the sound box upon a trip member.

127. In a phonograph, a tone arm provided with a sound box mounted to swing in a substantially vertical plane, a trip member positioned beneath a portion of said sound box and arranged to be actuated thereby upon a falling movement of the sound box, mechanism controlled by said trip member, means for automatically dropping the sound box upon the trip member at the end of playing a record, and means for dropping the sound box upon the trip member at any selected point in the playing of a record.

128. In a phonograph, a sound box, automatic controlling mechanism therefor, a trip member for said mechanism controlled by the sound box, means for operating the sound box at the end of the playing of a record to cause the same to actuate said trip member, and means for operating the sound box at variously selected points in the playing of a record to cause the same to actuate said trip member.

129. In a phonograph, a sound box, automatic controlling mechanism therefor, a trip member for said mechanism controlled by the sound box, means for operating the sound box at the end of the playing of a record to cause the same to actuate said trip member, and means for independently actuating said trip member at variously selected points in the playing of a record.

130. In a phonograph, a reproducer, automatic phonograph controlling mechanism including reproducer shifting and record-changing devices, a trip member for said mechanism controlled by the reproducer, means for operating the reproducer at the end of the playing of a record to cause the same to actuate said trip member, and means for operating the reproducer at variously selected points in the playing of a record to cause the same to actuate said trip member to effect operation of the tone arm swinging and record-changing devices at different times.

131. In a phonograph, a vertically adjustable turn-table, a sound box, automatic phonograph controlling mechanism, a trip member for said mechanism operable by the sound box, means for actuating the sound box at the end of the playing of a record to operate said trip member, and manually controlled means for lowering the turn-table to impart a corresponding tripping movement to the sound-box.

132. In a phonograph, a vertically adjustable turn-table, a reproducer, automatic phonograph controlling mechanism, a trip member operable by the dropping of the reproducer, automatic means for dropping the reproducer at the end of the playing of a record and means for lowering the turn-table to impart a corresponding dropping movement to the reproducer.

133. In a phonograph, a vertically adjustable turn-table, a reproducer, automatic record-changing mechanism, a trip member for said mechanism operable by the reproducer, means for actuating the reproducer at the end of the playing of a record to operate said trip member, and means for lowering the turn-table to impart a corresponding tripping movement to the reproducer.

134. In a phonograph, a vertically adjustable turn-table, a reproducer, automatic record-changing mechanism, a trip member operable by the dropping of the reproducer, means for dropping the reproducer at the end of the playing of a record, and independent means for lowering the turn-table to impart a corresponding dropping movement to the reproducer.

135. The combination in a phonograph of automatic record-changing mechanism controlled by the dropping of the reproducer of the phonograph, means for automatically dropping the reproducer at the end of the playing of a record, and manually controlled means for dropping the reproducer at intermediate points in the playing of a record.

136. The combination in a phonograph of automatic record-changing mechanism controlled by the dropping of the reproducer of the phonograph into a plane below that of the normal operating plane, means for automatically dropping the reproducer at the end of the playing of a record, and manually controlled means for dropping the reproducer at intermediate points in the playing of a record including mechanism for lowering the rotating turn-table for the record being played.

137. In a phonograph, the combination with a rotating turn-table and means for automatically lowering the same at the end of the playing of a record, of manually controlled means for substantially instantaneously lowering said turn-table at any selected point in the playing of the record.

138. In a phonograph, the combination with a rotating turn-table and means for automatically lowering the same at the end of the playing of a record, of manually controlled means for lowering said rotating turn-table at any selected point in the playing of the record, automatic record-feeding mechanism, and means operable on either the automatic or the manual lowering of the rotating turn-table for actuating said record-feeding mechanism.

139. The combination with a phonograph and means for automatically changing the records thereon at the end of the playing of each record, of means for setting the automatic record-changing mechanism into operation to change the records prior to the completion of the playing thereof.

140. The combination with a phonograph and means for automatically feeding the records from a stack in sequence thereto, of means controllable at will for selectively playing or omitting the playing of any of said sequentially fed records, whereby said records will be automatically fed and may be played, or not, at will, without affecting the automatic feeding.

141. In a phonograph, a step-by-step vertically adjustable rotating turn-table, a record magazine including means for sequentially feeding records from said magazine to the rotating turn-table, means for automatically lowering the rotating turn-table one step before successive records are added thereto, and manually operable means for lowering the rotating turn-table one step at any point in the playing of a record independently of such automatic action.

142. The combination in a phonograph, of automatic record-changing mechanism, a clutch controlling operation of the same, a rotating turn-table, means for automatically lowering the same before the records are changed, and connections from said lowering mechanism for operating the clutch including a member operable by the lowering force of the turn-table.

143. In combination, a rotating turn-table, a vertically movable support for the same, means for intermittently releasing said support to lower the turn-table, automatic record-changing mechanism and a member operable by the lowering force of the turn-table for controlling said automatic record-changing mechanism.

144. In a phonograph, a turn-table, a non-rotating bushing supporting the same, means for raising and lowering said bushing, and a driving spindle having a sliding driving connection with the turn-table independently of the bushing and operable irrespective of the shifting movements of the bushing.

145. In a phonograph, a support, a non-rotating bushing guided for vertical movement in said support, means for shifting said bushing, a ball bearing carried by the bushing, a turn-table journaled on said ball bearing and a driving shaft extending up through the bushing and having a sliding engagement with the turn-table.

146. In a phonograph, a support, a non-rotating bushing guided for vertical movement in said support, means for shifting said bushing, a ball race at the upper end of the bushing, balls carried thereby, a turn-table having a companion ball race supported on and concentrically guided by said balls, and a driving shaft extending up through the bushing and having a sliding engagement with the turn-table.

147. In a phonograph, a turn-table, a slidably supported bushing supporting said turn-table, means for automatically shifting said bushing, and manually controlled means for shifting the bushing independently of the automatic means.

148. In a phonograph, a rotating turn-table, a vertical slidably supported bushing supporting said turn-table, means for automatically lowering said bushing step-by-step, manually controlled means for lowering the bushing step-by-step independently of the automatic means, and a drive shaft extending through the bushing and having a sliding driving engagement with the turn-table.

149. In a phonograph, a turn-table, a bushing supporting the same provided with racks on different sides thereof, and gear elements engaging said racks and holding said bushing against rotation.

150. In a phonograph, a turn-table, a bushing supporting the same provided with racks on different sides thereof, gear elements engaging said racks and holding said bushing against rotation, automatic mechanism controlling one of said racks, and hand-operated means for controlling the other rack.

151. In a phonograph, a support, a bushing guided for vertical movement in said support and provided with a rack, a gear element engaged with said rack, means for operating said gear element, a turn-table rotatably supported on the bushing and a drive shaft extending up through the bushing and having a sliding driving engagement with the turn-table.

152. In a phonograph, a vertically movable turn-table support provided with a rack, a gear element engaging said rack and automatically controlled indexing mechanism controlling said gear element.

153. In a phonograph, a shiftable turn-table support provided with a rack, a gear segment engaging said rack and indexing mechanism controlling said gear segment.

154. In a phonograph, a turn-table, a vertically shiftable turn-table support, indexing mechanism for lowering the same step-by-step, and means for elevating the turn-table support with a continuous movement independently of such indexing mechanism.

155. In a phonograph, a vertically shiftable turn-table support, indexing mechanism for lowering the same step-by-step, means for elevating the turn-table support independently of such indexing mechanism and including gear elements and a handle for operating the same.

156. In a phonograph, a vertically shiftable turn-table support, an index wheel, a controlling pawl therefor and connections between the index wheel and shiftable turn-table support.

157. In a phonograph, a shiftable turn-table support, an index wheel, a controlling pawl therefor and connections between the index wheel and shiftable turn-table support, said index wheel being operable only in one direction, and means for shifting the support in a direction the reverse of that controlled by the index wheel.

158. In a phonograph, a shiftable turn-table support, an index wheel, a controlling pawl therefor and connections between the index wheel and shiftable turn-table support, the index wheel being operable only in a direction to lower the turn-table support, and means for elevating the turn-table support.

159. In a phonograph, a shiftable turn-table support, an index wheel, a controlling pawl therefor and connections between the index wheel and shiftable turn-table, the index wheel being operable only in a direction to lower the turn-table support, means for elevating the turn-table support, the connections between the index wheel and turn-table support including a pawl and ratchet to enable the index wheel to remain stationary while the turn-table support is being elevated.

160. In a phonograph, a turn-table support provided with gear teeth, a gear element in mesh with said gear teeth, a pinion engaged by said gear element, an index wheel connected with said pinion and a control pawl for said index wheel.

161. In a phonograph, a turn-table support provided with gear teeth, a gear element in mesh with said gear teeth, a pinion engaged by said gear element, an index wheel connected with said pinion, a control pawl for said index wheel, and a pawl and ratchet included in the connection between the pinion and index wheel.

162. In a phonograph, a shiftable turn-table support provided with a rack, a double-ended gear element engaged at one end with said rack, a gear engaged by the opposite end of said gear element, a ratchet carried by said gear, an index wheel provided with a pawl for engagement with said ratchet, and a control pawl for the index wheel.

163. In a phonograph, a shiftable turn-table support provided with a rack, a double-ended gear segment engaged at one end with said rack, a gear engaged by the opposite end of said segment, a ratchet associated with said gear, an index wheel provided with a pawl for engagement with said ratchet, a control pawl for the index wheel, and a turn-table control member having gear teeth in mesh with the gear aforesaid.

164. In combination, a turn-table, a shiftable support therefor, a control for the turn-table, a shiftable support for said control, and connections between the shiftable turn-table and the control support for maintaining a substantially constant relation between the control and turn-table.

165. In combination, a turn-table, a shiftable support therefor, a control for the turn-table, a shiftable support for said control, connections between the shiftable turn-table and the control support for maintaining a substantially constant relation between the control and turn-table, said connections including gear teeth on the turn-table and control supports, and interposed gear elements in mesh with said gear teeth.

166. In combination, a turn-table, a shiftable support therefor, a control for the turn-table, a shiftable support for said control, connections between the shiftable turn-table and the control support for maintaining a substantially constant relation between the control and turn-table, said connections including gear teeth on the turn-table and control supports, a pinion in mesh with the gear teeth on one of said supports, and a gear element in mesh at one side with said pinion and at the opposite side in mesh with the gear teeth of the other support.

167. In combination, a shiftable turn-table support provided with a gear element, a gear having connection with said gear element, an index wheel, a pawl and ratchet connection between said index wheel and the gear, and a control pawl for the index wheel.

168. In a phonograph, a turn-table, a brake therefor, index mechanism for intermittently lowering the turn-table, and means for maintaining a constant operative relation of the brake and turn-table.

169. In a phonograph, a turn-table, a brake therefor, index mechanism for intermittently lowering the turn-table, means for maintaining a constant operative relation of the brake and turn-table including a shiftable support for the brake, and means for shifting said support synchronously with the shifting of the turn-table.

170. In combination, a shiftable turn-table support provided with a rack, a pinion, a gear element interposed between said rack and said pinion, and a brake carrier for the turn-table provided with gear teeth in mesh with the pinion.

171. In combination, a shiftable turn-table support provided with a rack, a pinion, a gear element interposed between said rack and said pinion, a brake carrier for the turn-table provided with gear teeth in mesh with the pinion, an index member, and a pawl and ratchet connection between the pinion and said index member.

172. In a phonograph, a shiftable turn-table support provided with gear teeth, a shaft, a gear on said shaft, an interposed gear element in mesh with said gear and with the gear teeth of the support, index wheels on the shaft at opposite sides of the gear thereon and control pawls for engagement with said index wheels.

173. In a phonograph, a shiftable turn-table support provided with gear teeth, a shaft, a gear on said shaft, an interposed gear element in mesh with said gear and with the gear teeth of the support, index wheels on the shaft at opposite sides of the gear thereon, control pawls for engagement with said index wheels, and pawl and ratchet connections between the shaft and index wheels.

174. In a phonograph, a vertically adjustable rotating turn-table provided with relatively fixed driving means, means for intermittently lowering the same step-by-step toward its driving means, a control for the turn-table, and means for automatically operating said control when said turn-table is lowered to its lowermost position.

175. In a phonograph, a step-by-step vertically adjustable turn-table, means for intermittently lowering the same including a pivoted member, a control for the turn-table, and means actuated by the pivoted member for operating said control.

176. In a phonograph, step-by-step turn-table lowering mechanism, a brake for the turn-table, and a brake-controlling member operated by the turn-table lowering mechanism.

177. In a phonograph, step-by-step turn-table lowering mechanism, a brake for the turn-table, and a brake-controlling slide operated by the turn-table lowering mechanism.

178. In a phonograph, step-by-step turn-table lowering mechanism including a rocking lever, a slide positioned to be actuated by said rocking lever, and a brake for the turn-table under the control of said slide.

179. In a phonograph, a shiftable turn-table support, automatic turn-table lowering mechanism engaging said support in one plane, and turn-table raising mechanism engaging the support in a plane substantially at right angles to the first plane.

180. In a phonograph, a shiftable turn-table support provided with racks on different sides thereof, a gear element engaged with one of said racks, automatic turn-table lowering mechanism controlling said gear element, a gear element engaging the other rack, and means for operating said last-mentioned gear element for raising the turn-table.

181. In a phonograph, a shiftable turn-table support, means for elevating the same including a hollow operating shaft, automatic lowering mechanism connected with the turn-table support, and a controller for said mechanism extending through the hollow shaft.

182. In a phonograph, a shiftable turn-table support, means for elevating the same including a hollow operating shaft, automatic lowering mechanism connected with the turn-table support, and a controller for said mechanism extending through the hollow shaft, said controller being of tubular construction, a rod extending through said controller and a controller for the turn-table operated by said rod.

183. In a phonograph, a shiftable turn-table support, gearing for shifting the same, a tubular shaft for operating said gearing, a control member extending through said tubular shaft, and automatic turn-table-controlling mechanism operable by said member.

184. In a phonograph, a shiftable turn-table support, gearing for shifting the same, a tubular shaft for operating said gearing, a control member extending through said tubular shaft, automatic turn-table-controlling mechanism operable by said member, said mechanism operable by said member, said member being of tubular construction, a rod extending through said tubular member, and a second control for the turn-table operable by said rod.

185. In a phonograph, a step-by-step vertically shiftable turn-table, indexing mechanism controlling the vertical step-by-step movements of the same, and manually operable means for controlling said indexing mechanism.

186. In a phonograph, a step-by-step vertically adjustable turn-table, means for automatically feeding supporting and lowering records on to said turn-table, index mechanism for automatically lowering the turn-table step by step before the records are fed thereto, and manually operable means for controlling the index mechanism independently of the automatic control and independently of the record lowering mechanism.

187. In a phonograph, turn-table shifting mechanism including a tubular shaft, automatic turn-table shifting mechanism, and means for controlling said automatic mechanism including a shaft located in the tubular shaft, a cam on said shaft and connections from said cam to the automatic mechanism.

188. In a phonograph, turn-table shifting mechanism including a tubular shaft, automatic turn-table shifting mechanism and means for controlling said automatic mechanism including a shaft located in the tubular shaft, a cam on said shaft and connections from said cam to the automatic mechanism said inner shaft being also of tubular construction, a rod extending therethrough and a stop for the turn-table operated by said rod.

189. In a phonograph, a shiftable turn-table, automatic means for lowering the same and a controlling member therefor operable in one direction to prevent automatic lowering of the turn-table, and operable in the reverse direction to trip the automatic turn-table-lowering mechanism.

190. In a phonograph, a shiftable turn-table, automatic means for lowering the same, a controlling member therefor operable in one direction to prevent automatic lowering of the turn-table, and operable in the reverse direction to trip the automatic turn-table-lowering mechanism, and means for automatically returning said control member to a neutral position.

191. In a phonograph, automatic record-feeding and turn-table-lowering mechanism, and controlling means therefor including an index wheel, a control pawl for engagement with the teeth of said index wheel, and a slide positioned to be operated by said teeth.

192. In a phonograph, automatic record-feeding and turn-table-lowering mechanism, controlling means therefor including an index wheel, a control pawl for engagement with the teeth of said index wheel, a slide positioned to be operated by said teeth, means for rocking the pawl and a finger carried by said pawl for shifting the slide into position to be engaged by said teeth.

193. In a phonograph, automatic record-feeding and turn-table-lowering mechanism, controlling means therefor including an index wheel, a control pawl for engagement with the teeth of said index wheel, a slide positioned to be operated by said teeth, and a control clutch operated by said slide.

194. The combination with a phonograph, of automatic control mechanism therefor including a toothed index wheel, a control pawl for said index wheel, and an actuating member adapted to be shifted by said pawl into position to be engaged by the teeth of the index wheel.

195. The combination with a phonograph, of automatic control mechanism therefor including a toothed index wheel, a control pawl for said index wheel, and a movable actuating member carried by the pawl and adapted to be shifted thereby into position to be engaged and operated by the teeth of the index wheel.

196. In a phonograph, automatic record-feeding and turn-table-lowering mechanism and controlling means therefor including an index member, a control pawl for engagement with the teeth of said index member, and a slide positioned to be operated by said teeth.

197. The combination with a phonograph and automatic controlling mechanism therefor including a toothed index member, a control pawl therefor and an actuating slide carried by said pawl.

198. The combination with a phonograph and automatic controlling mechanism therefor including a toothed index wheel, a control pawl therefor, an actuating slide carried by said pawl and positioned thereby in the path of engagement by the teeth of the index wheel.

199. The combination with a phonograph and automatic controlling mechanism therefor including a toothed index wheel, a control pawl therefor, an actuating slide carried by said pawl and positioned thereby in the path of engagement by the teeth of the index wheel, and means for automatically shifting the slide out of the plane of engagement with the teeth.

200. The combination with a phonograph and automatic controlling mechanism therefor including a toothed index wheel, a control pawl therefor, an actuating slide carried by said pawl and positioned thereby in the path of engagement by the teeth of the index wheel, means for automatically shifting the slide out of the plane of engagement with the teeth, and means for manually returning the slide out of the plane of engagement with the teeth.

201. In combination with a phonograph, control mechanism therefor including a rocking member, a slide carried by said rocking member, a toothed member, and means for positioning the slide on the rocking member to be engaged by the toothed member.

202. In combination with a phonograph, control mechanism therefor including a rocking member, a slide carried by said rocking member, a toothed member, means for positioning the slide on the rocking member to be engaged by the toothed member, and means for returning the slide into position free of engagement by the toothed member.

203. In combination with a phonograph, control mechanism including an index wheel, a pawl for engagement with said index wheel, a slide carried by said pawl and normally standing in position free of the teeth of the index wheel, and means for rocking said pawl to free the same from the index wheel and to carry the slide into position to be actuated by the teeth of the index wheel.

204. In combination with a phonograph, control mechanism including an index wheel, a pawl for engagement with said index wheel, a slide carried by said pawl and normally standing in position free of the teeth of the index wheel, and means for rocking said pawl to free the same from the index wheel and to carry the slide into position to be actuated by the teeth of the index wheel, said slide having a shoulder to be engaged by the teeth when so positioned.

205. In combination with a phonograph, control mechanism including an index wheel, a pawl for engagement with said index wheel, a slide carried by said pawl and normally standing in position free of the teeth of the index wheel and means for rocking said pawl to free the same from the index wheel and to carry the slide into position to be actuated by the teeth of the index wheel, said slide when thus positioned forming a connection enabling the tooth engaging therewith to rock the pawl back into position for holding engagement with the index wheel.

206. In means for controlling automatic function thereof, including a rocking member, a shiftable slide carried by said rocking member, a toothed member, and means for positioning the slide on the rocking member to be engaged by the toothed member.

207. In a phonograph, a toothed index wheel, a controlled pawl therefor, a clutch-operating member, and a slide carried by the pawl and positioned thereby to engage the clutch-operating member.

208. In a phonograph, a toothed index member, a pawl controlling the same, a slide carried by said pawl and shifted thereby into position to be engaged and actuated by the teeth of the index member, and a control-operating member disposed in position to be engaged and operated by the slide.

209. In a phonograph, a toothed-operating member, a rocking lever, a slide mounted on said lever, means for swinging the lever to carry the slide into position to be engaged and actuated by the toothed member, and a control operating member positioned to be engaged and actuated by the slide.

210. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, and a projection on the slide adjoining the shoulder and over which the teeth may ride for the purpose of rocking the lever back into its initial position.

211. In a phonograph, a toothed operating member, a rocking lever, a slide mounted on said lever and provided with a shoulder having an inclined cam surface to be engaged by the teeth of said member, means for rocking the lever to carry the shoulder on the slide into position to be engaged by the teeth of said member whereby said slide will be shifted on the lever and a projection on the slide adjoining the shoulder and over which the teeth may ride for the purpose of rocking the lever back into its initial position.

212. In a phonograph, a toothed operating member a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, and a projection on the slide adjoining the shoulder and over which the teeth may ride for the purpose of rocking the lever back into its initial position, and said projection forming an abutment preventing the tripping of the lever.

213. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, and a projection on the slide adjoining the shoulder and over which the teeth may ride for the purpose of rocking the lever back into its initial position, the lever having a pawl for engaging the toothed member.

214. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a turn-table and a record-changing mechanism, and indexing mechanism therefor including said toothed member.

215. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the teeth with the projection on the slide.

216. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a control-operating lever normally free of the slide but standing in a position to be engaged by the slide when it is shifted on the lever and to be then actuated by the slide as the lever is depressed through the engagement of the tooth with the projection on the slide.

217. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, means for returning the slide to its initial position, and connections from the slide for returning the member actuated thereby.

218. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, and means for automatically returning the slide to its initial position.

219. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide standing in a position to be engaged by the slide when it is shifted on the lever and to be then actuated by the slide as the lever is depressed through the engagement of the tooth with the projection on the slide, and manually controlled means for returning the slide to its initial position.

220. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, and a clutch actuated by the slide-operated member.

221. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, and means engaging the slide for the purpose of tripping the lever, said means being rendered inoperative by the shifting of the slide on the lever.

222. In a phonograph, a toothed ratchet wheel, a rocking lever having a pawl for engagement with the teeth of said ratchet wheel, a slide mounted on said lever and provided with a shoulder to be engaged by the teeth of said ratchet wheel, means for rocking the lever to carry the shoulder on the slide into position to be engaged by the teeth of said ratchet wheel whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, means for engaging the slide for the purpose of tripping the lever, said means being rendered inoperative by the shifting of the slide on the lever, and means for restoring the slide and adapted to render the tripping connection effective again.

223. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, a clutch-shifting lever actuated by the slide-operated member and a returning lever 224. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, and a phonograph brake-control mechanism for returning the slide to the initial position.

225. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, and a phonograph brake-control mechanism for returning the slide to the initial position and operable to stop the machine without shifting the slide.

226. In a phonograph, a toothed operating member, a rocking lever, a slide mounted on said lever and provided with a shoulder to be engaged by the teeth of said member, means for rocking the lever to carry the shoulder on the slide into position to be engaged by the teeth of said member whereby said slide will be shifted on the lever, a projection on the slide adjoining the shoulder and over which the teeth may ride for the purpose of rocking the lever back into its initial position, a member normally free of the slide but standing in a position to be engaged by the slide when it is shifted on the lever and to be then actuated by the slide as the lever is depressed through the engagement of the tooth with the projection on the slide, and a phonograph brake-control mechanism for returning the slide to the initial position, including a brake-controlling slide and a rocking-beam connection between this slide and the index-pawl slide.

227. In a phonograph, brake mechanism including a brake lever, a slide for retracting the brake lever and a trip slide for holding the brake lever retracted and actuated from the retracting slide.

228. In a phonograph, brake mechanism including a brake lever, a slide for retracting the brake lever and a trip slide for holding the brake lever retracted and actuated from the retracting slide by means of a rocking lever engaging at its opposite ends with the two slides.

229. In a phonograph, brake mechanism including a brake lever, a slide for retracting the brake lever and a trip slide for holding the brake lever retracted and actuated from the retracting slide, and a holding shoulder for the brake lever on the brake-retracting slide.

230. In a phonograph, brake mechanism including a brake lever, a slide for retracting the brake lever and a trip slide for holding the brake lever retracted and actuated from the retracting slide, a vertically shiftable turn-table, means for controlling the position of the same including a gear segment and a retracting projection carried thereby for operating the retracting slide.

231. In combination, indexing mechanism including double index wheels connected to operate as a unit and separate controls for a phonograph actuated by the individual index wheels.

232. In combination, indexing mechanism including double index wheels and separate controls actuated by the same, phonograph record-changing mechanism governed by one control and other mechanism governed by the other control.

233. In combination, indexing mechanism including double index wheels and separate controls actuated by the same, phonograph record-changing mechanism governed by one control and other mechanism governed by the other control, said other mechanism consisting of an intermission movement.

234. The combination with a phonograph including a driving motor therefor, of automatic record-changing mechanism applicable as a unit to the phonograph and having operating means adapted to be coupled to the phonograph motor.

235. The combination with a phonograph including a driving motor therefor, of automatic record-changing mechanism applicable as a unit to the phonograph and having operating means adapted to be coupled to the phonograph motor, an electric motor for restoring the energy of the phonograph motor and means automatically operated by the record-changing mechanism for cutting in the electric restoring motor during the record-changing intervals of the automatic mechanism.

236. The combination with a phonograph including a driving motor therefor, of automatic record-changing mechanism applicable as a unit to the phonograph and having operating means adapted to be coupled to the phonograph motor, an electric motor for restoring the energy of the phonograph motor, means automatically operated by the record-changing mechanism for cutting in the electric restoring motor during the record-changing intervals of the automatic mechanism and comprising a swinging lever forming part of the automatic mechanism and a member actuated thereby for controlling the winding motor.

237. The combination with a phonograph including a driving motor therefor, of automatic record-changing mechanism applicable as a unit to the phonograph and having operating means adapted to be coupled to the phonograph motor, an electric motor for restoring the energy of the phonograph motor, means automatically operated by the record-changing mechanism for cutting in the electric restoring motor during the record-shifting intervals of the automatic mechanism and comprising a swinging lever for swinging the tone arm of the phonograph forming part of the automatic mechanism and a member actuated thereby for controlling the electric motor.

238. The combination with a phonograph including a driving motor therefor, of automatic record-changing mechanism applicable as a unit to the phonograph and having operating means adapted to be coupled to the phonograph motor, an electric motor for restoring the energy of the phonograph motor, means automatically operated by the record-changing mechanism for cutting in the electric restoring motor during the record-changing intervals of the automatic mechanism and comprising a swinging lever forming part of the automatic mechanism, and a member actuated thereby for controlling the electric motor, the electric motor control being actuated in the first part of the movement of the swinging lever and the control being rendered ineffective thereafter.

239. The combination with a phonograph including a driving motor therefor, of automatic record-changing mechanism applicable as a unit to the phonograph and having operating means adapted to be coupled to the phonograph motor, an electric motor for restoring the energy of the phonograph motor, means automatically operated by the record-changing mechanism for cutting in the electric restoring motor during the record changing intervals of the automatic mechanism and comprising a swinging lever forming part of the automatic mechanism, a member actuated thereby for controlling the electric motor, the electric motor control being actuated in the first part of the movement of the swinging lever and the control being rendered ineffective thereafter, the electric motor control comprising a pivoted lever made in two parts pivotally connected, and a slide forming a breakable connection between the two.

240. The combination with phonograph mechanism including a swinging tone arm, of a tone arm swinging lever, opposed reversely operating cam elements, an arm on the tone arm swinging lever arranged for engagement with either of said reversely operating cams and means for effecting relative engagement and disengagement of said arm and reversely operating cam elements.

241. The combination with phonograph mechanism, including a swinging tone arm, of a tone arm swinging lever, opposed reversely operating snail cams, an arm on the tone arm swinging lever arranged for engagement with either of said reversely operating cams, and means for effecting relative engagement and disengagement of said arm and reversely operating snail cams.

242. In combination with phonograph mechanism, a tone arm swinging lever provided with a shiftable arm, reversely operating snail cams arranged in opposed relation at opposite sides of said arm, and means for shifting the arm alternately into engagement with the respective snail cams.

243. In combination with phonograph mechanism, a tone arm swinging lever provided with a shiftable arm, reversely operating snail cams arranged in opposed relation at opposite sides of said arm, means for shifting the arm alternately into engagement with the respective snail cams, and a shiftable cam element on one of said cams and arranged to be displaced by the arm aforesaid.

244. In combination with phonograph mechanism, a tone arm swinging lever provided with a tiltable arm, reversely operating snail cams arranged in opposed relation at opposite sides of said arm, means for tilting the arm alternately into engagement with the respective snail cams, a shiftable cam element on one of said snail cams and arranged to be shifted by the arm aforesaid, and record-changing mechanism actuated by the shiftable cam element.

245. In combination with phonograph mechanism, a tone arm swinging lever provided with a shiftable arm, reversely operating snail cams arranged in opposed relation at opposite sides of said arm, means for shifting the arm alternately into engagement with the respective snail cams, including a slide, and a projection on the shiftable arm engaged by the slide.

246. In combination with phonograph mechanism, a tone arm swinging lever provided with a shiftable arm, reversely operating snail cams arranged in opposed relation at opposite sides of said arm, means for shifting the arm alternately into engagement with the respective snail cams including a slide, and a projection on the shiftable arm engaged by the slide, the slide having spaced shoulders forming tracks for engagement by the projection on the arm.

247. In combination with phonograph mechanism, a tone arm swinging lever provided with a shiftable arm, reversely operating snail cams arranged in opposed relation at opposite sides of said arm, means for shifting the arm alternately into engagement with the respective snail cams including a slide, and a projection on the shiftable arm engaged by the slide, the slide having spaced shoulders forming tracks for engagement by the projection on the arm, said tracks being of arcuate construction to engage and hold the projection in definite planes during the swinging movements of the arm.

248. In combination with phonograph mechanism, a tone arm swinging lever provided with a shiftable arm, reversely operating snail cams arranged in opposed relation at opposite sides of said arm, means for shifting the arm alternately into engagement with the respective snail cams including a slide, and a projection on the shiftable arm engaged by the slide, the slide having spaced shoulders forming tracks for engagement by the projection on the arm, said positioning slide being actuated from the cam element which is shifted by the arm.

249. In combination with phonograph mechanism, a tone arm swinging lever provided with shiftable arm, reversely operating snail cams arranged in opposed relation at opposite sides of said arm, means for shifting the arm alternately into engagement with the respective snail cams including a slide, a projection on the shiftable arm engaged by the slide, the slide having spaced shoulders forming tracks for engagement by the projection on the arm, said positioning slide being actuated from the cam element which is shifted by the arm, indexing mechanism including a pawl, and a slide on the index pawl for actuating the arm positioning slide.

250. A phonograph having a tone arm and a pivoted tone arm swinging lever having an arm pivoted transversely of the axis on which the lever swings, reversely operating members at opposite sides of said pivoted arm and means for shifting said arm from engagement with one into engagement with the other of said reversely operating members.

251. A step-by-step vertically adjustable turntable and indexing means therefor including an index wheel and a controlling pawl, a tone arm swinging lever, a snail cam for operating same, a slide for effecting engagement of the snail cam and lever, a slide on the controlling pawl, and a member having a part standing in the path of the controlling pawl slide for shifting the slide which engages the snail cam and lever.

252. A step-by-step vertically adjustable turntable and indexing means therefor including an index wheel and a controlling pawl, a tone arm swinging lever, a snail cam for operating same, a slide for effecting engagement of the snail cam and lever, a slide on the controlling pawl, and a member having a part standing in the path of the controlling pawl slide for shifting the slide which engages the snail cam and lever, said member being operable to return the controlling pawl slide and the engaged part of said member being yieldable to pass beyond a shoulder on the controlling pawl slide.

253. In a phonograph, the combination with a swinging tone arm, a lever for swinging the same in one direction, and means operated by said lever for temporarily restraining the tone arm at a selected point in the swinging movement thereof.

254. In a phonograph, the combination with a swinging tone arm, a lever for swinging the same in one direction and means operated by said lever for temporarily restraining the tone arm at a selected point in the swinging movement thereof comprising relatively movable jaws, and a member carried by the tone arm and engaged by said jaws.

255. In a phonograph, the combination with a swinging tone arm, a lever for swinging the same in one direction, and means operated by said lever for temporarily restraining the tone arm at a selected point in the swinging movement thereof comprising relatively movable jaws, and a member carried by the tone arm and engaged by said jaws, one of said jaws having a movement to swing the tone arm in the reverse direction.

256. In a phonograph, the combination with a swinging tone arm, a lever for swinging the same in one direction and means operated by said lever for temporarily restraining the tone arm at a selected point in the swinging movement thereof comprising relatively movable jaws, and a member carried by the tone arm and engaged by said jaws, link connections for operating the jaws, and a spring pallet operably engaged by the tone arm swinging lever in its return movement and yielding to the movement of said lever in said return direction.

257. In a phonograph, the combination with a swinging tone arm, a lever for swinging the same in one direction, and means operated by said lever for temporarily restraining the tone arm at a selected point in the swinging movement thereof, a stylus carried by the tone arm, and means for automatically lowering said stylus while the tone arm is thus temporarily restrained.

258. In a phonograph, the combination with a swinging tone arm, a lever for swinging the same in one direction, means operated by said lever for temporarily restraining the tone arm at a selected point in the swinging movement thereof comprising relatively movable jaws, a member carried by the tone arm and engaged by said jaws, and an arcuate member supporting said jaws.

259. In a phonographic mechanism, a rotating turn-table, a swinging tone arm carrying a stylus, means for automatically swinging the tone arm to carry the stylus to one side of the turn-table, means for automatically swinging the tone arm to carry the stylus back over the turn-table and to thereupon gradually lower the stylus toward the rotating turn-table, and means for automatically temporarily holding the tone arm against swinging movement while the stylus is being thus gradually lowered.

260. In phonographic mechanism, a rotating turntable, a swinging tone arm carrying a stylus, means for automatically swinging the tone arm to carry the stylus to one side of the turn-table, means for automatically swinging the tone arm to carry the stylus back over the turn-table and to thereupon gradually lower the stylus toward the turn-table, and automatic means for temporarily positively holding the tone arm when swung to one side of the rotating turn-table.

261. In phonographic mechanism, a rotating turn-table a swinging tone arm carrying a stylus, means for automatically swinging the tone arm to carry the stylus to one side of the turn-table, means for temporarily positively holding the tone arm in such position, means for automatically swinging the tone arm to carry the stylus back over the turn-table and to thereupon gradually lower the stylus toward the turn-table, and means for automatically changing the records on the rotating turn-table after the tone arm is thus swung and held to one side of the same.

262. In phonographic mechanism, a rotating turn-table, a swinging tone arm carrying a stylus, means for swinging the tone arm to carry the stylus to one side of the turn-table, means for automatically swinging the tone arm to carry the stylus back over the turn-table and to thereupon gradually lower the stylus toward the turn-table, means for temporarily positively holding the tone arm when thus swung to one side of the turn-table, and also while the stylus is being lowered, and means for automatically changing the records on the rotating turn-table while the tone arm is thus positively held to one side of the same.

263. In phonographic mechanism, a swinging tone arm, a lever for swinging the same, a snail cam for operating said lever and means for automatically rendering said snail cam inoperative with respect to said lever.

264. In phonographic mechanism, a swinging tone arm, a lever for swinging the same, a snail cam for operating said lever, and means for automatically rendering said snail cam inoperative with respect to said lever comprising a shiftable point forming part of the beginning of the snail cam, and means for automatically shifting said point out of the path of the lever.

265. In phonographic mechanism, a swinging tone arm, a lever for swinging the same, a snail cam for operating said lever, means for automatically rendering said snail cam inoperative with respect to said lever comprising a shiftable point forming a part of the beginning of the snail cam, means for automaticlly shifting said point out of the path of the lever, and automatic record-changing mechanism controlling the shifting of the cam point.

266. In phonographic mechanism, a step-by-step vertically adjustable rotating turn-table, a swinging tone arm, a lever for swinging the same, a snail cam for operating said lever, means for automatically rendering said cam inoperative with respect to said lever comprising a shiftable point forming the lead of the cam, means for automatically shifting the same out of the path of the lever, and including automatic turn-table lowering mechanism controlling the shifting of the cam point, and means operated thereby for shifting the cam point.

267. In combination, a tone arm swinging lever, opposed snail cams, an arm carried by the lever and positioned between said snail cams, and speed change gearing between the snail cams.

268. In combination, a tone arm swinging lever, opposed snail cams, an arm carried by the lever and positioned between said snail cams, speed change gearing between the snail cams, and means for shifting the arm from engagement with one cam into engagement with the other cam.

269. In combination, a tone arm swinging lever, opposed snail cams, an arm carried by the lever and positioned between said snail cams, speed change gearing between the snail cams, and means for shifting the arm from engagement with one cam into engagement with the other cam, the cam which swings the tone arm inwardly operating at faster speed than the cam which swings the tone arm outwardly.

270. In phonographic mechanism, a driving motor provided with an upright spindle, a turn-table driven by said spindle, a clutch slidably keyed on the spindle and automatic record changing mechanism including members rotatable about the spindle but normally free thereof and provided with a clutch element disposed to be operably engaged by the slidable clutch element on the spindle.

271. In phonographic mechanism, a driving motor provided with an upright spindle, a turn-table driven by said spindle, a clutch slidably keyed on the spindle and automatic record changing mechanism including members rotatable about the spindle but normally free thereof and provided with a clutch element disposed to be operably engaged by the slidable clutch element on the spindle, and automatically controlled means for shifting the slidable clutch element into engagement with the companion clutch element.

272. In phonographic mechanism, a driving motor provided with an upright spindle, a turn-table driven by said spindle, a clutch slidably keyed on the spindle and automatic record changing mechanism including members rotatable about the spindle but normally free thereof and provided with a clutch element disposed to be operably engaged by the slidable clutch element on the spindle, automatically controlled means for shifting the slidable clutch element into engagement with the companion clutch element, and a spring surrounding the spindle and normally supporting the slidable clutch element free of the companion element.

273. In phonographic mechanism, a driving motor provided with an upright spindle, a turn-table driven by said spindle, a clutch slidably keyed on the spindle, automatic record changing mechanism including members rotatable about the spindle but normally free thereof and provided with a clutch element disposed to be operably engaged by the slidable clutch on the spindle, automatically controlled means for shifting the slidable clutch element into engagement with the companion clutch element, and manually controlled means for shifting the slidable clutch element into engagement with the companion clutch element.

274. In phonographic mechanism, a driving motor provided with an upright spindle, a turn-table driven by said spindle, a clutch slidably keyed on the spindle and automatic record changing mechanism including members rotatable about the spindle but normally free thereof and provided with a clutch element disposed to be operably engaged by the slidable clutch element on the spindle, and means automatically operable at the end of the playing of a record on the turn-table for shifting the slidable clutch element into engagement with the companion clutch element.

275. In a phonograph, a turn-table, a vertically swinging reproducer, means for supporting a stack of records above the turn-table, a trip lever supported for actuation by the reproducer, means carried by each record at the end of the sound groove therein for depressing the reproducer to actuate the trip lever and record-lowering mechanism controlled by the trip lever.

276. In a phonograph, a swinging tone arm and means for swinging the same comprising a stud and a pair of coöperating jaws engaging the same and one of which jaws has a yieldable section to yieldingly hold the stud.

277. In a phonograph, a swinging tone arm and means for swinging the same comprising a stud and a pair of coöperating jaws engaging the same and one of which jaws has a yieldable section to yieldingly hold the stud, said stud being carried by the tone arm and the jaws being supported independently of the tone arm and normally free of the tone arm stud.

278. In a phonograph, a turn-table, a swinging tone arm, means for swinging the tone arm clear of the turn-table and means for returning the tone arm over the turn-table including a yieldable element tensioned to resist free swinging movement of the tone arm and normally standing clear of the tone arm.

279. In a phonograph, a turn-table, a swinging tone arm, means for swinging the tone arm clear of the turn-table and means for returning the tone arm over the turn-table including a yieldable element tensioned to temporarily oppose the inward swinging movement of the tone arm.

280. In a phonograph, a step-by-step automatically lowered turn-table and a program carrier automatically shifted in accordance with the step-by-step movements of the turn-table.

281. In a phonograph, a step-by-step vertically adjustable turn-table, means for intermittently lowering the same, a program carrier and connections from the lowering mechanism for shifting the program carrier in step with the lowering of the turn-table.

282. In a phonograph, a step-by-step vertically adjustable turn-table, means for intermittently lowering the same, a program carrier and connections from the lowering mechanism for shifting the program carrier in step with the lowering of the turn-table. but a greater distance of travel.

283. In a phonograph, a step-by-step vertically adjustable turn-table, means for intermittently lowering the same, a program carrier and connections from the turn-table lowering mechanism for automatically lowering the program carrier in step with the lowering of the turn-table and whereby movements of both turn-table and program carrier are assisted by gravity.

284. In apparatus of the character described, a rotating turn-table, a swinging tone arm and tone arm swinging mechanism including a yielding member for yieldingly holding the tone arm in starting position over the turn-table.

285. In apparatus of the character described, a rotating turn-table, a swinging tone arm and a member for returning the tone arm over the turn-table provided with a yieldable element for yieldingly holding the tone arm.

286. In apparatus of the character described, a rotating record support, a swinging tone arm and a member for returning the tone arm over the rotating record support provided with a yieldable element for yieldingly holding the tone arm, and means for automatically releasing the yieldable element from engagement with the tone arm.

287. In apparatus of the character described, a step-by-step vertically adjustable turn-table, an index wheel, a pawl controlling the same, a slide carried by said pawl and operable by the index wheel, and manually controllable means for locking said slide against operation by the index wheel.

288. In apparatus of the character described, a step-by-step vertically adjustable turn-table, an index wheel, a pawl controlling the same, a slide carried by said pawl and operable by the index wheel, means for automatically tripping the pawl, and independent means for operating the slide to trip the pawl.

289. In apparatus of the character described, a phonograph, automatic record changing mechanism therefor, and means for automatically stopping the phonograph for predetermined periods between the playing of different records.

290. In combination, a phonograph, automatic record changing mechanism operated thereby, an intermission movement, and means for putting said intermission movement into operation and for stopping the phonograph between the playing of different records.

291. In apparatus of the character described, a turn-table, a record guiding spindle projecting up from said turn-table and a record magazine above the turn-table and provided with a dependent record guiding spindle in line with and opposed to the turn-table spindle said dependent spindle being of tubular construction to enable the passage of a driven element therethrough.

292. In a phonograph, the combination with a reproducer carrying a stylus, of a stylus gage to coöperate with the stylus in a certain position of the reproducer, said gage including a slidably supported plate movable toward the stylus and an adjustable stop for limiting the movement of the gage plate toward the stylus.

293. In combination, a step-by-step vertically adjustable turn-table, a tone arm, a tone arm swinging lever, a snail cam for operating said lever provided with a retractable point, automatic turn-table lowering mechanism and connections therefrom for operating the retractable point of the snail cam when the turn-table has been lowered to a predetermined point.

294. The combination with a phonograph, of means for automatically changing the records thereon and a program carrier operable in synchronism with the automatic changing of the records.

295. In a phonograph, a turn-table, means for automatically lowering the same, a program carrier and connections from the turn-table lowering mechanism for shifting said program carrier as the turn-table is lowered.

296. In a phonograph, a turn-table, means for automatically lowering the same, a program carrier and connections from the turn-table lowering mechanism for shifting said program carrier as the turn-table is lowered, said program carrier including a holder and a program card reversibly engageable in said carrier.

297. Automatic record changing mechanism for phonographs including, in combination with a step-by-step vertically shiftable turn-table, indexing means therefor including an index wheel, a control pawl, a slide on said pawl, and a hand-actuated control for operating said slide.

298. In combination with a phonograph, an automatic record changing mechanism therefor including an index wheel, an intermission movement, and means operable by said index wheel for throwing said intermission movement into operation.

299. An intermission movement for phonographs and the like, comprising a motor-driven element and a vibratory rotary timing element operated thereby and loosely journaled at one end.

300. An intermission movement for phonographs and the like, comprising a motor driven element and a vibratory rotary timing element operated thereby and loosely journaled at one end, the opposite end of said element being free to vibrate and carrying a weight.

301. An intermission movement for phonographs or other mechanisms, comprising a rotary driving element and a plurality of vibratory timing devices individually engageable and disengageable with respect to the driving element.

302. An intermission movement for phonographs or other mechanisms, comprising a rotary driving element and a plurality of vibratory timing devices individually engageable and disengageable with respect to the driving element, and each consisting of a substantially vertical spindle loosely journaled at its lower end and free for vibratory movement at its upper end.

303. In combination, phonograph records, each having a tripping depression at the end of the sound record groove therein, a rotating turn-table, a magazine for supporting a stack of the records with the bottom record at a predetermined horizontal plane above the rotating turn-table, a swinging tone arm provided with a pivoted sound box carrying a stylus to ride in the sound groove in a record on the rotating turn-table and to drop in the tripping depression at the end of the groove, a trip member actuated by the sound box on the dropping of the stylus in the tripping depression, and record changing fingers under control of said trip lever and operable to lower the bottom record from the magazine onto the rotating turn-table.

304. In combination, phonograph records, each having a tripping depression at the end of the sound groove therein, a rotating turn-table, a magazine for supporting a stack of the records above the turn-table, a swinging tone arm provided with a pivoted sound box carrying a stylus to ride in the sound groove and to drop in the tripping depression, trip mechanism actuated by the sound box on the dropping of the stylus in the tripping depression, record changing mechanism under control of said trip mechanism and operable to lower the records from the magazine onto the rotating turn-table, and tone arm swinging mechanism under control of the trip mechanism for positively swinging the tone arm away from the rotating turn-table before operation of the record changing mechanism and for returning the stylus into engagement with the records after they have been deposited on the rotating turn-table.

305. In combination, a turn-table, a tone arm provided with a vertically pivoting swiveled sound box, a sound box lifting device on the tone arm, a spring actuated member for operating said lifting device, and a trip device for restraining the spring actuated member having a part disposed in the path of the vertical movement of the swiveled sound box.

306. In a phonograph, a tone arm provided with a sound box mounted to swing in a substantially vertical plane, a trip member positioned beneath a portion of said sound box, normally free of but arranged to be actuated thereby upon a falling movement of the sound box, mechanism controlled by said trip member, means including a lifting lever for automatically lifting the sound box out of tripping relation to the trip member, and manually operable means including a finger button positioned to engage the lifting lever for lifting the sound box out of tripping relation to the trip member.

307. In a phonograph, a tone arm provided with a sound box mounted to swing in a substantially vertical plane, a trip member positioned beneath a portion of said sound box, normally free of but arranged to be actuated thereby upon a falling movement of the sound box, mechanism controlled by said trip member, means for automatically lifting the sound box out of tripping relation to the trip member, manually operable means for lifting the sound box out of tripping relation to the trip member, and a record having a depression at the end of the sound groove therein for automatically dropping the sound box upon the trip member.

308. In a phonograph, a tone arm provided with a sound box mounted to swing in a substantially vertical plane, a trip member positioned beneath a portion of said sound box, normally free of but arranged to be actuated thereby upon a falling movement of the sound box, mechanism controlled by said trip member, means for automatically lifting the sound box out of tripping relation to the trip member, manually operable means for lifting the sound box out of tripping relation to the trip member, record carried means for dropping the sound box upon the trip member, and manually controlled means for dropping the sound box upon the trip member independently of such record controlled means.

309. The combination with a phonograph and means for automatically changing the records thereon at the conclusion of the playing of the same, of manually actuated means operable during the playing of a record to prevent operation of the automatic record changing mechanism at the end of the playing of such record, and means for setting the automatic record changing mechanism into operation to change the record prior to the completion of the playing thereof.

310. The combination with a phonograph and automatic means for feeding the records from a stack in sequence thereto, of means manually operable at any time for substantially instantaneously omitting further playing of any of said sequentially fed records, and manually operable means for repeating desired records.

311. In a phonograph, the combination with a swinging tone arm, means for positively swinging said tone arm and means for temporarily restraining the tone arm at a selected point in the swinging movement thereof.

312. In a phonograph, the combination with a swinging tone arm, means for positively swinging said tone arm, means for temporarily restraining the tone arm at a selected point in the swinging movement thereof and comprising coöperating jaws and a member on the tone arm engaged by said jaws.

313. In a phonograph, a vertically shiftable rotating turn-table, means for intermittently permitting said turn-table to lower by its own weight and means actuated by the lowering force of said turn-table.

314. In a phonograph, a vertically shiftable rotating turn-table, means for intermittently permitting said turn-table to lower by its own weight and means actuated by the lowering force of said turn-table and including control mechanism for the phonograph positively actuated by said falling force.

315. In a phonograph, a swinging tone arm, means for positively swinging the same, including a lost motion connection and frictional yieldable means for normally coupling said lost motion parts.

316. In a phonograph, a record having a depression at the end of the sound groove therein, a stylus for engagement with said record and adapted to drop below the playing surface into said depression, a mechanical trip actuated upon the dropping of the stylus and mechanically operated tone arm swinging and record changing mechanism set into action by said mechanical trip.

317. In a phonograph, a vertically shiftable turn-table, means for manually controlling the rotation of the turn-table, a manual control including a handle and connection therefrom for lifting the turn-table, mechanism for automatically lowering the turn-table and a manual control for said automatic lowering mechanism.

318. In a phonograph, a vertically shiftable turn-table and independent optionally operable mechanisms for lowering the turn-table, one automatic and the other manually operable.

319. In a phonograph, automatic record changing mechanism, means for controlling the same to substitute a new record or to repeat a record which has been played and optionally operable means for providing a variable intermission period between the playing of different records.

320. The combination with a phonograph, of means for controlling automatic functions thereof including a controller provided with an arcuate track, a swinging tone-arm, a lever carried by said tone-arm for engagement with said track, a power device for actuating said lever and a restoring member for the power device carried by the tone-arm and arranged also for engagement with the arcuate track.

321. The combination with a phonograph, of means for controlling automatic functions thereof including a controller provided with an arcuate track, a swinging tone-arm, a lever carried by said tone-arm for engagement with said track, a power device for actuating said lever and a restoring member for the power device carried by the tone-arm and arranged also for engagement with the arcuate track, said lever and restoring member engaging opposite faces of the track and thereby adapted in one position of the swinging tone-arm to hold the track therebetween so as to prevent actuation of the controller.

322. The combination with a phonograph, of means for controlling automatic functions thereof including a controller provided with an arcuate track, a swinging tone-arm, a member carried by said tone-arm for engagement with the track, a power device for operating said member and a member for restoring the power device also carried by the tone-arm and positioned to engage the track.

323. The combination with a phonograph, of means for controlling automatic functions thereof including a controller provided with an arcuate track, a swinging tone-arm, a member carried by said tone-arm for engagement with the track, a power device for operating said member and a member for restoring the power device also carried by the tone-arm and positioned to engage the track, said members engaging opposite faces of the track in one position of the swinging tone-arm to prevent operation of the controller.

324. In a phonograph, a reproducer supported for vertical swinging movement, a trip member provided with a trip portion standing in the path of the vertical movement of the reproducer and adjustable to suit the normal operating plane of the same and mechanism controlled by said trip member.

325. In combination, record changing mechanism, a cam for operating the same, means for shifting said cam into planes of engagement with and disengagement from the record changing mechanism and a holding device for positively holding the cam in its plane of engagement with the record changing mechanism to thereby prevent premature disengagement of the same from such record changing mechanism.

326. In apparatus of the character disclosed, record lowering devices for engaging beneath the lowermost of a stack of records, record supporting devices for engagement beneath the lowermost record to normally support the stack, means for retracting the supporting devices to leave the lowermost record supported on the lowering devices and means for operating said lowering devices to lower the record supported thereby and for then retracting said lowering devices from supporting engagement with such record.

327. In apparatus of the character disclosed, record lowering devices for engaging beneath the lowermost of a stack of records, record supporting devices for engagement beneath the lowermost record to normally support the stack, means for retracting the supporting devices to leave the lowermost record supported on the lowering devices, means for operating said lowering devices to lower the record supported thereby and for then retracting said lowering devices from supporting engagement with such record and means for temporarily supporting the remaining records of the stack above the lowermost record when the supporting devices are retracted in the first instance to deposit the lowermost record on the lowering devices.

328. In apparatus of the character disclosed, record lowering devices for engaging beneath the lowermost of a stack of records, record supporting devices for engagement beneath the lowermost record to normally support the stack, means for retracting the supporting devices to leave the lowermost record supported on the lowering devices, means for operating said lowering devices to lower the record supported thereby and for then retracting said lowering devices from supporting engagement with such record and a rotating turn-table positioned to receive the record thus released from the lowering devices.

329. In a phonograph, a turn-table, horizontally operating record supporting and separating members above said turn-table for supporting and separating the lowermost records from a stack of superposed records and vertically operating lowering fingers positioned to receive the separated lowermost records and to carry the same down onto the turn-table.

330. An intermission movement for phonographs and the like comprising a motor driven element, a vibratory rotary timing element operated thereby and loosely journaled at one end, the opposite end of said element being free to vibrate and carrying a weight and means for automatically uncoupling said vibratory timing element from the driving means therefor.

331. An intermission movement for phonographs and the like comprising a motor driven element, a vibratory rotary timing element operated thereby and loosely journaled at one end, the opposite end of said element being free to vibrate and carrying a weight, means for automatically uncoupling said vibratory timing element from the driving means therefor and mechanism actuated by said motor driven element following such uncoupling of the driven element.

332. An intermission movement for phonographs and the like comprising a driving element and a plurality of vibratory rotary timing elements independently engageable with and disengageable from said driving element.

333. An intermission movement for phonographs and the like comprising a driving element, a plurality of vibratory rotary timing elements independently engageable with and disengageable from said driving element and means for simultaneously disengaging all of the engaged timing elements from said driving element.

334. An intermission movement for phonographs and the like comprising a driving gear and vibratory rotary timing elements having pinion elements engaged with said gear.

335. An intermission movement for phonographs and the like comprising a driving gear, vibratory rotary timing elements having pinion elements engaged with said gear and means for automatically shifting said pinion elements free of engagement with such gear.

336. An intermission movement for phonographs and the like comprising a driving element, a vibratory rotary timing element operated thereby and loosely journaled at one end and a weight removably engageable with the opposite free end of said vibratory element.

337. The combination with a phonograph and control means therefor, of an intermission movement comprising a motor driven element for operating the phonograph control and means for retarding the operation of said motor driven element.

338. The combination with a phonograph and control means therefor, of an intermission movement comprising a motor driven element for operating the phonograph control, means for retarding the operation of said motor driven element and means for automatically disconnecting said retarding means from the motor driven element to enable the same to exert its full power to operate the phonograph control.

339. The combination with a phonograph and a stop therefor, of an intermission movement comprising a motor driven element for operating said stop, a vibratory rotary timing element operated by the motor driven element and means for automatically uncoupling said timing element from said motor driven element.

340. In a phonograph, the combination with a record having a depression adjacent the end of the sound groove therein, of a reproducer supported for engagement with said sound groove and adapted to drop in the depression aforesaid, a trip lever actuated by the dropping of the reproducer in the depression and power mechanism for lifting the reproducer clear of the record under control of and normally restrained by said trip lever.

341. In a phonograph, the combination with a record having a depression adjacent the end of the sound groove therein, of a reproducer supported for engagement with said sound groove and adapted to be lowered by said depression at the end of the sound groove, a trip lever positioned to be actuated by the reproducer in said lowering movement thereof, a reproducer lifting lever for elevating the reproducer clear of the record and a power device for actuating said lifting lever under control of and normally restrained by the trip lever aforesaid.

342. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof and power mechanism for lifting the reproducer clear of the record under control of said trip element.

343. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof, power mechanism for lifting the reproducer clear of the record under control of said trip element, said power lifting mechanism including a spring actuated member normally restrained by the trip element and a reproducer lifting lever operated by said spring actuated member.

344. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof, power mechanism for lifting the reproducer clear of the record under control of said trip element and means rendered operative by said power mechanism for shifting the reproducer to one side of the record.

345. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof, power mechanism for lifting the reproducer clear of the record under control of said trip element, a vertically adjustable turn-table for supporting the record and index mechanism for lowering said turn-table step by step under control of said power mechanism.

346. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof, power mechanism for lifting the reproducer clear of the record under control of said trip element, a vertically adjustable turn-table for supporting the record, index mechanism for lowering said turn-table step by step under control of said power mechanism and including a ratchet wheel, a pawl engaging the same and a lever connected with said pawl and operated by the power mechanism.

347. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof, power mechanism for lifting the reproducer clear of the record under control of said trip element, a vertically adjustable turn-table for supporting the record, index mechanism for lowering said turn-table step by step under control of said power mechanism and including a ratchet wheel, a pawl engaging the same and a lever connected with said pawl and operated from the power mechanism through the medium of a bell-crank engaging said lever at one end and directly operated by the power mechanism at its other end.

348. In a phonograph, the combination with a record having a depression adjacent the end of the sound groove therein, of a reproducer positioned for engagement with said sound groove and supported to drop in the depression at the end of said groove, a trip element positioned to be actuated by the reproducer in said dropping movement thereof, power mechanism for lifting the reproducer clear of the record under control of said trip element, a vertically adjustable turn-table for supporting the record, index mechanism for lowering said turn-table step by step under control of said power mechanism and including a ratchet wheel, a pawl engaging the same and a lever connected with said pawl and operated from the power mechanism through the medium of a bell-crank engaging said lever at one end and directly operated by the power mechanism at its other end, the reproducer having a swinging movement to travel to one side of the record and the pawl lever having an arcuate track to be engaged and operated by the bellcrank at any point in the swinging movement of the reproducer.

349. In a phonograph, the combination of a rotating turn-table vertically adjustable step by step, a record on said turn-table provided with a depression adjacent the end of the sound groove therein, a swiveled tone-arm carrying a sound-box pivoted for vertical movement and provided with a stylus to engage in the sound groove and whereby said sound-box will be dropped at the end of the playing of a record by the stylus passing into the depression aforesaid, a trip member positioned to be actuated by said dropping of the sound-box, a member for lifting the sound-box to carry the stylus clear of the record, a power device for actuating said lifting member under control of the trip member aforesaid, index mechanism for lowering the turn-table and operating connections from the power device to said index mechanism operative irrespective of the swinging movements of the tone-arm.

350. In a phonograph, the combination of a rotating turn-table vertically adjustable step by step, a record on said turn-table provided with a depression adjacent the end of the sound groove therein, a swiveled tone-arm carrying a sound-box pivoted for vertical movement and provided with a stylus to engage in the sound groove and whereby said sound-box will be dropped at the end of the playing of a record by the stylus passing into the depression aforesaid, a trip member positioned to be actuated by said dropping of the sound-box, a member for lifting the sound-box to carry the stylus clear of the record, a power device for actuating said lifting member under control of the trip member aforesaid, index mechanism for lowering the turn-table, operating connections from the power device to said index mechanism operative irrespective of the swinging movements of the tone-arm and power mechanism for positively swinging the tone-arm to carry the sound-box and stylus to one side of the record on the turn-table.

351. In a phonograph, the combination of a rotating turn-table vertically adjustable step by step, a record on said turn-table provided with a depression adjacent the end of the sound groove therein, a swiveled tone-arm carrying a sound-box pivoted for vertical movement and provided with a stylus to engage in the sound groove and whereby said sound-box will be dropped at the end of the playing of a record by the stylus passing into the depression aforesaid, a trip member positioned to be actuated by said dropping of the sound-box, a member for lifting the sound-box to carry the stylus clear of the record, a power device for actuating said lifting member under control of the trip member aforesaid, index mechanism for lowering the turn-table, operating connections from the power device to said index mechanism operative irrespective of the swinging movements of the tone-arm, power mechanism for positively swinging the tone-arm to carry the sound-box and stylus to one side of the record on the turn-table and means operated in the swinging movement of the tone-arm for restoring the trip member into holding engagement with the power device aforesaid.

352. In a phonograph, the combination of a rotating turn-table vertically adjustable step by step, a record on said turn-table provided with a depression adjacent the end of the sound groove therein, a swiveled tone-arm carrying a sound-box pivoted for vertical movement and provided with a stylus to engage in the sound groove and whereby said sound-box will be dropped at the end of the playing of a record by the stylus passing into the depression aforesaid, a trip member positioned to be actuated by said dropping of the sound-box, a member for lifting the sound-box to carry the stylus clear of the record, a power device for actuating said lifting member under control of the trip member aforesaid, index mechanism for lowering the turn-table, operating connections from the power device to said index mechanism operative irrespective of the swinging movements of the tone-arm, power mechanism for positively swinging the tone-arm to carry the sound-box and stylus to one side of the record on the turn-table, means for supporting a stack of records above the turn-table, including record individualizing and lowering devices and means for automatically actuating the same to lower a record on the turn-table after the sound-box has been swung to one side of the record which has been played.

353. In a phonograph, the combination of a rotating turn-table vertically adjustable step by step, a record on said turn-table provided with a depression adjacent the end of the sound groove therein, a swiveled tone-arm carrying a sound-box pivoted for vertical movement and provided with a stylus to engage in the sound groove and whereby said sound-box will be dropped at the end of the playing of a record by the stylus passing into the depression aforesaid, a trip member positioned to be actuated by said dropping of the sound-box, a member for lifting the sound-box to carry the stylus clear of the record, a power device for actuating said lifting member under control of the trip member aforesaid, index mechanism for lowering the turn-table, operating connections from the power device to said index mechanism operative irrespective of the swinging movements of the tone-arm, power mechanism for positively swinging the tone-arm to carry the sound-box and stylus to one side of the record on the turn-table, means for supporting a stack of records above the turn-table, including record individualizing and lowering devices, means for automatically actuating the same to lower a record on the turn-table after the sound-box has been swung to one side of the record which has been played and means for automatically swinging the tone-arm inwardly and for gradually lowering the sound-box to bring the stylus into engagement with the commencement of the sound groove in the newly positioned record on the turn-table.

354. In a phonograph, the combination with a rotating turn-table, of a record supported thereon and provided with a depression adjacent the end of the sound groove therein, a reproducer adapted for engagement with said sound groove and supported to drop when the depression at the end of the same is reached, trip mechanism actuated by such dropping movement of the reproducer and means for producing a lowering movement to the turn-table to thereby impart a dropping movement to the reproducer.

355. In a phonograph, a reproducer mounted for shifting movements in a substantially vertical plane, a trip member positioned beneath a portion of said reproducer and arranged to be actuated thereby upon a falling movement of the same, mechanism controlled by said trip member and manually operable means for lifting the reproducer out of tripping relation to the trip member.

356. In a phonograph, a reproducer mounted for shifting movements in a substantially vertical plane, a trip member positioned beneath a portion of said reproducer and arranged to be actuated thereby upon a falling movement of the same, mechanism controlled by said trip member and including means for automatically lifting the reproducer from the trip member and manually operable means for independently lifting the reproducer out of tripping relation to the trip member.

357. In a phonograph, a reproducer mounted for shifting movements in a substantially vertical plane, a trip member positioned beneath a portion of said reproducer and arranged to be actuated thereby upon a falling movement of the same, mechanism controlled by said trip member and a record having a depression therein for dropping the reproducer upon said trip member.

358. In a phonograph, a reproducer, automatic phonograph controlling mechanism, reproducer controlled means for governing operation of said automatic mechanism, means for operating the reproducer at the end of the playing of a record to cause the same to actuate said reproducer controlled means and manually controlled means for similarly operating said reproducer at any selected point in the playing of a record.

359. In a phonograph, a reproducer, phonograph controlling mechanism, a trip member for said mechanism controlled by the reproducer, means for operating said reproducer at the end of the playing of a record to cause the same to actuate the trip member and means for independently actuating said trip member at various selected points in the playing of a record.

360. In a phonograph, the combination with a vertically adjustable turn-table, of a reproducer for engagement with a record on said turn-table and supported for vertical shifting movements, a trip member adapted to be actuated upon predetermined lowering movements of said reproducer, mechanism controlled by said trip member and means for lowering the turn-table to effect tripping movements of said reproducer.

361. In a phonograph, a vertically adjustable turn-table, means for automatically lowering records on the same, a reproducer for engagement with the records on the turn-table and supported for vertical shifting movements, a trip member positioned for actuation by said reproducer upon predetermined lowering movements of the same, means for initiating operation of the automatic record lowering mechanism under control of and normally restrained by the trip member and means for lowering the turn-table to effect tripping movements of the reproducer as aforesaid.

362. In a phonograph, the combination of a rotating turn-table vertically adjustable step by step, a record on said turn-table provided with a depression adjacent the end of the sound groove therein, a swiveled tone-arm carrying a sound-box pivoted for vertical movement and provided with a stylus to engage in the sound groove and whereby said sound-box will be dropped at the end of the playing of a record by the stylus passing into the depression aforesaid, a trip member positioned to be actuated by said dropping of the sound-box, a member for lifting the sound-box to carry the stylus clear of the record, a power device for actuating said lifting member under control of the trip member aforesaid, index mechanism for intermittently lowering the turn-table one step at a time, normally non-contacting operating connections from the power device to said index mechanism operative irrespective of the swinging movements of the tone-arm, power mechanism for positively swinging the tone-arm to carry the sound-box and stylus to one side of the record on the turn-table after same has been lowered one step, means for supporting a stack of records above the turn-table, including record individualizing and lowering devices, means for automatically actuating the same to lower a record onto the turn-table after the sound-box has been swung to one side of the record which has been played and means for automatically swinging the tone-arm inwardly and for gradually lowering the sound-box to bring the stylus into engagement with the commencement of the sound groove in the newly positioned record on the turn-table.

363. In a phonograph, the combination with a record having a depression below the general plane of the sound groove therein, of a reproducer positioned for engagement with said sound groove and supported to drop in said depression, a trip element positioned to be actuated by the reproducer in said dropping movement thereof and control mechanism for the phonograph adapted to be rendered operative by said trip element upon the actuation of the same by the dropping of the reproducer.

364. In combination with a phonograph having a driving motor and stop mechanism, an intermission movement comprising a spring motor adapted to be coupled with the phonograph motor, means for automatically uncoupling said spring motor from the phonograph motor when the energy of the same has been restored and a timing element operated by said spring motor.

365. In combination with a phonograph having a driving motor and stop mechanism, an intermission movement comprising a spring motor adapted to be coupled with the phonograph motor, means for automatically uncoupling said spring motor from the phonograph motor when the energy of the phonograph motor has been restored and a timing element operated by said spring motor and connections from the spring motor for operating the stop mechanism after an interval of operation of the timing element.

366. In combination with a phonograph having a driving motor and stop mechanism, an intermission movement comprising a spring motor adapted to be coupled with the phonograph motor, means for automatically uncoupling said spring motor from the phonograph motor when the energy of the same has been restored and a timing element operated by said spring motor, connections from the spring motor for operating the stop mechanism after an interval of operation of the timing element and means for automatically disconnecting the timing element from the spring motor prior to the actuation of the stop mechanism by said spring motor.

367. In combination with a phonograph and automatic record changing mechanism therefor, an intermission movement and means under control of the record changing mechanism for rendering said intermission movement operative at the completion of the playing of a record on the phonograph.

368. In combination with a phonograph and automatic record changing mechanism therefor, an intermission movement under control of the automatic record changing mechanism and adapted to be rendered operative upon completion of the playing of a record on the phonograph and means for preventing such operation of the intermission movement.

369. In combination with a phonograph having an operating motor, an intermission movement comprising a spring driven timing mechanism and means for connecting and disconnecting said spring driven mechanism with respect to the driving motor of the phonograph.

370. The combination with a phonograph having a driving motor, of means operated from said motor for stopping the normal operation of the phonograph and for then starting the same after an elapsed interval of time and means for variably determining the length of such interval of time.

371. In a phonograph, automatic record changing mechanism and optionally operable means for providing variable intermission periods between the playing of different records.

372. In a phonograph, the combination with automatic record changing mechanism, of an intermission movement and connections therefrom for preventing operation of said automatic record changing mechanism throughout an elapsed interval of time.

373. The combination with record changing means automatically operable on the completion of playing a record thereon and intermission mechanism operable to delay operation of the record changing means for an interval of time after completion of the record.

374. The combination with record changing means automatically operable on the completion of playing a record thereon, intermission mechanism operable to delay operation of the record changing means for an interval of time after completion of the record and a control device for rendering said intermission mechanism operative and inoperative.

375. The combination with a phonograph, of means for stopping and for then automatically starting the same after an elapsed interval of time and means for variably predetermining the length of such time interval.

376. In a phonograph, a turn-table, a reproducer mounted for shifting movements in a substantially vertical plane and arranged to coöperate with a record on the turn-table, a trip member positioned beneath a portion of said reproducer and arranged to be actuated thereby upon a falling movement of the same and mechanism normally held inoperative by said trip member and adapted when rendered operative on actuation of the trip member to lift the reproducer clear of a record on the turn-table.

377. The combination with a phonograph including a driving motor, of automatic record changing mechanism for the phonograph, an electric motor for restoring the energy of the phonograph motor and means automatically controlled to render the electric restoring motor operative during record changing intervals of the automatic record changing mechanism.

378. The combination with a phonograph including a driving motor, of automatic record changing mechanism for the phonograph, an electric motor for restoring the energy of the phonograph motor and means automatically controlled to render the electric restoring motor operative during record changing intervals of the automatic record changing mechanism and including a breakable connection between the record changing mechanism and the electric motor.

379. The combination with a phonograph including a driving motor, of automatic record changing mechanism for the phonograph, an electric motor for restoring the energy of the phonograph motor and means automatically controlled to render the electric restoring motor operative during record changing intervals of the automatic record changing mechanism and including a connection operable during only a portion of the record changing interval.

380. In combination with phonograph mechanism, reversely operating cams, a tone-arm swinging lever having a portion for engagement with either of said cams and means for effecting engagement of the lever and cams including a slide having spaced shoulders forming tracks and a double conical roller for sliding and rolling engagement with said tracks.

381. In a phonograph, a turn-table, columns at diametrically opposite sides of said turn-table, horizontally operating record separating and supporting slides mounted on said columns, arcuate record guiding plates fixedly mounted on the columns between the separating and supporting slides, vertically operating record lowering fingers mounted on the columns, a reproducer supported to coöperate with a record on the turn-table and mounted for a vertical falling movement, a record on the turn-table having a depression at the end of the sound groove therein to impart a falling motion to the reproducer, a trip member positioned beneath the reproducer to be actuated thereby upon falling movement of the same, a power device normally restrained by said trip member, a reproducer lifting lever adapted to be actuated by said power device, index mechanism for lowering the turn-table step by step and arranged to be actuated by the power device and means controlled by said index mechanism for swinging the reproducer clear of the record, for operating the record changing slides and fingers and for then returning the reproducer and lowering the same over the turn-table.

In testimony whereof I affix my signature.

JOHN WAHLBERG.

It is hereby certified that in Letters Patent No. 1,390,404, granted September 13, 1921, upon the application of John Wahlberg, of New York, N. Y., for an improvement in "Phonographs," errors appear in the printed specification requiring correction as follows: Page 12, line 7, for the reference-numeral "70" read *70ª;* page 18, line 99, for the reference-numeral "241ª" read *254ª;* page 21, strike out lines 34 and 35 and insert instead *to the stylus and sound-box, similar to that effected by the tripping depression at the;* and that the said Letters Patent should be read with these corrections therein that the same may conform to the record of the case in the Patent Office.

Signed and sealed this 20th day of October, A. D., 1921.

[SEAL.]                                    WM. A. KINNAN,
*Acting Commissioner of Patents.*